United States Patent
Hayashi et al.

(10) Patent No.: US 7,460,140 B2
(45) Date of Patent: Dec. 2, 2008

(54) METHOD AND APPARATUS FOR DISPLAYING INFORMATION AND PROGRAM AND MEDIUM USED THEREFOR

(75) Inventors: Masakazu Hayashi, Chiba (JP); Hideyuki Agata, Tokyo (JP); Eduardo Agusto Sciammarella, Tokyo (JP); Makoto Imamura, Tokyo (JP)

(73) Assignee: Sony Corporation, Tokyo (JP)

( * ) Notice: Subject to any disclaimer, the term of this patent is extended or adjusted under 35 U.S.C. 154(b) by 3 days.

(21) Appl. No.: 09/845,382

(22) Filed: Apr. 30, 2001

(65) Prior Publication Data
US 2002/0044128 A1 Apr. 18, 2002

(30) Foreign Application Priority Data
May 1, 2000 (JP) ............................. 2000-132458

(51) Int. Cl.
*G09G 5/02* (2006.01)
(52) U.S. Cl. ..................... 345/698; 345/427; 345/472.1
(58) Field of Classification Search ......... 345/427–428, 345/698, 835, 836–838, 753, 723, 473–474, 345/726, 706, 763–764, 730, 960, 977, 472.1, 345/472.2
See application file for complete search history.

(56) References Cited

U.S. PATENT DOCUMENTS

| | | | | |
|---|---|---|---|---|
| 5,359,703 | A | 10/1994 | Robertson et al. | ........... 345/419 |
| 5,485,439 | A | 1/1996 | Hamasaka et al. | ....... 369/47.36 |
| 5,711,672 | A | 1/1998 | Redford et al. | ......... 434/307 R |
| 5,761,655 | A * | 6/1998 | Hoffman | ........................ 707/4 |
| 5,903,309 | A | 5/1999 | Anderson | .............. 348/333.02 |
| 5,917,488 | A * | 6/1999 | Anderson et al. | ........... 345/838 |
| 5,936,638 | A * | 8/1999 | Hodgins et al. | ............. 345/473 |
| 5,953,008 | A | 9/1999 | Hagiuda | ...................... 345/630 |
| 5,987,469 | A * | 11/1999 | Lewis et al. | .................. 707/102 |
| 6,067,398 | A | 5/2000 | Sato | ............................. 386/46 |
| 6,097,389 | A * | 8/2000 | Morris et al. | ............... 345/804 |
| 6,160,553 | A | 12/2000 | Robertson et al. | ........... 345/767 |
| 6,208,348 | B1 | 3/2001 | Kaye | ........................... 345/419 |
| 6,236,395 | B1 | 5/2001 | Sezan et al. | .................. 345/723 |
| 6,249,281 | B1 * | 6/2001 | Chen et al. | ................... 345/753 |
| 6,271,806 | B1 * | 8/2001 | Motoshima et al. | ......... 345/418 |
| 6,333,752 | B1 * | 12/2001 | Hasegawa et al. | ........... 345/764 |
| 6,335,742 | B1 * | 1/2002 | Takemoto | .................... 345/781 |

(Continued)

FOREIGN PATENT DOCUMENTS

EP 0 977 132 2/2000

(Continued)

OTHER PUBLICATIONS

Bott, Using Windows 95, QUE, 1995.

*Primary Examiner*—Richard Hjerpe
*Assistant Examiner*—Kimnhung Nguyen
(74) *Attorney, Agent, or Firm*—Frommer Lawrence & Haug LLP; William S. Frommer; Thomas F. Presson

(57) ABSTRACT

A content processing routine divides a thumbnail-area according to data size and generates the same number of pixels values as the number of divided thumbnail-areas. The content processing routine sets the generated pixel values to the divided thumbnail-areas and controls the display processing so that the thumbnails set with the pixel values are displayed.

21 Claims, 64 Drawing Sheets

U.S. PATENT DOCUMENTS 6,335,746 B1 * 1/2002 Enokida et al. ............. 345/839
6,405,362 B1 6/2002 Shih et al. ................... 717/174

FOREIGN PATENT DOCUMENTS

| | | |
|---|---|---|
| EP | 0 992 944 | 4/2000 |
| EP | 1 006 477 | 6/2000 |
| EP | 1 148 412 | 10/2001 |
| WO | WO 98 52120 | 11/1998 |
| WO | WO 99 37075 | 7/1999 |

* cited by examiner

F I G. 10
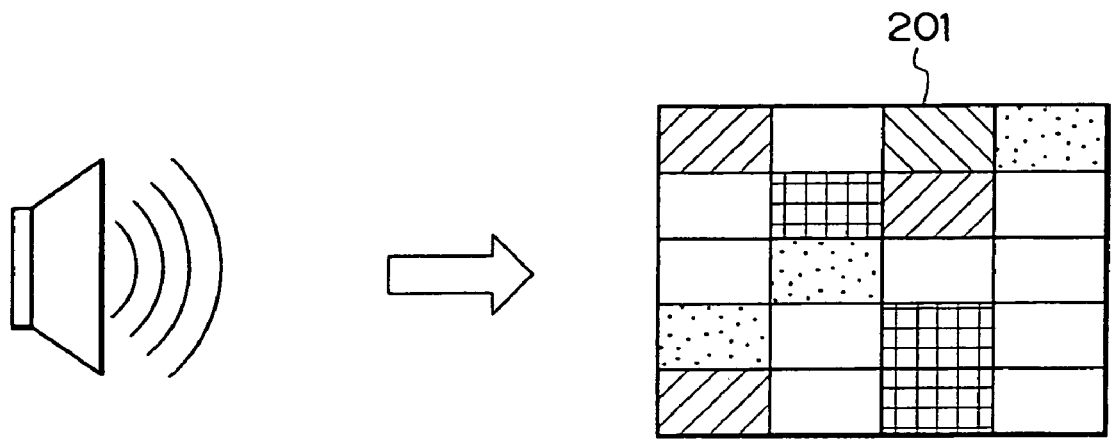

F I G. 12
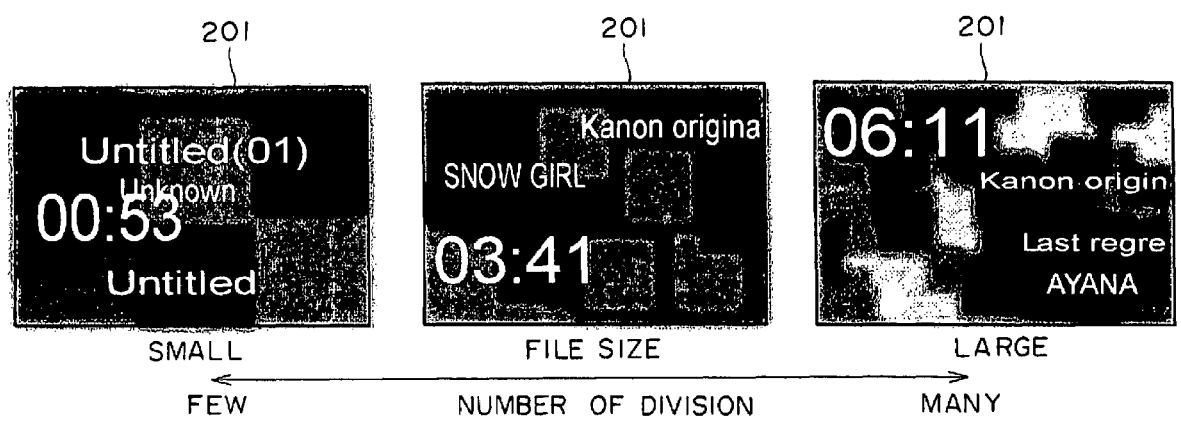

FIG.13
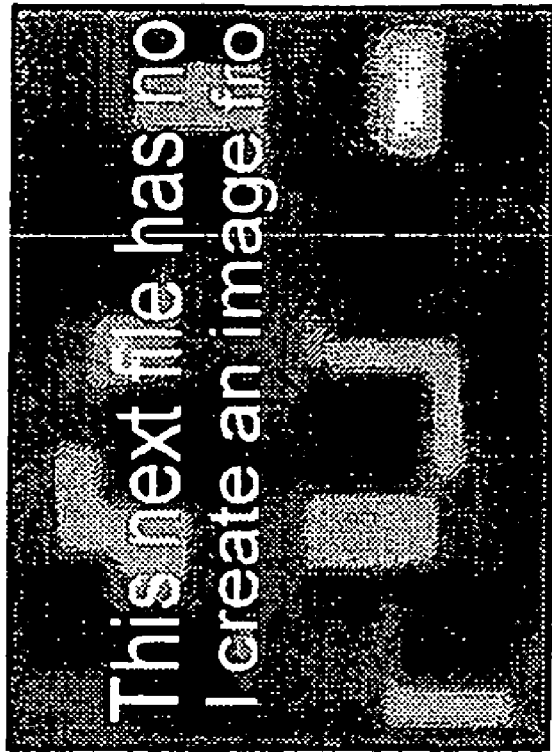
IMAGING →
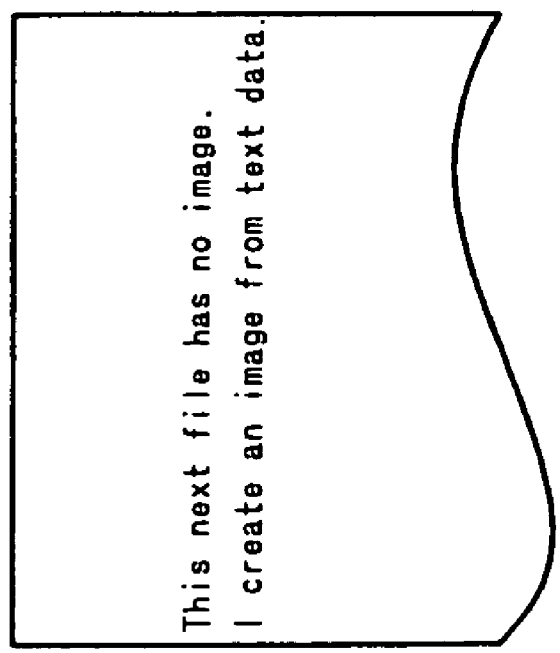
TEXT FILE

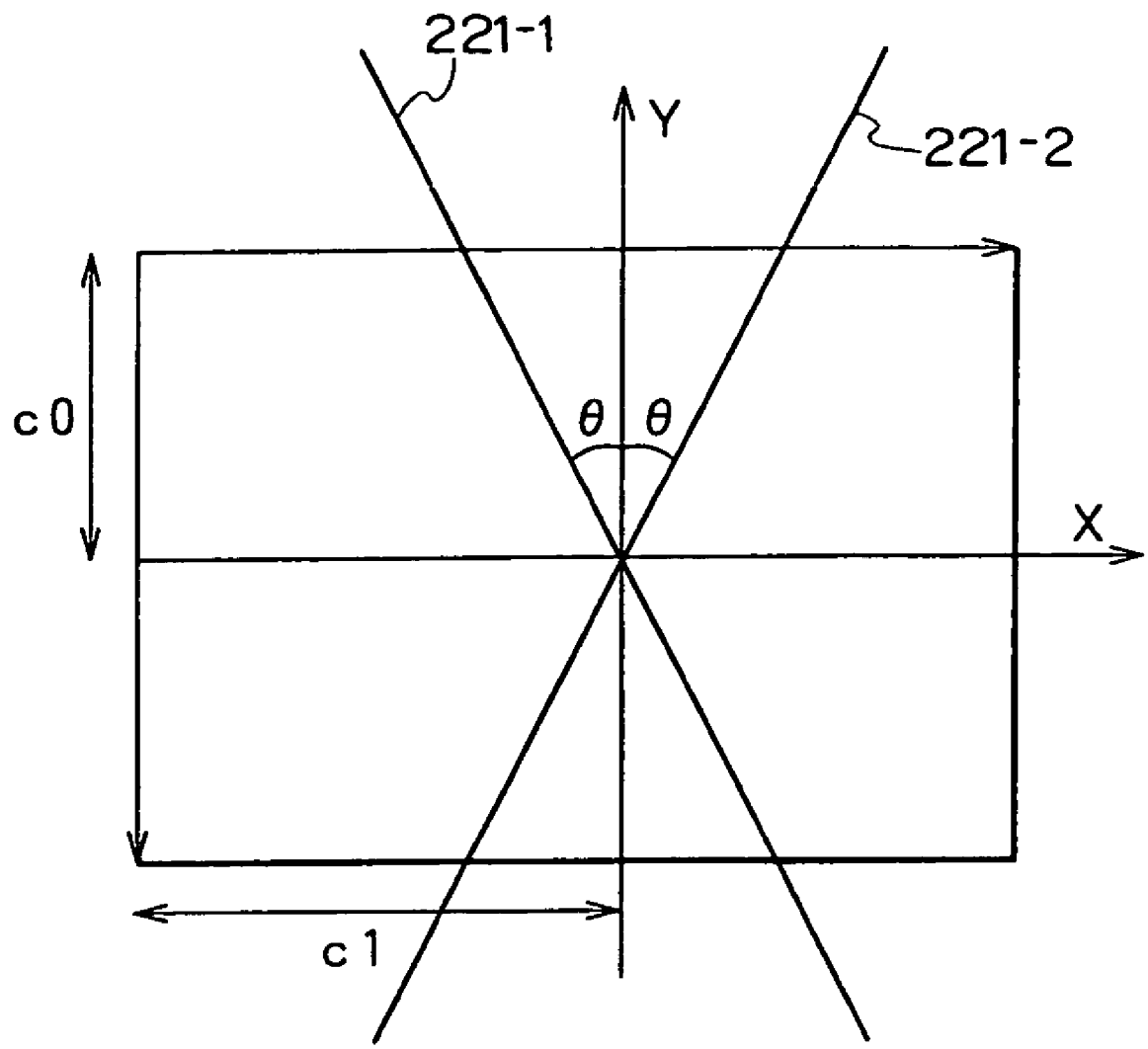
F I G.16

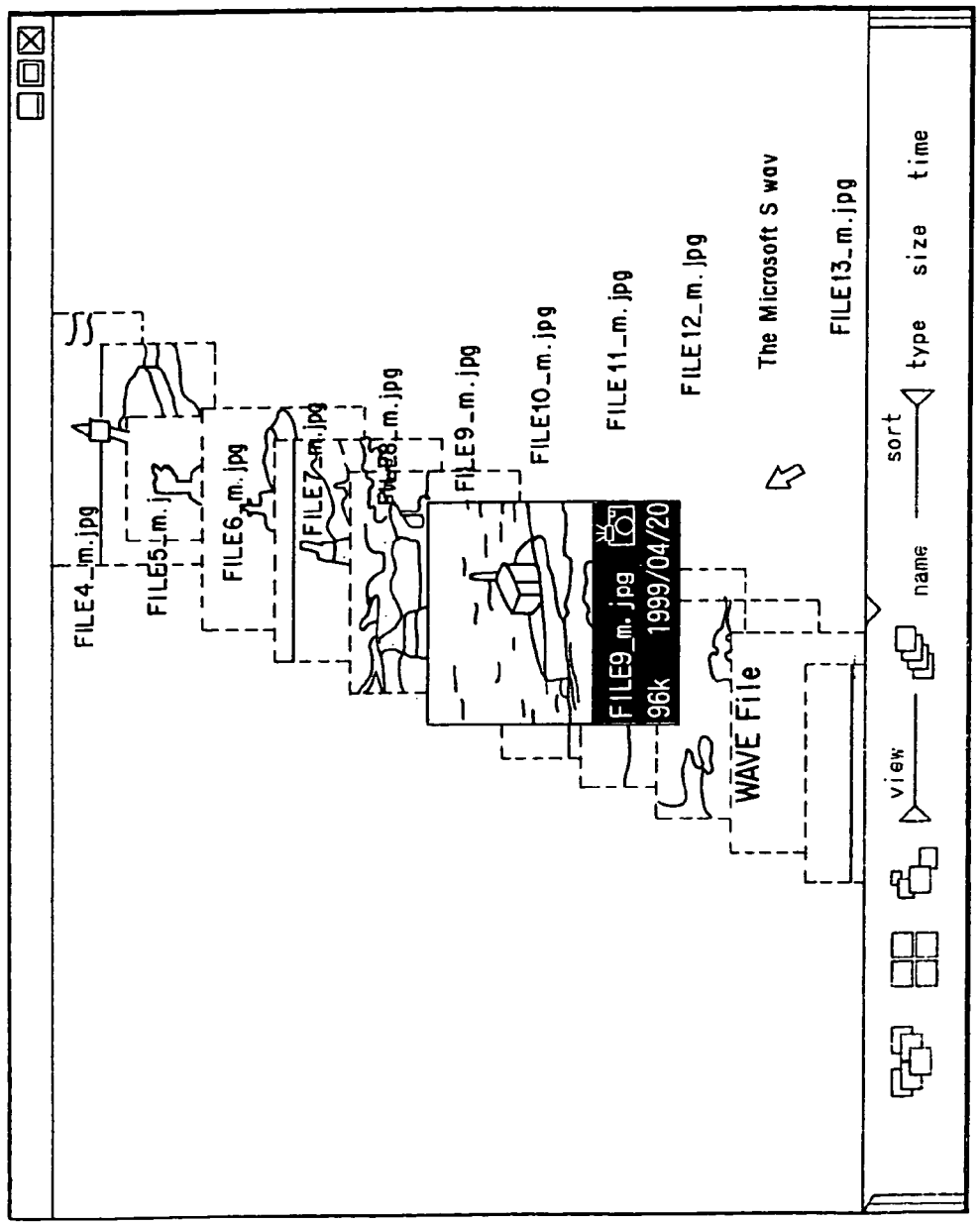

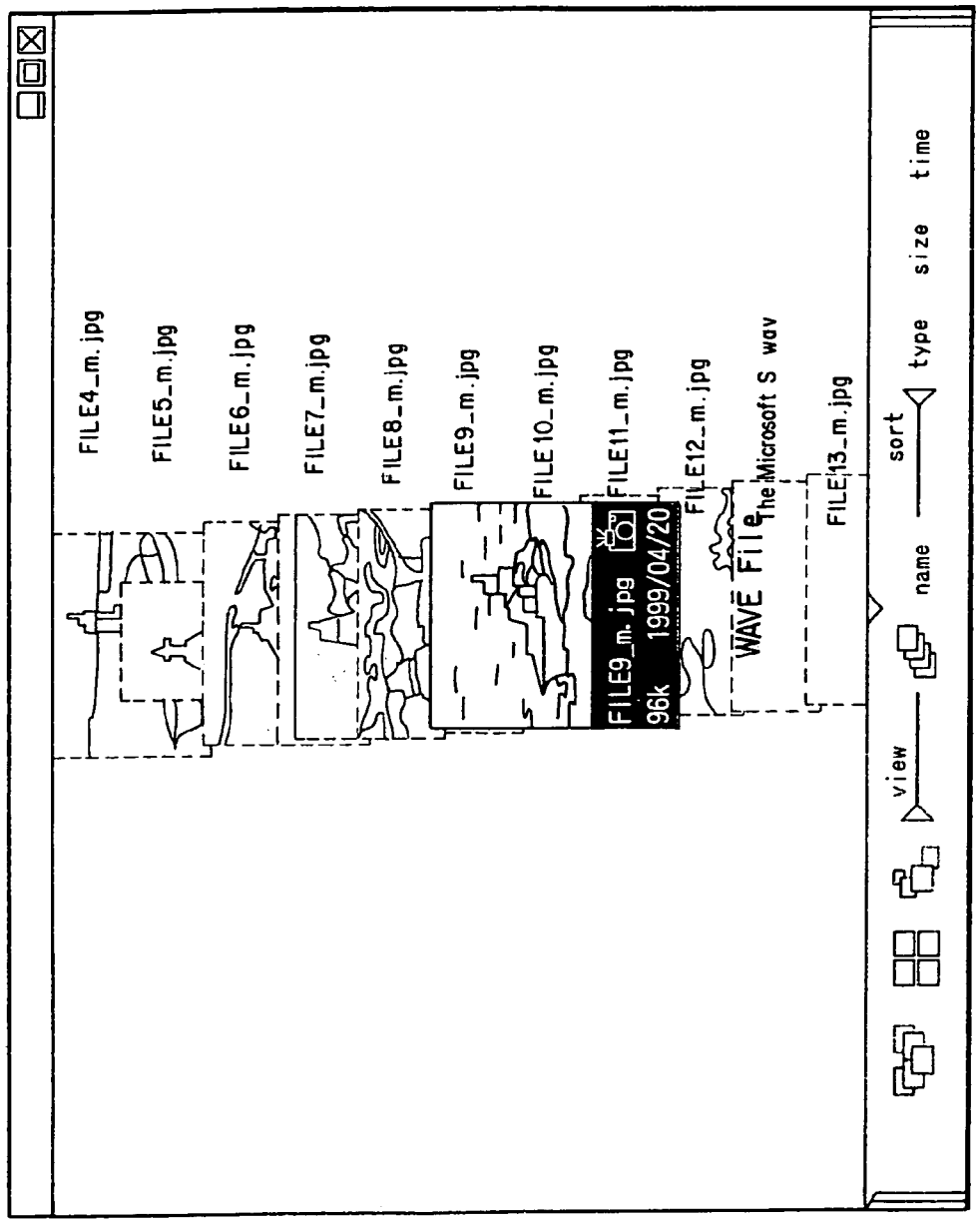

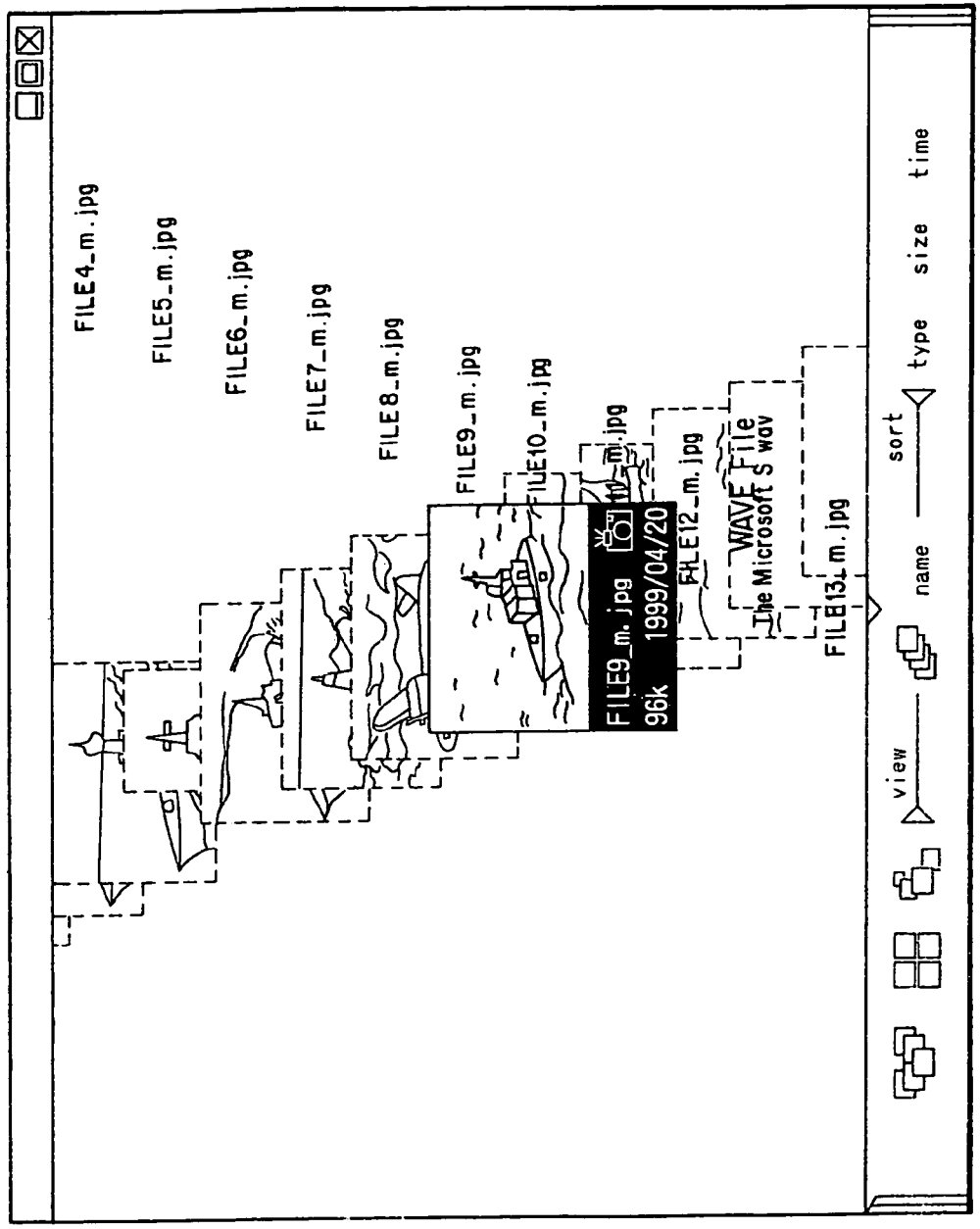

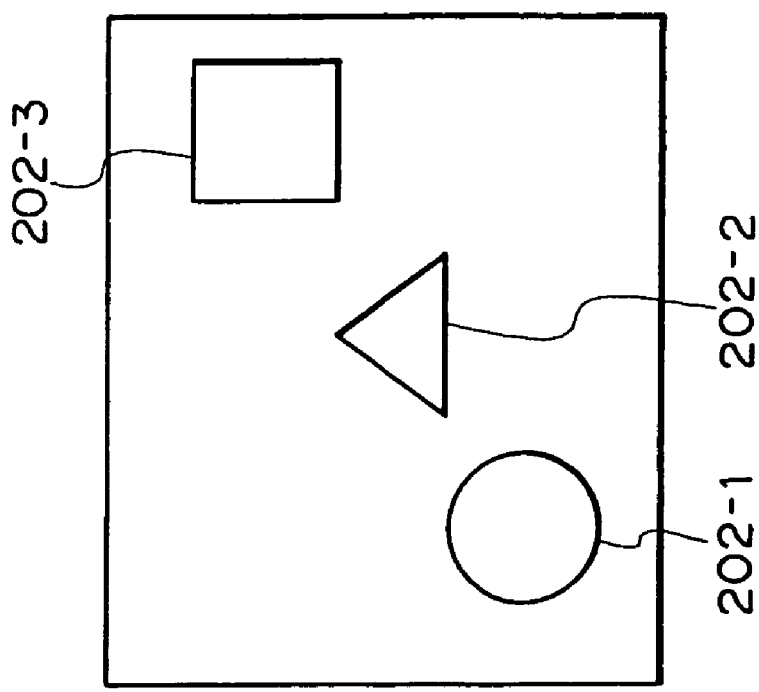
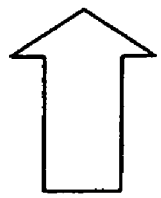
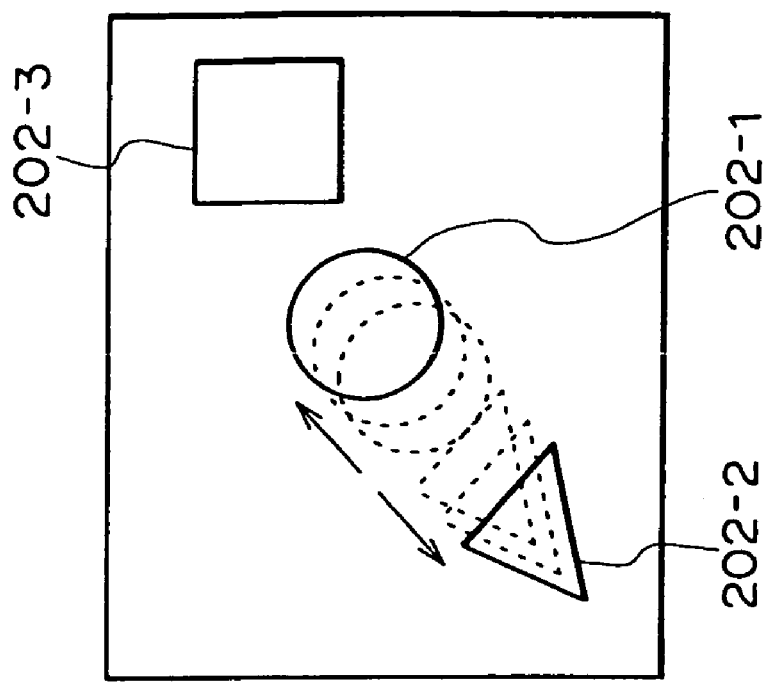
FIG. 26

FIG. 29
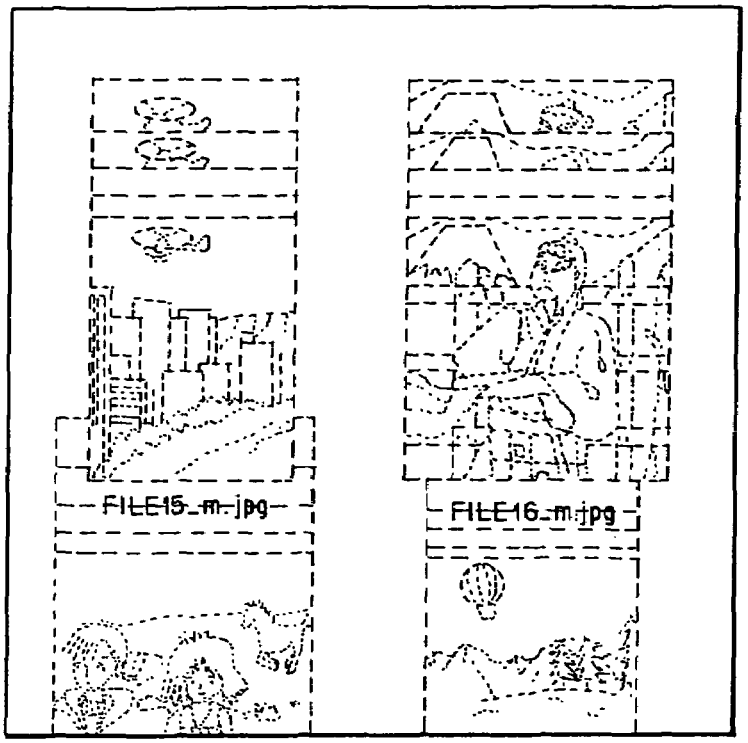
SET LIGHTNESS
OF ENTIRE SCREEN
TO 80%
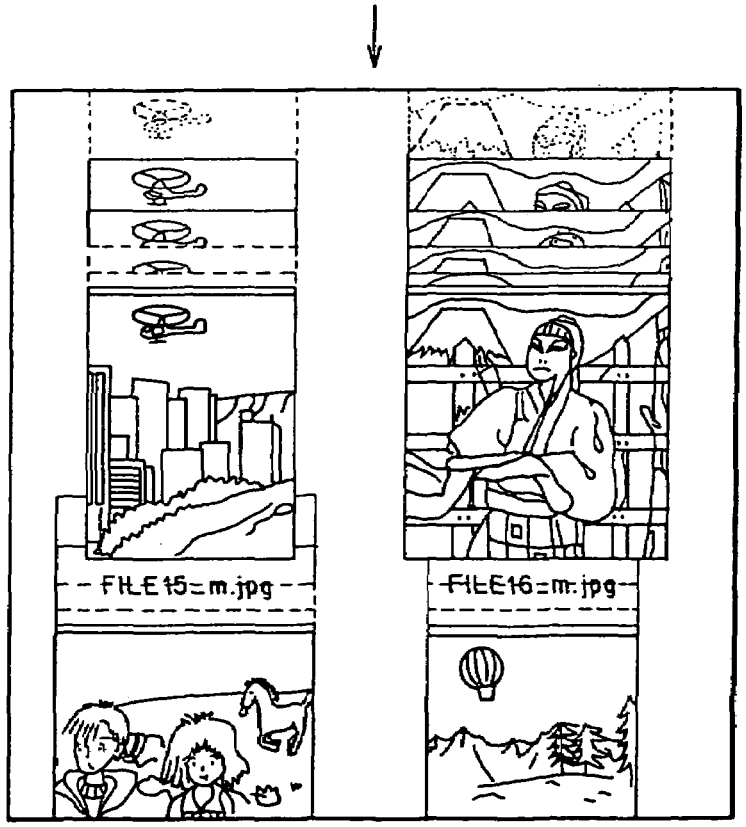
DRAW EACH
THUMBNAIL
OVER F I G. 46
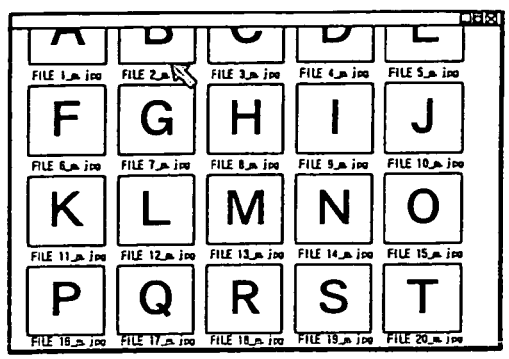
F I G. 47
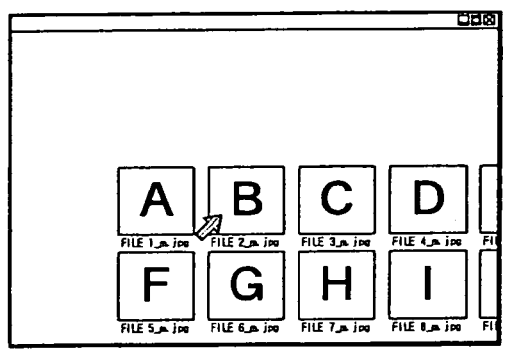
F I G. 48
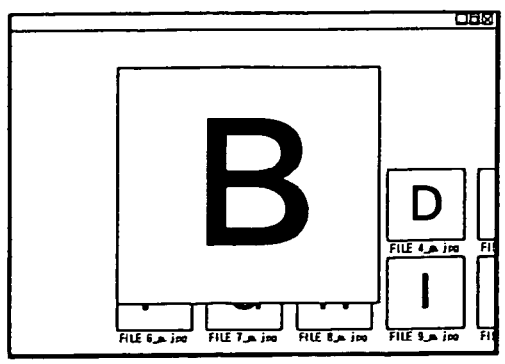

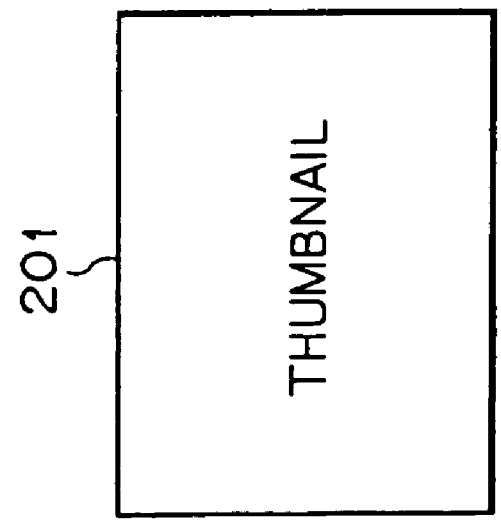
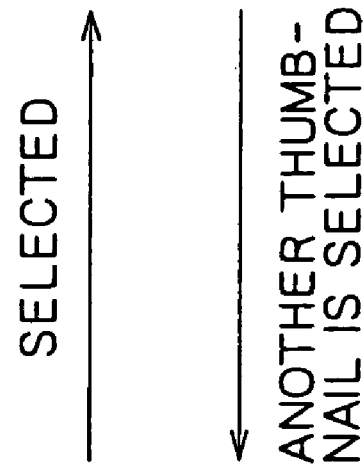
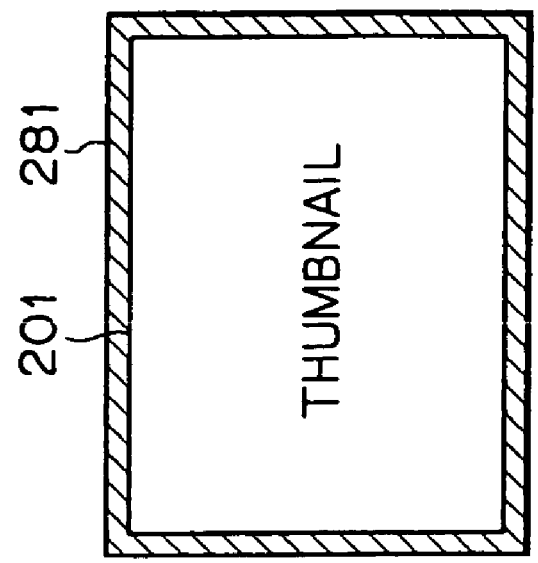
FIG. 51

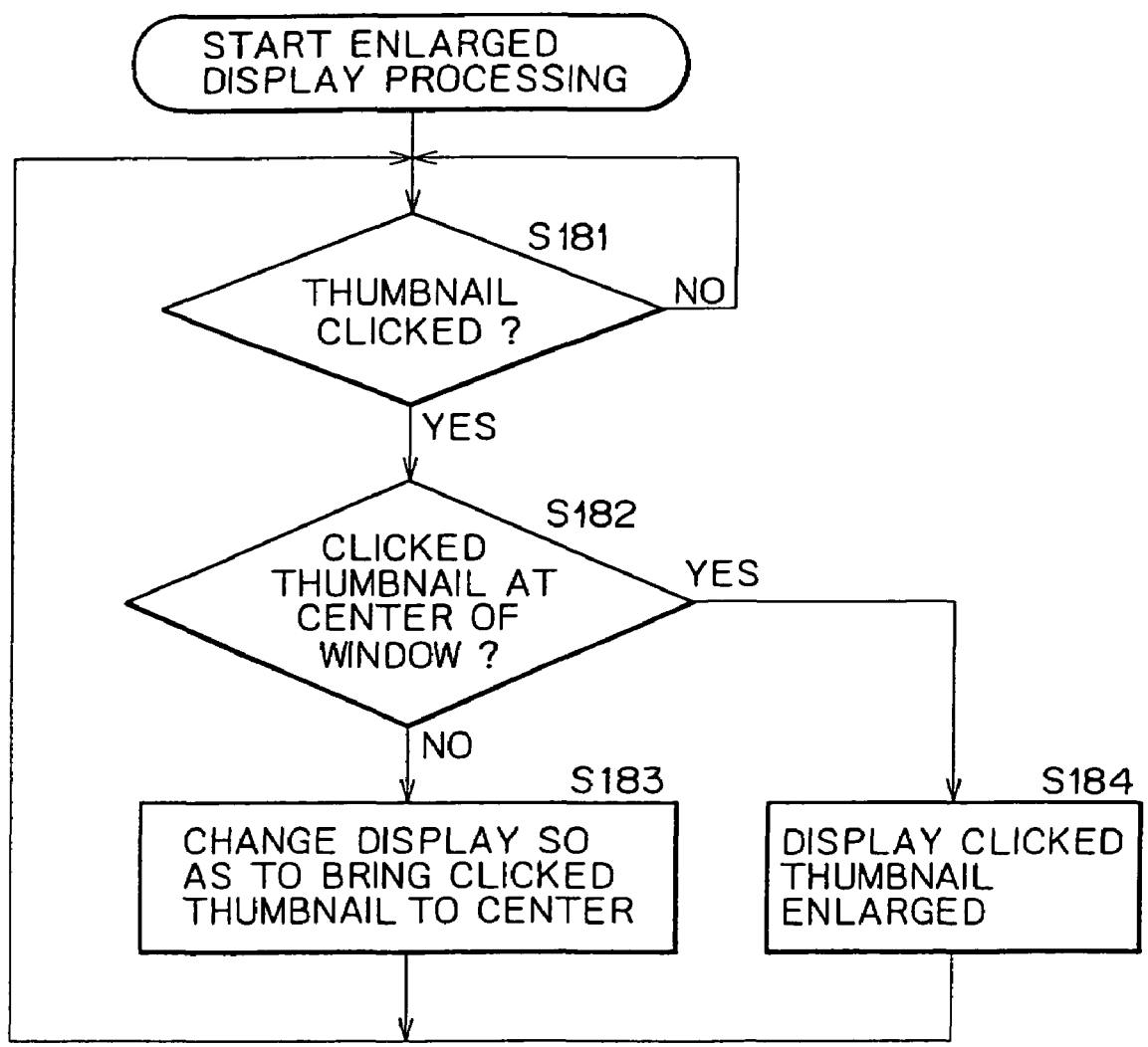
F I G. 68

METHOD AND APPARATUS FOR DISPLAYING INFORMATION AND PROGRAM AND MEDIUM USED THEREFOR

BACKGROUND OF THE INVENTION

The present invention relates to a method and an apparatus for displaying information, and a program and a program storage medium used therefore, and particularly to a method and an apparatus for displaying thumbnails corresponding to data, and a program and a program storage medium used therefore.

Technologies are currently available with personal computers for example in which a thumbnail which corresponds to still picture or moving picture data is displayed for a personal computer user to select these data by means of the thumbnail to manipulate the selected data.

However, a problem with the prior art is that the personal computers in which a thumbnail is displayed for data manipulation can manipulate only data including images, not data including no image.

SUMMARY OF THE INVENTION

It is therefore an object of the present invention to provide an information processing apparatus and method and a program storage medium which are capable of displaying a thumbnail for data including no image to manipulate both of data including images and data including no image together.

To achieve the above object, according to a first aspect of the present invention, there is provided a displaying method of displaying image information corresponding to a desired data file in a specific display area, including the steps of: dividing the specific display area into a first number of areas; and displaying each of the divided areas in a mode corresponding to contents of the desired data file.

According to a second aspect of the present invention, there is provided a displaying apparatus for displaying image information corresponding to a desired data file in a specific display area, including: means for dividing the specific display area into a first number of areas; and means for displaying each of the divided areas in a mode corresponding to contents of the desired data file.

According to a third aspect of the present invention, there is provided a medium for storing a program for displaying image information corresponding to a desired data file in a specific display area, the program including the steps of: dividing the specific display area into a first number of areas; and displaying each of the divided areas in a mode corresponding to contents of the desired data file.

According to a fourth aspect of the present invention, there is provided a computer readable program for displaying image information corresponding to a desired data file in a specific display area, including the steps of: dividing the specific display area into a first number of areas; and displaying each of the divided areas in a mode corresponding to contents of the desired data file.

In the above-described method, apparatus, medium and program of the present invention, the mode corresponding to contents of the desired data file is preferably determined by changing lightness or saturation of one or a plurality of pixels in each of the divided areas on the basis of the contents of the desired data file; and the lightness or saturation of one or a plurality of pixels in each of the divided areas is preferably changed by taking unit data quantities of the data file as data values of red, green and blue dots of the one or a plurality of pixels in each of the divided areas. Also, the first number is preferably a number changed depending on the size of the data file and the first number is preferably a number changed in proportion to the size of the data file; and the desired data file is preferably an audio file, or a text file.

Further, in the above-described method, apparatus, medium and program of the present invention, boundaries among the divided areas are preferably blurred after the lightness or saturation of one or a plurality of pixels in each of the divided areas is changed; and all or part of the contents of the text file is preferably displayed in the form of text in such a manner as to be overlapped to the image information.

BRIEF DESCRIPTION OF THE DRAWINGS

FIG. 10 is a diagram illustrating a thumbnail corresponding to voice data;

FIG. 12 is a diagram illustrating thumbnail examples for displaying images corresponding to voice data;

FIG. 13 is a diagram illustrating a thumbnail example for displaying an image corresponding to text data;

FIG. 16 is a diagram illustrating axes;

FIGS. 17A to 17F are diagrams illustrating a line view;

FIG. 26 is a diagram illustrating the movement of an icon;

FIG. 29 is a diagram illustrating after-image processing;

FIG. 46 is a diagram illustrating the selection of a thumbnail;

FIG. 47 is a diagram illustrating the selection of the thumbnail;

FIG. 48 is a diagram illustrating an enlarged display;

FIG. 51 is a diagram illustrating a display of a frame;

FIG. 68 is a flowchart describing the processing of enlarged display;

DETAILED DESCRIPTION OF THE PREFERRED EMBODIMENTS

Figure 1:
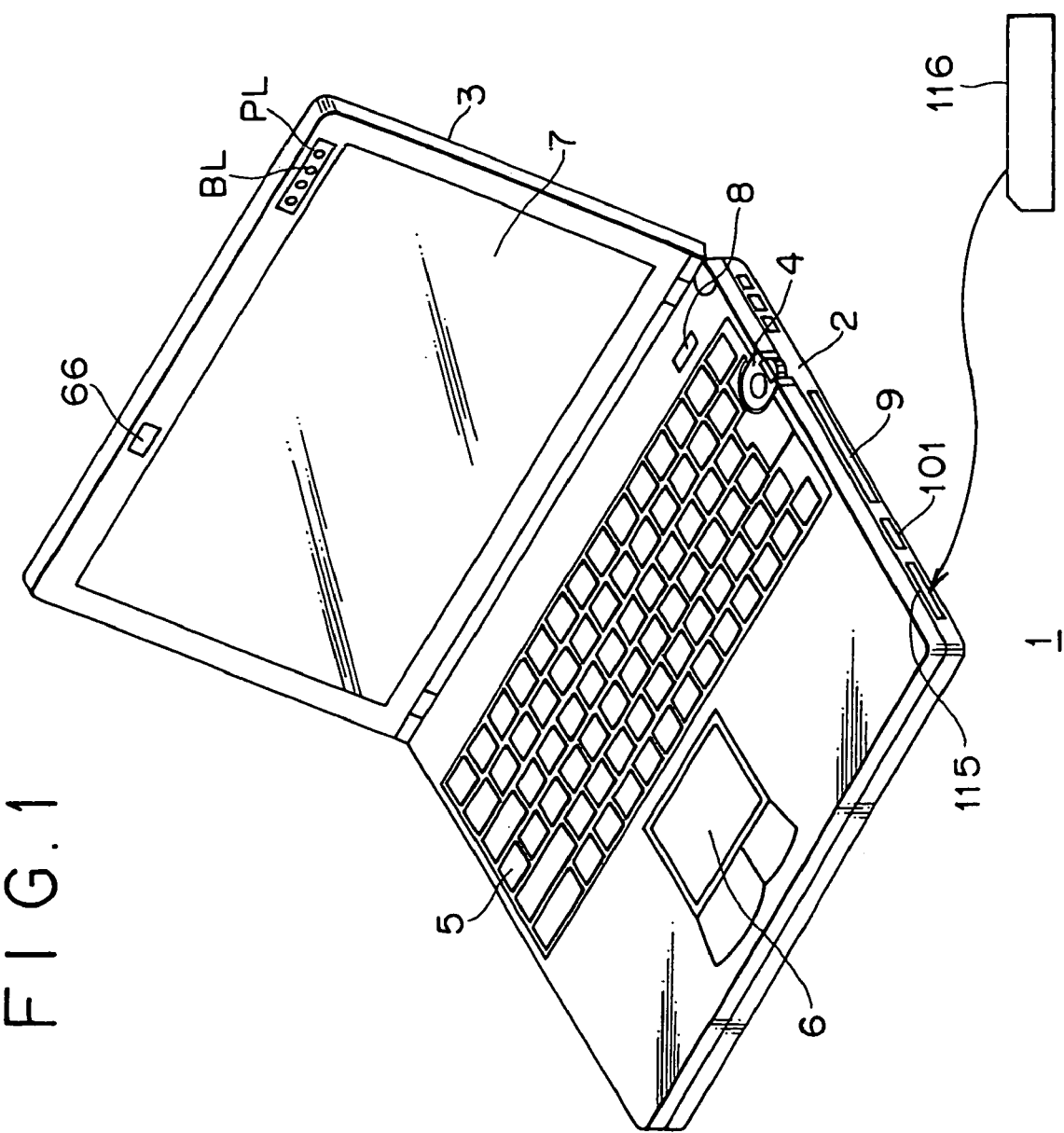
FIG. 1 is a perspective view illustrating an external view of a note-size personal computer practiced as one embodiment of the invention.
Figure 2:
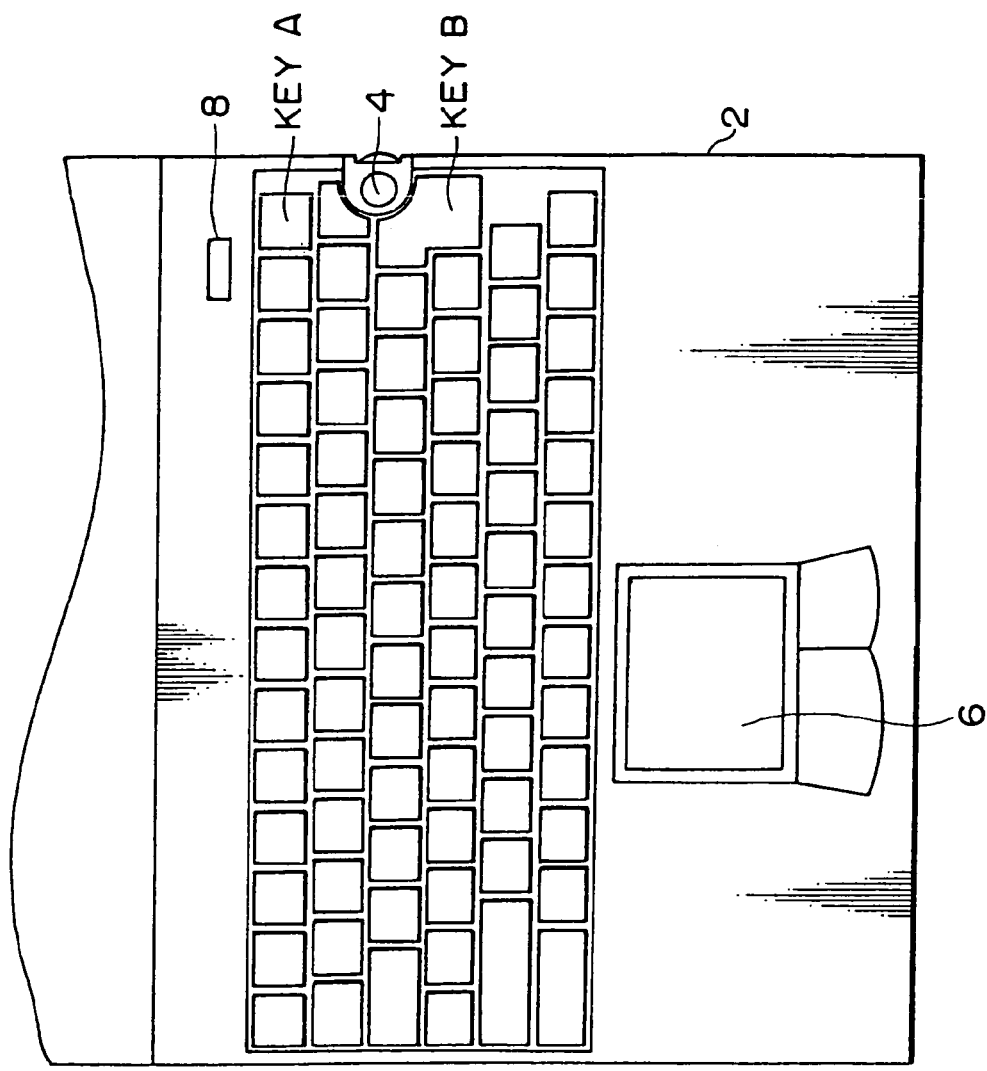
FIG. 2 is a top view of a main body.
Figure 3:
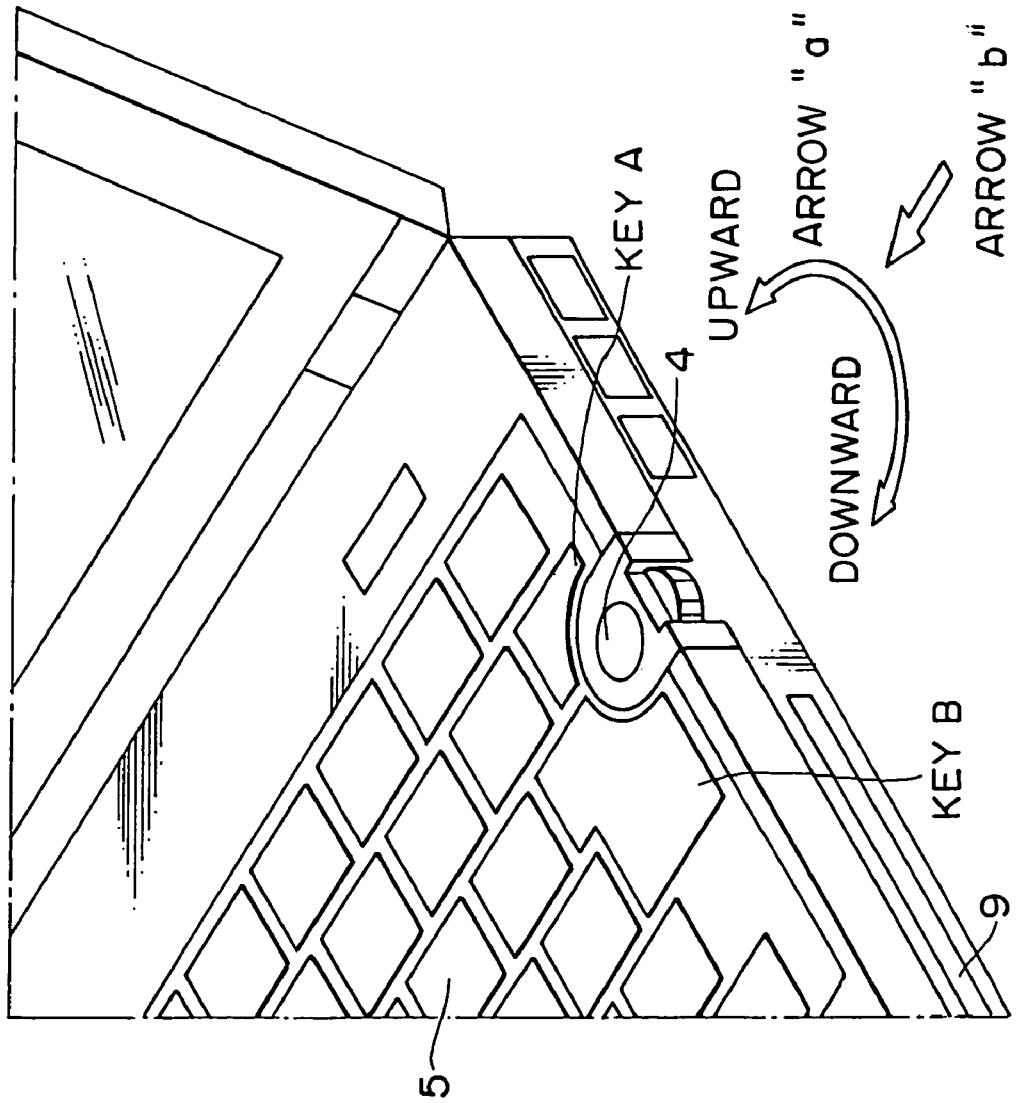
FIG. 3 is an enlarged view of a jog dial.
Figure 4:
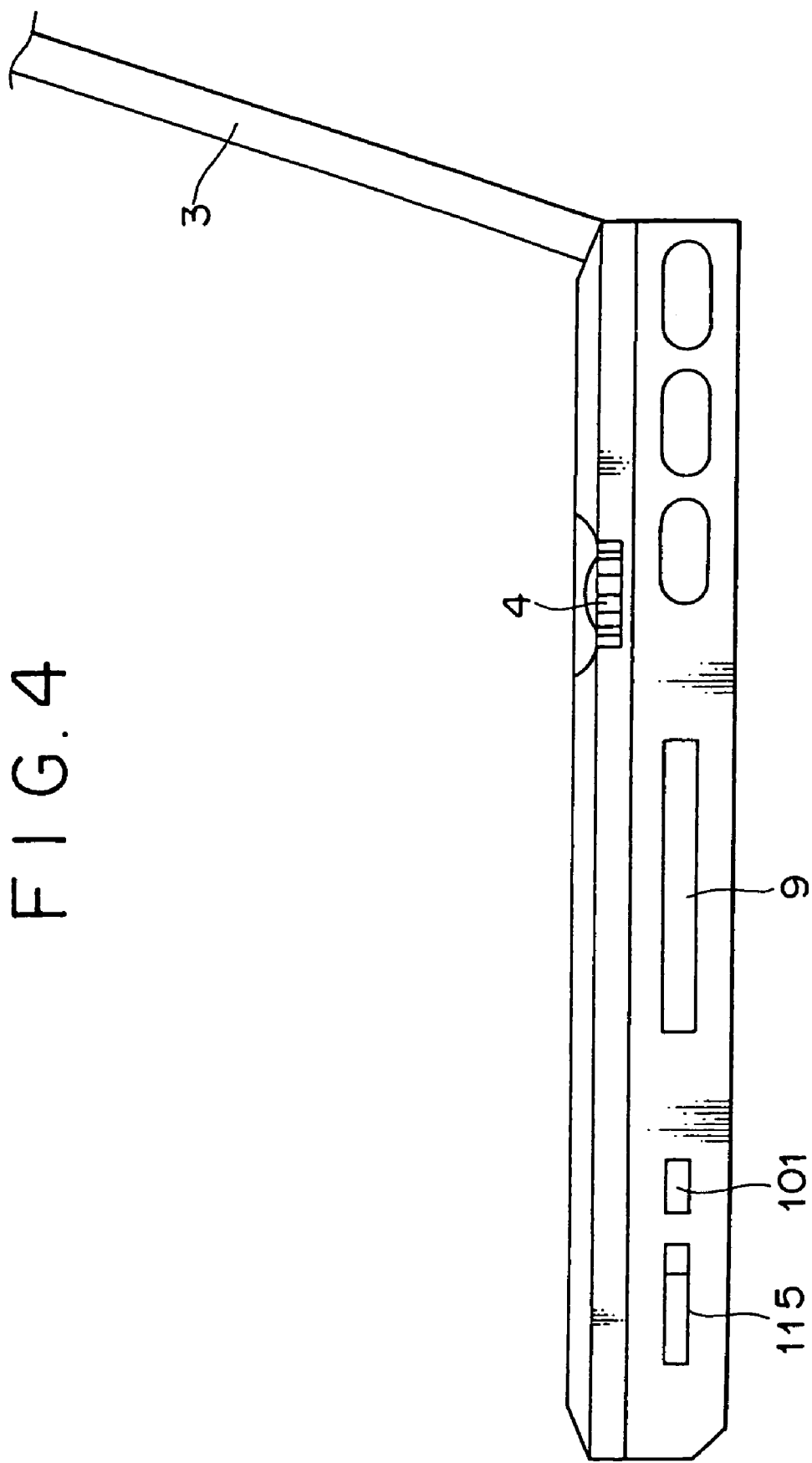
FIG. 4 is a side view of the personal computer.

FIGS. 1 through 4 show external views of a note-size personal computer practiced as one embodiment of the present invention. A personal computer 1 is basically composed of a main body 2 and a display section 3 pivotally attached to the main body 2. FIG. 1 is an external perspective view of the personal computer 1 with the display section 3 open relative to the main body 2. FIG. 2 is a top view of the main body 2. FIG. 3 is an enlarged view of a jog dial 4 to be described later arranged on the main body 2. FIG. 4 is a side view of the jog dial 4 arranged on the main body 2.

The main body 2 is arranged, on its top side, with a keyboard 5 which is operated to enter various characters and symbols, a touch pad 6, which is a pointing device for use in moving a pointer (or mouse cursor) displayed on an LCD 7, and a power switch 8. On one side of the main body 2, the jog dial 4, a slot 9, an IEEE 1394 port 101, a memory stick slot 115, etc. are arranged. It is practical to arrange a stick-type pointing device instead of the touch pad 6.

On the front surface of the display section 3, the LCD (Liquid Crystal Display) 7 for displaying images is arranged. In the upper right corner of the display section 3, such LED lights as a power light PL, a battery light BL, and, as required, a message light (not shown) are arranged. A microphone 66 is arranged at the upper edge of the display 3.

The power light PL, the battery light BL, and the message light ML may be arranged at the lower edge of the display 3.

The jog dial 4 is mounted so that it comes between key A and key B arranged on the right side of the keyboard 5 shown in FIG. 2 of the main body 2, the top surface of the jog dial 4 being approximately flush with the top surfaces of these keys. The jog dial 4 is operated in the direction indicated by arrow "a" shown in FIG. 3 to execute a predetermined process (for example, a display screen scrolling process) and in the direction indicated by arrow "b" to execute another predetermined process (for example, an icon selection enter process).

The jog dial 4 may be arranged on the left side of the main body 2. The jog dial 4 may also be arranged on the left or right face of the display 3 with the LCD 7 arranged or vertically between G key and H Key of the keyboard 5 (so that the jog dial 4 is rotatable in the directions parallel to Y key and B key).

The jog dial 4 may be arranged in a central portion of the front face of the main body 2 so that the user can operate the jog dial 4 with the thumb while operating the touch pad with the index finger. The jog dial 4 may also be arranged horizontally along the upper rim or the lower rim of the touch pad 6 or vertically between the left and right buttons of the touch pad 6. The jog dial 4 may also be arranged not vertically or horizontally but diagonally at which angle is easy for the operator to rotate the jog dial 4. The jog dial 4 may be arranged at the side of the mouse, a pointing device, at which the user can operate the jog dial 4 with the thumb. For the jog dial 4, a rotary electronic device with a push switch disclosed in Japanese Patent Laid-open No. Hei 8-203387 for example.

The slot 9 accommodates a PC card, which is an extension card compliant with PCMCIA (Personal Computer Memory Card International Association).

The IEEE (Institute of Electrical and Electronics Engineers) 1394 port 101 has a construction compliant with the IEEE 1394 standard and is connected to a cable compliant with the IEEE 1394 standard.

The memory stick slot 115 accommodates a Memory Stick (trade mark) 116 based on a semiconductor memory such as a flash memory which stores still picture, moving picture, audio data, or text data.

Figure 5:
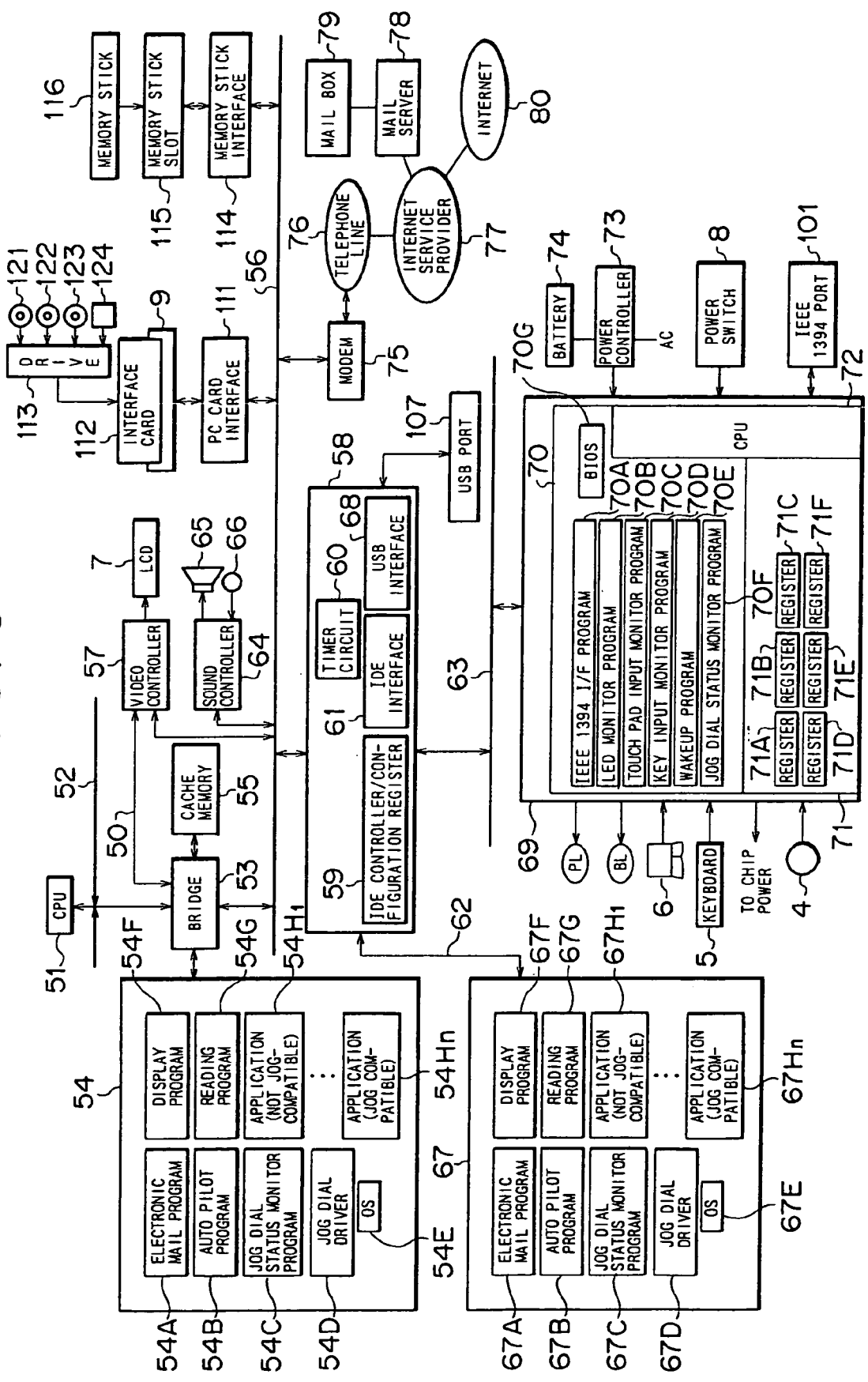
FIG. 5 is a diagram illustrating one embodiment of the personal computer.

The following describes the configuration of one embodiment of the personal computer 1 with reference to FIG. 5.

A central processing unit (CPU) 51 is a Pentium (trademark) processor of Intel Corporation for example and is connected to a host bus 52. The host bus 52 is connected to a bridge 53 (a so-called north bridge). The bridge 53 has an AGP (Accelerated Graphics Port) 50 and is connected to a PCI (Peripheral Component Interconnect/Interface) bus 56.

The bridge 53 is the 400BX, which is the AGP host bridge controller of Intel Corporation, for example, and controls the data transmission associated with the CPU 51 and a RAM (Random Access Memory) 54 (a so-called main memory). In addition, the bridge 53 controls the transmission of data with a video controller 57 via the AGP 50. It should be noted that the bridge 53 and a bridge 58 (a so-called south bridge (PCI-ISA Bridge)) constitute a so-called chipset.

The bridge 53 is also connected to a cache memory 55. The cache memory 55 is based on a memory chip which is faster in access than the RAM 54 based on an SRAM (Static RAM), thereby caching (namely temporarily storing) the programs and data to be used by the CPU 51.

It should be noted that the CPU 51 incorporates a primary cache memory (which operates faster than the cache memory 55 and is controlled by the CPU 51 itself).

The RAM 54, based on a DRAM (Dynamic RAM) for example, stores the programs to be executed by the CPU 51 and the data necessary for the CPU 51 to operate. To be more specific, the RAM 54 stores, upon completion of a bootup sequence of the personal computer 1, an electronic mail program 54A, an auto pilot program 54B, a jog dial status monitor program 54C, a jog dial driver 54D, an operating system (OS) 54E, a display program 54F, a reading program 54G, and other application programs 54H1 through 54Hn loaded from a HDD 67.

It should be noted that the display program 54F and the reading program 54G may be adapted to start when the memory stick 116 is loaded into the memory stick slot 115.

The electronic mail program 54A transfers communication text (so-called e-mail) over a communication line such as a telephone line 76 via a modem 75. The electronic mail program 54A has a incoming mail capture capability. This incoming mail capture capability checks to see if a mail addressed to the user has arrived in a mail box 79 of a mail server 78 of an Internet service provider 77 and, if such a mail is found, executes a mail capture process.

The auto pilot program 54B sequentially starts plural predetermined processes (or programs) in a predetermined order.

The jog dial status monitor program 54C receives the information from each of the above-mentioned application programs indicative of whether it complies with the jog dial 4. If the compliance is found, this program displays on the LCD 7 what can be done by operating the jog dial 4.

The jog dial status monitor program 54C detects a jog dial event (the rotation of the jog dial 4 in the direction of arrow "a" or the pressing in the direction of arrow "b" for example) and executes a process corresponding to the detected event. The jog dial status monitor program 54C has a list for receiving the notifications from application programs. The jog dial driver 54D executes various capabilities in accordance with the operations of the jog dial 4.

The OS (Operating System) 54E is a program, typically Windows 95 (trade mark) or Windows 98 (trade mark) of Microsoft Corporation or Mac OS (trademark) of Apple Computer for example, which controls the basic operations of the computer.

The display program 54F displays on the LCD 7 a thumbnail corresponding to a file (storing data such as moving picture, still picture, audio data, or text data (hereafter also referred to as content) stored in the memory stick 116 loaded in the memory stick slot 115. Referring to the thumbnail displayed on the LCD 7, the display program 54F operates (copies, moves, or deletes for example) a file stored in the memory stick 116.

The reading program 54G reads a file from the memory stick loaded in the memory stick slot 115 and supplies the data stored in the file to the display program 54F.

The video controller 57 is connected to the bridge 53 via the AGP 50 and receives data (image data or text data for example) from the CPU 51 via the AGP 50 and the bridge 53 to generate the image data corresponding to the received data or stores the received data without change into an incorporated video memory. The video controller 57 displays on the LCD 7 of he display section 3 an image corresponding to the image data stored in the video memory.

The PCI bus 56 is connected to a sound controller 64. The sound controller 64 captures a signal representing a voice inputted from the microphone 66, generates a corresponding audio data, and outputs the audio data to the RAM 54. Also, the sound controller 64 drives a speaker 65 to sound audio data therefrom.

The PCI bus 56 is also connected to the modem 75. The modem 75 sends predetermined data to a communication network 80 such as the Internet or the mail server 78 through a telephone line 76 and the Internet service provider 77 and receives predetermined data from the communication network 80 or the mail server 78.

The PC card interface 111, connected to the PCI bus 56, supplies the data from an interface card 112 loaded in the slot 9 to the CPU 51 or the RAM 54 and outputs the data supplied from the CPU 51 to the interface card 112. A drive 113 is connected to the PCI bus 56 via the PC card interface 111 and the interface card 112.

The drive 113 reads data from a magnetic disc 121, an optical disc 122, a magneto-optical disc 123, a semiconductor memory 124 loaded in the drive 113 and supplies the data to the RAM 54 via the PC card interface 111, the interface card 112, and the PCI bus 56.

The memory stick interface 114, connected to the PCI bus 56, supplies the data from the memory stick 116 loaded in the memory stick slot 115 to the CPU 51 or the RAM 54 and outputs the data supplied from the CPU 51 to the memory stick 116.

The PCI bus is also connected to the bridge 58 (a so-called south bridge). The bridge 58 is based on the PIIX4 of Intel Corporation for example and incorporates an IDE (Integrated Drive Electronics) controller/configuration register 59, a timer circuit 60, an IDE interface 61, and a USB interface 68. The bridge 58 controls various I/O (Input/Output) operations such as control of a device connected to the IDE bus 62 or connected via an ISA/EIO (Industry Standard Architecture/Extended Input Output) bus 63 or an I/O interface 69.

The IDE controller/configuration register 59 is composed of two IDE controllers; a so-called primary IDE controller and a so-called secondary IDE controller and a configuration register (each not shown).

The primary IDE controller is connected to the HDD 67 via the IDE bus 62. The secondary IDE controller is electrically connected to so-called IDE devices such as a CD-ROM drive or a HDD both not shown when these IDE devices are connected to another IDE bus.

The HDD 67 stores an electronic mail program 67A, an auto pilot program 67B, a jog dial status monitor program 67C, a jog dial driver 67D, an OS 67E, application programs such as a display program 67F and a reading program 67G and others 67H1 through 67Hn. The electronic mail program 67A, the auto pilot program 67B, the jog dial status monitor program 67C, the jog dial driver 67D, the OS 67E, application programs such as the display program 67F and the reading program 67G and others 67H1 through 67Hn stored in the HDD 67 are sequentially supplied and loaded into the RAM 54 in a bootup sequence for example.

The USB interface 68 sends data to a device connected via a USB port 107 and receives data from the device.

The timer circuit 60 supplies the data indicative of current time upon request by the display program 67F to the CPU 51 via the PCI bus 56. Referring to the current time data supplied from the timer circuit 60, the display program 67F can know an elapsed time for example.

The ISA/EIO bus 63 is also connected to the I/O interface 69. In the I/O interface 69, constituted by an embedded controller, a ROM 70, a RAM 71, and a CPU 72 are interconnected.

The ROM 70 stores an IEEE 1394 interface program 70A, a LED control program 70B, a touch pad input monitor program 70C, a key input monitor program 70D, a wakeup program 70E, and a jog dial status monitor program 70F in advance.

The IEEE 1394 interface program 70A sends and receives data (the data stored in packet) compliant with the IEEE 1394 standard via the IEEE 1394 port 101. The LED control program 70B controls the turn-on/off of the power light PL, the battery light BL, the message light ML as required, and other LED lights. The touch pad input monitor program 70C monitors the input made by the user from the touch pad 6.

The key input monitor program 70D monitors the input made by the user from the keyboard 5 or other key switches. The wakeup program 70E, which executes power management on each chip constituting the personal computer 1, checks, on the basis of the current time data supplied from the timer circuit 60 of the bridge 58, whether a predetermined time has been reached and, when the predetermined has been reached, starts a predetermined process (or a program). The jog dial status monitor program 70F always monitors whether the rotary encoder of the jog dial 4 has been operated or the jog dial 4 itself has been pushed.

The ROM 70 also stores a BIOS (Basic Input/Output System) 70G. The BIOS 70G controls data transfer (input/output) between the OS or an application program and peripheral devices (the touch pad 6, the keyboard 5, the HDD 67, etc.).

The RAM 71 stores registers 71A through 71F, namely a LED control register, a touch pad input status register, a key input status register, a setting time register, a jog dial status monitor I/O register, and an IEEE 1394 I/F register. For example, the LED control register holds a predetermine value when the jog dial 4 is pressed to start the electronic mail program 54A, thereby controlling the turn-on of the message light ML in accordance with the stored value. The key input status register holds a predetermined operated key flag when the jog dial 4 is pressed. The setting time register holds a predetermined time when the user operates the keyboard 5 for example.

The I/O interface 69 is connected to the jog dial 4, the touch pad 6, the keyboard 5, and the IEEE 1394 port 101 through the corresponding connectors, not shown, and outputs the signals corresponding to the operations made on these input devices to the ISA/EIO bus 63. Also, the I/O interface 69 controls the transfer of data with the devices connected via the IEEE 1394 port 101. The I/O interface 69 is also connected to the power light PL, the battery light BL, the message light ML, a power control circuit 73, and other LED lights.

The power control circuit 73, connected to an incorporated battery 74 or an AC power outlet, supplies power to each block constituting the personal computer and controls the charging of the incorporated battery 74 and a second battery of each peripheral device. The I/O interface 69 monitors the power switch 8 which turns on/off the power to the personal computer.

The I/O interface 69 executes the programs, the IEEE 1394 interface program 70A through the jog dial status monitor program 70F, on the internally supplied power if the externally supplied power is off. Namely, the programs, the IEEE 1394 interface program 70A through the jog dial status monitor program 70F, are always operating.

Therefore, if the power switch 8 is off and the CPU 51 is not executing the OS 54E, the I/O interface 69 executes the jog dial status monitor program 70F, so that, when the jog dial 4 is pressed in the power save mode or with the power being off, the personal computer 1 starts the processing of a predetermined software program or script file.

Thus, in the personal computer 1, the jog dial 4 has a programmable key (PPK) function, so that no dedicated key need be arranged.

Figure 6:
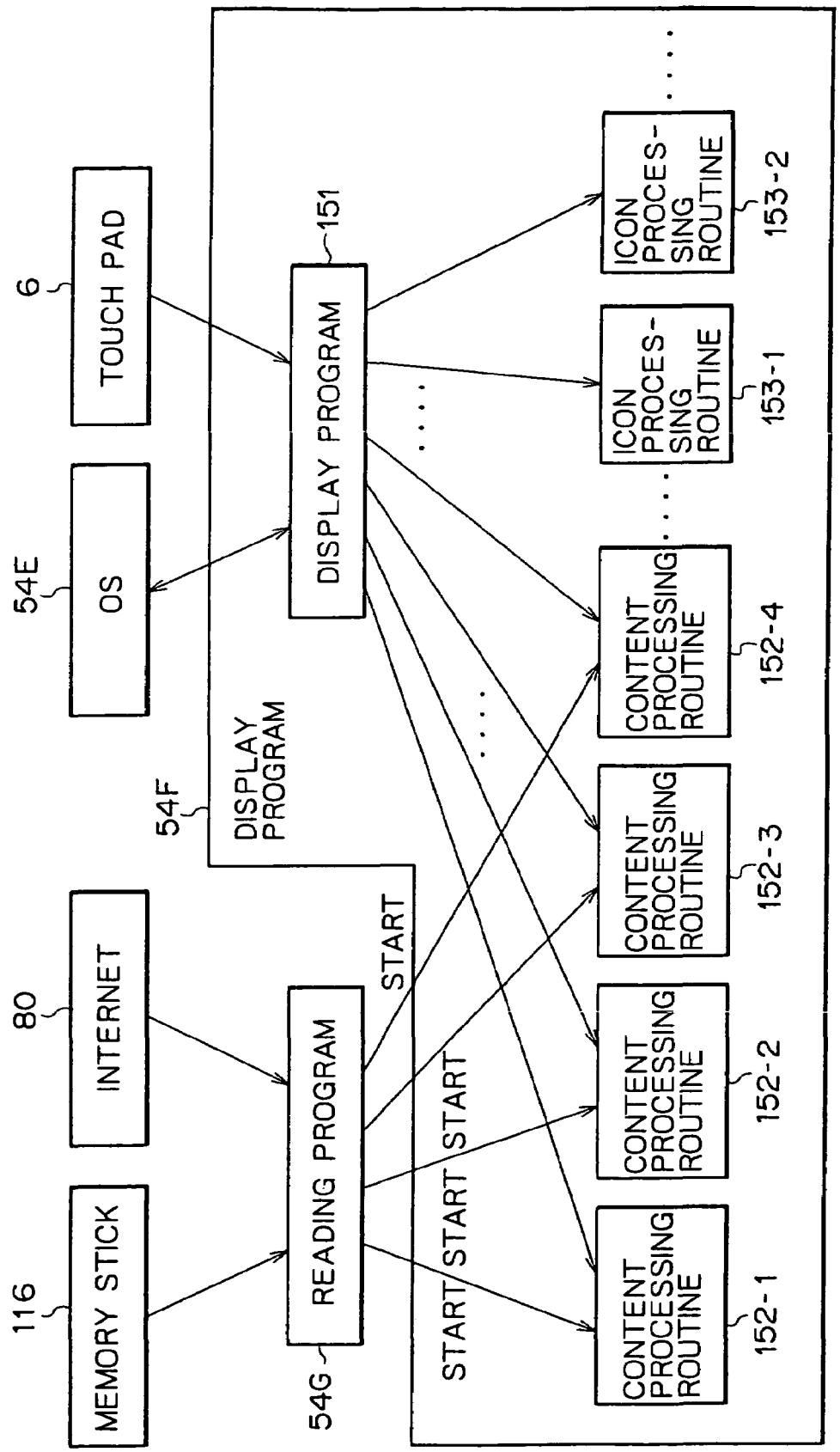
FIG. 6 is a diagram illustrating the configuration of a display program and a reading program.

FIG. 6 shows the configurations of the display program 54F and the reading program 54G to be executed by the personal computer 1. The display program 54F includes a processing manager 151, content processing routines 152-1 through 152-N, and icon processing routines 153-1 through 153-N.

The processing manager 151 computes, on the basis of an input event supplied from the touch pad 6 or the OS 54E, a position at which a thumbnail corresponding to a file read from the memory stick 116 is to be displayed and supplies a computation result to the content processing routines 152-1 through 152-N. The thumbnail display position to be supplied by the processing manager 151 to the content processing routines 152-1 through 152-N includes a depth (indicative of a virtual distance from the surface of the LCD 7, determining, when two or more thumbnails overlap, which one is to be displayed on top and the size of the displayed thumbnail for example) in addition to a horizontally and vertically defined position on the LCD 7.

The processing manager 151 controls the periods of thumbnail display of the content processing routines 152-1 through 152-N.

The processing manager 151 computes an icon display position for example on the basis of an input event supplied from the touch pad 6 or the OS 54E and supplies a computation result to the icon processing routines 153-1 through 153-N. The processing manager 151 controls the periods of icon display of the icon processing routines 153-1 through 153-N.

The processing manager 151 sends display status information (thumbnail display position, display period, and image color) to the content processing routines 152-1 through 152-N on the basis of an input event for example supplied from the touch pad 6 or the OS 54E.

In response to an input from the touch pad 6 for example, the processing manager 151 requests the OS 54E for copy, deletion, or transfer of the files corresponding to the thumbnails displayed by the content processing routines 152-1 through 152-N.

In response to a request from the reading program 54G, the content processing routines 152-1 through 152-N are started in the number corresponding to the number of files read from the memory stick 116.

For example, when 4 files have been read by the reading program 54G from the memory stick 116, the reading program 54G starts the content processing routines 152-1 through 152-4. For example again, if 8 files have been read by the reading program 54G from the memory stick 116, the reading program 54G requests the starting of the content processing routines 152-1 through 152-8.

Thus, the number of content processing routines 152-1 through 152-N corresponding to the number of files read by the reading program 54G from the memory stick 116 are started. Actually, the display program 54F repeats the execution of one routine by a predetermined number of times. Therefore, it appears that plural content processing routines 152-1 through 152-N are running.

The content processing routine 152-1 displays one thumbnail corresponding to one file read from the memory stick 116 onto the LCD 7 as instructed by the processing manager 151. The content processing routine 152-2 displays another thumbnail corresponding to another file read from the memory stick 116 onto the LCD 7 as instructed by the processing manager 151. Likewise, the content processing routines 152-3 through 152-N display thumbnails corresponding to files, one to one, read from the memory stick 116 onto the LCD 7 as instructed by the processing manager 151.

Thus, each of the content processing routines 152-3 through 152-N displays one thumbnail as instructed by the processing manager 151 on the LCD 7.

The icon processing routines 153-1 through 153-N are started in the number corresponding to the number of icons to be described later.

The icon processing routine 153-1 displays one icon onto the LCD 7 as instructed by the processing manager 151. The icon processing routine 153-2 displays another icon onto the LCD 7 as instructed by the processing manager 151. Likewise, the icon processing routines 153-3 through 153-N display different icons onto the LCD 7 as instructed by the processing manager 151.

Thus, the each of the icon processing routines 153-1 through 153-N displays one icon onto the LCD 7 as instructed by the processing manager 151.

When one file has been read from the memory stick 116, the reading program 54G starts one of the content processing routines 152-1 through 152-N and supplies the data stored in that file to one started content processing routine of the content processing routines 152-1 through 152-N.

When a file has been read from the communication network 80 such as the Internet, the reading program 54G may start one of the content processing routines 152-1 through 152-N and supply the data stored in that file to one started content processing routine of the content processing routines 152-1 through 152-N.

In what follows, if there is no need to make distinction between the content processing routines 152-1 through 152-N, the content processing routines are generically referred to simply as the content processing routine 152. It should be noted that the content processing routines 152-1 through 152-N may be executed as different tasks which run concurrently with each other. In what follows, if there is no need to make distinction between the icon processing routines 153-1 through 153-N, the icon processing routines are generically referred to simply as the icon processing routine 153.

The following sequentially describes the screens to be displayed by the display program 54F onto the LCD 7 in correspondence to the operations executed by the personal computer 1 which are assumed as normal operations.

Figure 7:
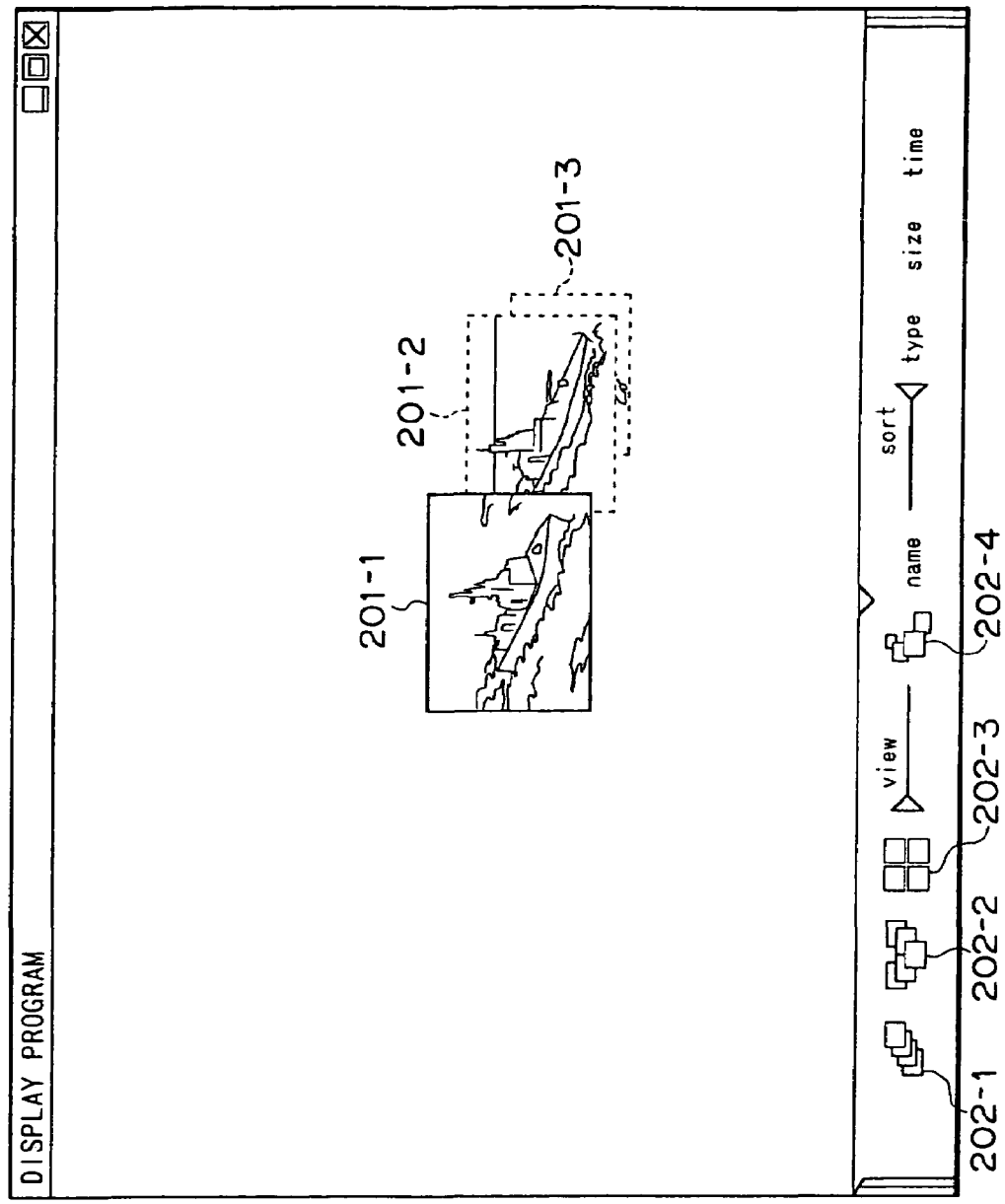
FIG. 7 is a diagram illustrating a screen displayed on an LCD.
Figure 8:
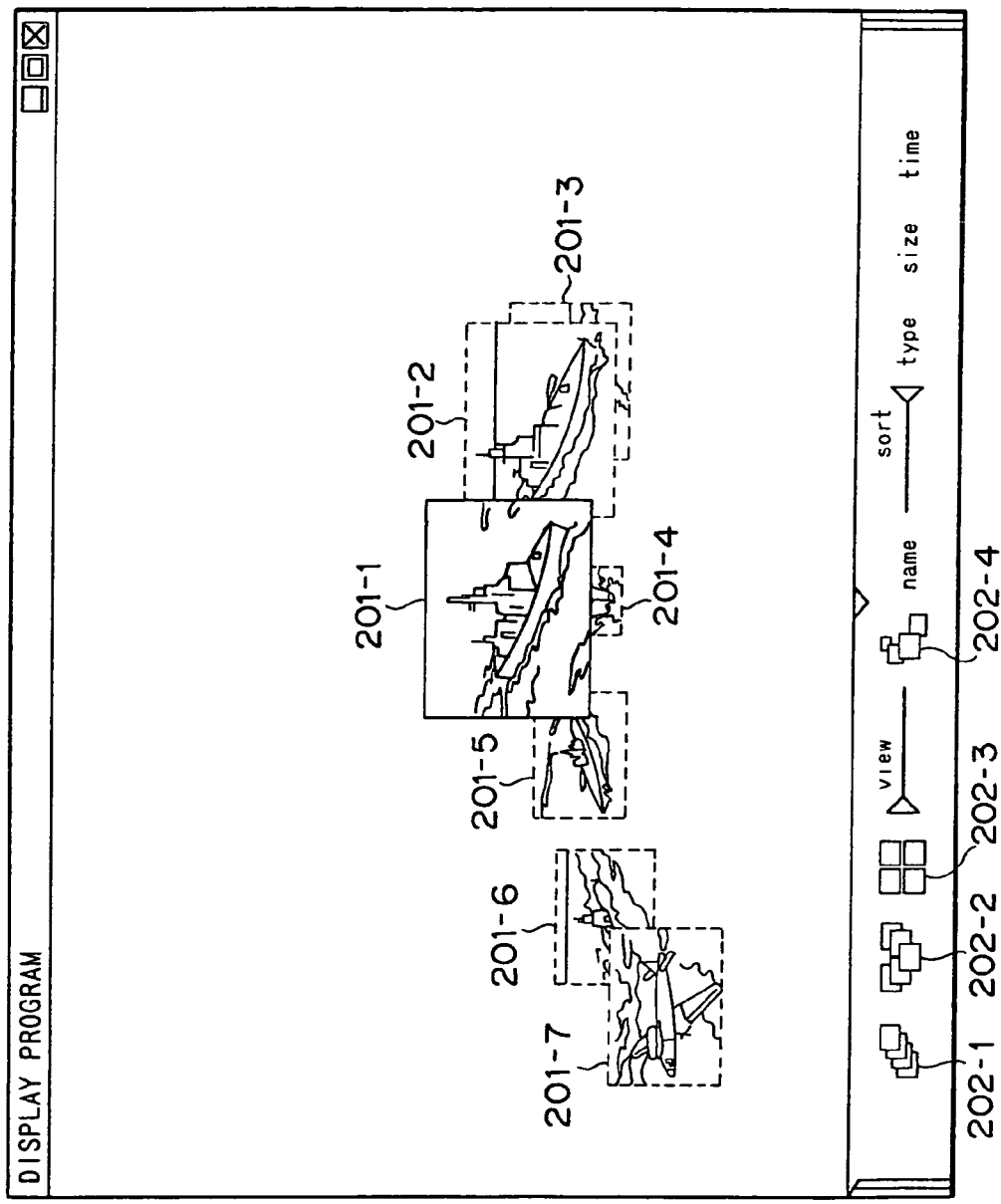
FIG. 8 is a diagram illustrating a screen displayed on the LCD.
Figure 9:
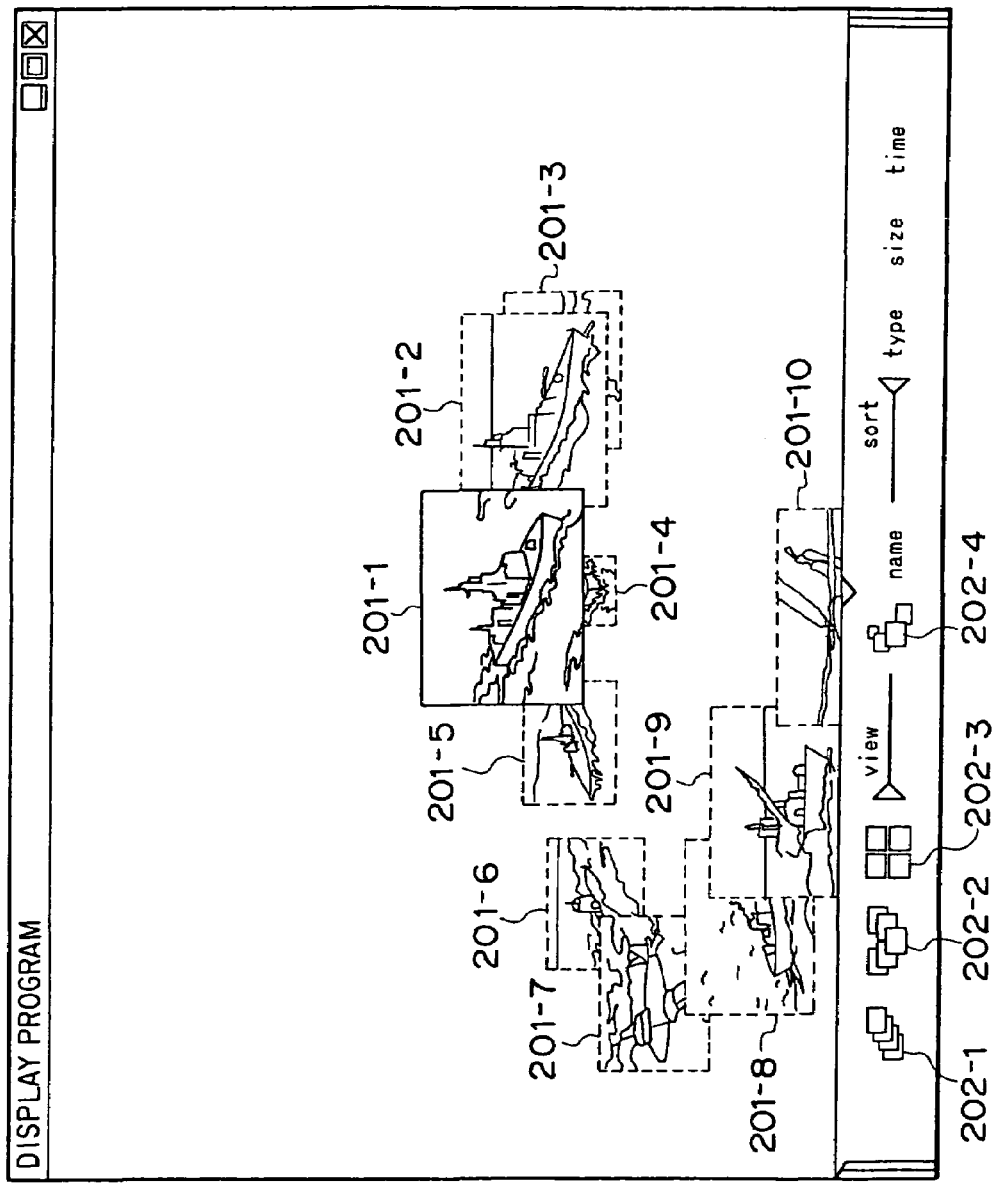
FIG. 9 is a diagram illustrating a screen displayed on the LCD.

FIGS. 7 through 9 shows the screens to be displayed on the LCD 7 when the memory stick 116 storing 10 files for example is loaded in the memory stick slot 115 and the display program 54F is started.

When the reading program 54G reads one file from the memory stick 116, starts one content processing routine 152 and the display program 54F displays a thumbnail corresponding to the data stored in the file read.

FIG. 7 shows an exemplary screen to be displayed by the display program 54F onto the LCD 7 when 3 files of the 10 files stored in the memory stick 116 have been read by the reading program 54G after starting of the display program 54F.

A thumbnail 201-1 is displayed by the content processing routine 152-1 and is constituted by an image corresponding to the data stored in the file read first by the reading program 54G from the memory stick 116. A thumbnail 201-2 is displayed by the content processing routine 152-2 and is constituted by an image corresponding to the data stored in the file read second by the reading program 54G from the memory stick 116. A thumbnail 201-3 is displayed by the content processing routine 152-3 and is constituted by an image corresponding to the data stored in the file read third by the reading program 54G from the memory stick 116.

As described later, the thumbnails 201-1 through 201-3 are arranged along a virtually spiral. In what follows, unless it is necessary to make distinction between the thumbnails 201-1 through 201-N, they are generically referred to simply as the thumbnail 201.

The content processing routine 152 generates the thumbnail 201 in accordance with the type of the data supplied from the reading program 54G.

For example, receiving moving image data from the reading program 54G, the content processing routine 152 generates the thumbnail 201 on the basis of the first image of the moving image data.

Receiving still image data of TIFF (Tag Image File Format) or GIF (Graphic Interchange Format), the content processing routine 152 generates the thumbnail 201 from the still image data. Receiving still image data of JPEG (Joint Photographic Experts Group), the content processing routine 152 uses the thumbnail data stored in the header of the received data.

Receiving audio or text data from the reading program 54G, the content processing routine 152 generates an image from the received audio or text data and uses the generated image as the thumbnail 201. The processing by the content processing routine 152 of generating an image as the thumbnail 201 on the basis of audio or text data will be described later.

Icons for specifying the arrangement of the thumbnails 201 are displayed in the bottom of the screen displayed by the display program 54F onto the LCD 7. An icon 202-1 instructs the display program 54F to arrange the thumbnails 201 on a virtually straight line. An icon 202-2 instructs the display program 54F to arrange the thumbnails 201 around a virtual true circle or ellipse. An icon 202-3 instructs the display program 54F to arrange the thumbnails 201 in a lattice manner. An icon 202-4 instructs the display program 54F to arrange the thumbnails 201 along a virtual spiral.

Because the icon 202-4 is selected and arranged at lower center of the screen, the display program 54F arranges the thumbnails 201-1 through 201-3 along a virtual spiral. In what follows, unless it is necessary to make distinction between the icons 202-1 through 202-4, they are generically referred to simply as the icon 202.

When such processes for the files corresponding to the thumbnails 201-1 through 201-3 as enlarge, reproduce, attribute information display, copy, delete, and transfer are requested by the user from the jog dial 4, the keyboard 5, or the touch pad 6, the display program 54F executes the requested processing on the files corresponding to the thumbnails 201-1 through 201-3. For example, if the request comes from the touch pad 6, the processing manager 151 requests the OS 54E to execute a copy, delete, or transfer operation on the files corresponding to the thumbnails 201-1 through 201-3.

FIG. 8 shows an exemplary screen to be displayed by the display program 54G onto the LCD 7 when 7 files of the 10 files stored in the memory stick 116 have been read by the reading program 54G after starting of the display program 54F.

The thumbnail 201-4 is displayed by the content processing routine 152-4 and is constituted by an image corresponding to the data contained in the file read fourth by the reading program 54G from the memory stick 116. The thumbnail 201-5 is displayed by the content processing routine 152-5 and is constituted by an image corresponding to the data contained in the file read fifth by the reading program 54G from the memory stick 116.

The thumbnail 201-6 is displayed by the content processing routine 152-6 and is constituted by an image corresponding to the data contained in the file read sixth by the reading program 54G from the memory stick 116. The thumbnail 201-7 is displayed by the content processing routine 152-7 and is constituted by an image corresponding to the data contained in the file read seventh by the reading program 54G from the memory stick 116.

The thumbnails 201-1 through 201-7 are arranged along a virtual spiral.

When such processes for the files corresponding to the thumbnails 201-1 through 201-7 as enlarge, reproduce, attribute information display, copy, delete, and transfer are requested by the user from the jog dial 4, the keyboard 5, or the touch pad 6, the display program 54F executes the requested processing on the files corresponding to the thumbnails 201-1 through 201-7. For example, if the request comes from the touch pad 6, the processing manager 151 requests the OS 54E to execute a copy, delete, or transfer operation on the files corresponding to the thumbnails 201-1 through 201-7.

FIG. 9 shows an exemplary screen to be displayed by the display program 54F onto the LCD 7 when all files have been read by the reading program 54G from the memory stick 116-after the starting of the display program 54F.

The thumbnail 201-8 is displayed by the content processing routine 152-8 and is constituted by an image corresponding to the data contained in the file read eighth by the reading program 54G from the memory stick 116. The thumbnail 201-9 is displayed by the content processing routine 152-9 and is constituted by an image corresponding to the data contained in the file read ninth by the reading program 54G from the memory stick 116. The thumbnail 201-10 is displayed by the content processing routine 152-10 and is constituted by an image corresponding to the data contained in the file read tenth by the reading program 54G from the memory stick 116.

The thumbnails 201-1 through 201-10 are arranged along a virtual spiral.

When such processes for the files corresponding to the thumbnails 201-1 through 201-10 as enlarge, reproduce, attribute information display, copy, delete, and transfer are requested by the user from the jog dial 4, the keyboard 5, or the touch pad 6, the display program 54F executes the requested processing on the files corresponding to the thumbnails 201-1 through 201-10. For example, if the request comes from the touch pad 6, the processing manager 151 requests the OS 54E to execute a copy, delete, or transfer operation on the files corresponding to the thumbnails 201-1 through 201-10.

Thus, when the reading program 54G reads files from the memory stick 116, the display program 54F sequentially displays the thumbnails 201 corresponding to the data contained in these files, so that the user of the personal computer 1 can know the contents of the files stored in the stick memory 116 and a file read state at that point of time.

When the reading program 54G reads files from the memory stick 116, the display program 54F executes a process requested at that point of time on the files.

If the reading of files is slow, the display program 54F sequentially displays the thumbnails 201 corresponding to the data contained in the files, so that the user can determine an operation to be executed next by referring to the displayed thumbnails 201.

The processes executable on the files corresponding to the thumbnails 201-1 through 201-3 shown in FIG. 7 are the same as those executable on the files corresponding to the thumbnails 201-1 through 201-7 shown in FIG. 8 and those executable on the files corresponding to the thumbnails 201-1 through 201-10 shown in FIG. 9.

The following describes the thumbnail 201 for displaying an image corresponding to audio or text data. Conventionally, as shown in the left side in FIG. 10, an icon representing a recorded voice is displayed. In this example, if there are plural pieces of voice data, corresponding icons having a same shape are displayed.

On the contrary, as shown in the right side of FIG. 10, the display program 54F generates an image corresponding to audio data or text data themselves and displays the generated image as the thumbnail 201.

Figure 11:
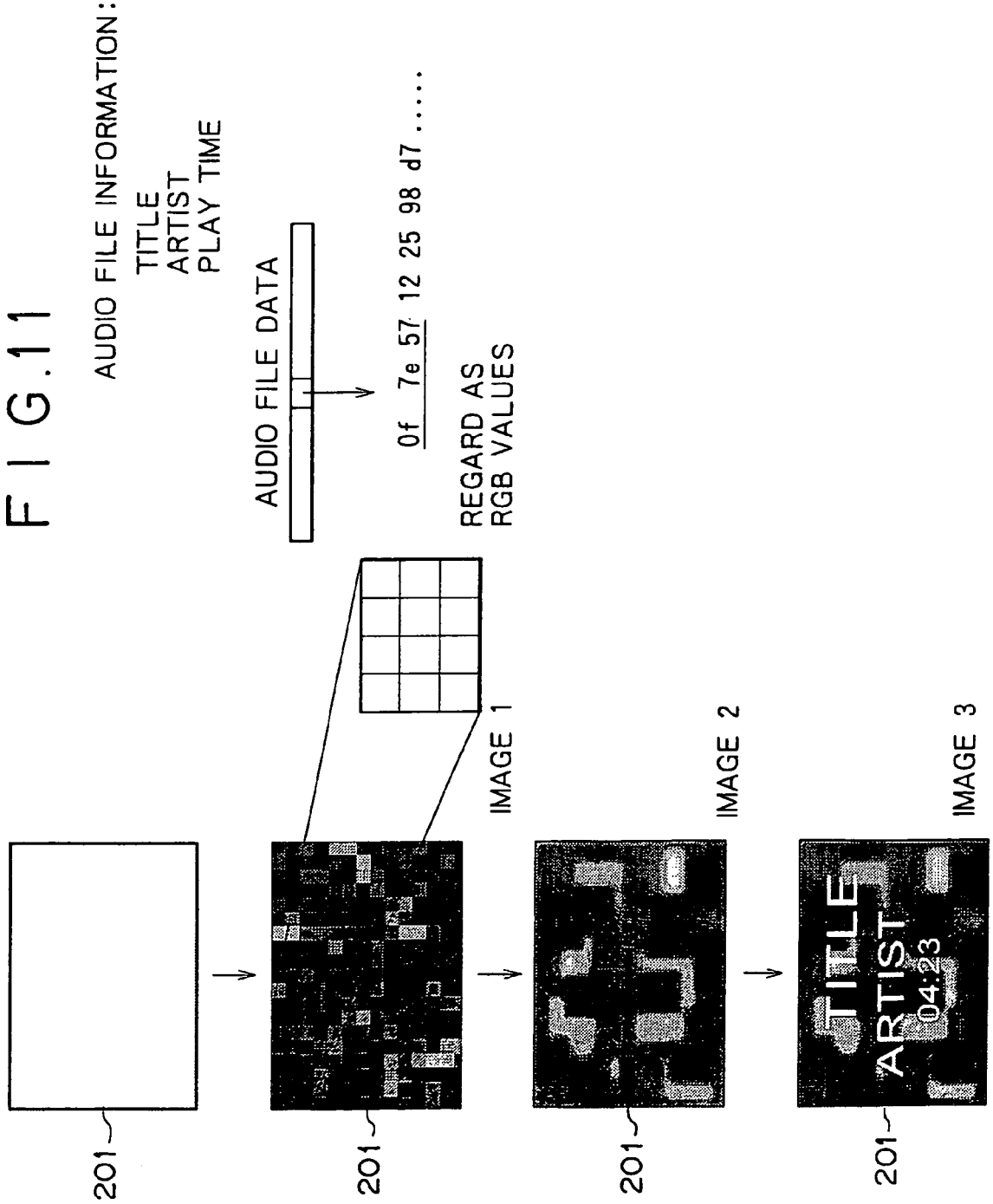
FIG. 11 is a diagram illustrating a procedure of generating a thumbnail for displaying an image corresponding to voice data.
Figure 14:
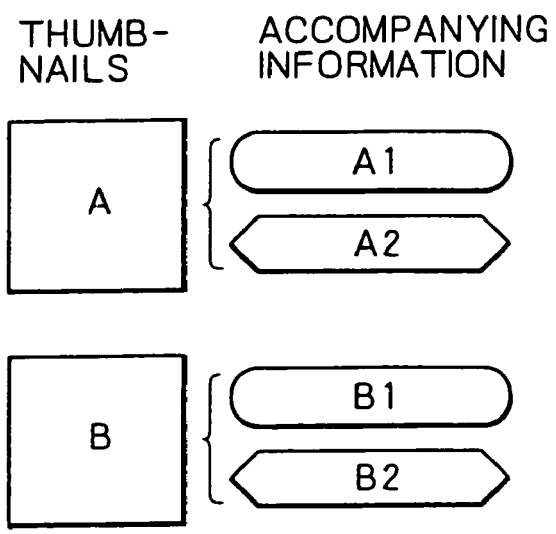
FIG. 14 is a diagram illustrating a related-art thumbnail arrangement.

FIG. 11 shows a procedure of generating the thumbnails 201 for displaying an image corresponding to audio data by the content processing routine 152.

First, the content processing routine 152 sets an area in which the thumbnail 201 is displayed in accordance with its size. In accordance with the size of the audio data, the content processing routine 152 divides the area for displaying the thumbnail 201 into square areas each consisting of the predetermined number of pixels.

The content processing routine 152 extracts the data of a given portion (for example, if the audio data are viewed as a data sequence, the data located at the center of the data sequence) from the audio data and generates the pixel value of each pixel on the basis of the extracted data. For example, the content processing routine 152 extracts data from the audio data in units of 8 bits to provide RGB data.

In the example shown in FIG. 11, 0fh (hereafter each hexadecimal value is suffixed with "h") extracted from the audio data provides R data, 7eh provides G data, and 57h provides B data. Likewise, 0fh, 7eh, and 57h are followed by 12h providing R data, 25h providing G data, and 98h providing B data.

When the audio data are encrypted or encoded, the content processing routine 152 does not decode the audio data but generates RGB data directly from the encrypted or decoded audio data.

Thus, the content processing routine 152 generates the same number of pixel values of RGB data as the number of divided thumbnail-areas.

The content processing routine 152 sets the RGB data to each of square areas each consisting of the predetermined number of pixels, obtained by dividing an area to be displayed by the thumbnail 201. At this point of time, the thumbnail 201 consists of an image in which each square has a different color as shown in the example of image 1 of FIG. 11.

The content processing routine 152 then applies a blur process to the thumbnail 201 to which the RGB data are set. Blurring the thumbnail 201 with RGB data set makes the displayed thumbnail 201 easier to be seen as shown in the example of image 2 shown in FIG. 11.

In addition to the blur process, the content processing routine can apply any other image processes such as emboss and outline extraction to the thumbnail 201 with RGB data set.

Further, the content processing routine 152 writes the attribute data such as title, artist, and play time contained in the audio file over predetermined positions in text as shown in the example of image 3 shown in FIG. 11.

Because the content processing routine 152 writes the attribute data such as title, artist, and play time contained in the audio file over predetermined positions in text, the user viewing the thumbnail 201 corresponding to the audio data can know in detail the contents of the audio data corresponding to the thumbnail 201.

The image to be set to the thumbnail 201 may be generated on the basis of the spectrum corresponding to audio data. For example, colors corresponding to the frequency band levels of the horizontally aligned pixels of the thumbnail 201 may be set (for example, −40 dB is related to a color of hue circle 0 degree and 0 dB is related to a color of hue circle 360 degrees) and the vertically aligned pixels of the thumbnail 201 may be related to an audio elapsed time, thereby setting an image corresponding to the elapsed time of the audio spectrum all over the thumbnail 201.

As shown in FIG. 12, when the audio data are small in size, the content processing routine 152 divides the area for displaying the thumbnail 201 into a small number of square areas and, when the audio data are large in size, the content processing routine 152 divides the area into a large number of square areas.

By doing so, the user of the personal computer 1 can predict the size of audio data only by viewing the thumbnail 201 corresponding to the audio data.

As shown in FIG. 13, the content processing routine 152 generates the thumbnail 201 on the basis of text data in the same procedure as generating the thumbnail 201 corresponding to audio data. In this case, the content processing routine 152 may extract predetermined summary text of text included in the text data as the text to be displayed on the thumbnail 201 and display the extracted text.

Thus, the display program 54F can generate the thumbnail 201 in correspondence with audio data or text data.

The data which can be processed by the display program 54F are not limited to audio data and text data. For example, the display program 54F can generate the thumbnail 201 on the basis of data including no image, for example, data stored in an HTML (Hypertext Markup Language) file, data for spreadsheeting, and an execution program (a load module).

The following describes the arrangement of the thumbnails 201 to be displayed by the display program 54F.

Conventionally, when arranging thumbnails and accompanying information, it is a general practice for the thumbnails to be arranged not overlapping each other and the accompanying information to be displayed nearby.

On the contrary, the display program 54F of the personal computer 1 provides three types of arranging thumbnails 201 in addition to a display method in which the thumbnails 201 are arranged in a lattice, not overlapping each other (this method is hereafter referred to as square view).

In the first display embodiment, a virtual straight line or a virtual curve (an open line) is specified and the thumbnails 201 are arranged on the specified virtual line (this display method is hereafter referred to as a line view). In the second display embodiment, a virtual true circle or a virtual ellipse (a closed line) is specified and the thumbnails 201 are arranged about the circle or ellipse (this display method is hereafter referred to as a loop view). In the third display embodiment, a virtual spiral is specified and the thumbnails 201 are arranged on the spiral (this display method is hereafter referred to as a spiral view).

Figure 15:
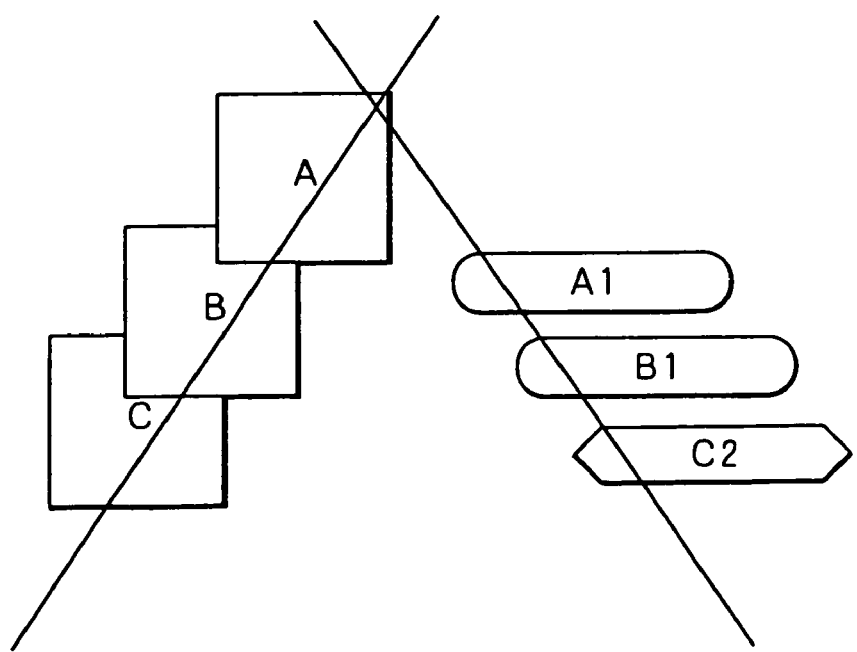
FIG. 15 is a diagram illustrating a line view.

First, line view to be displayed when the icon 202-1 is clicked will be described. As shown in FIG. 15, the display program 54F specifies an axis 221-1 consisting of a straight line or circle and arranges the thumbnails 201-1 through 201-3 on this line. If the thumbnail 201-1 is selected and the thumbnail 201-1 overlaps the thumbnail 201-2, the display program 54F displays the entire thumbnail 201-1 and only the exposed portion of the thumbnail 201-2.

If the thumbnail 201-1 is selected and the thumbnail 201-2 overlaps the thumbnail 201-3, the display program 54F displays only the exposed portion of the thumbnail 201-2 and the exposed portion of the thumbnail 201-3.

Namely, the display program 54F displays the entire selected thumbnail 201 and displays the thumbnail 201 nearer to the selected thumbnail 201 preferentially over the thumbnail 201 farther from the selected thumbnail 201 (so that the nearer thumbnail is displayed nearer to the user).

A text 211-1 indicative of such information accompanying the thumbnail 201-1 as file name, date of creation, and image size, is arranged on an axis 221-2 at which the lower position of the thumbnail 201-1 matches the upper position of the text 211-1 for example. A text 211-2 indicative of such information accompanying the data corresponding to the thumbnail 201-2 as file name is arranged on the axis 221-2 at which the lower position of the thumbnail 201-2 matches the upper position of the text 211-2 for example. A text 211-3 indicative of such information accompanying the data corresponding to the thumbnail 201-3 as file name is arranged on the axis 221-2 at which the lower position of the thumbnail 201-3 matches the upper position of the text 211-3 for example.

It should be noted that the axes 221-1 and 221-2 are not displayed on the screen of the LCD 7. In what follows, if there is no need to make distinction between the axes 221-1 and 221-2, they will be generically referred to simply as the axis 221. Likewise, the texts 211-1 through 211-3 will be generically referred to simply as the text 211 when there is no need to make distinction among them.

For example, let the horizontal direction of the screen be x axis and the vertically direction be axis y, then, as shown in FIG. 16, the axis 221-1 is computed by equation (1) and the axis 221-1 by equation (2).

$$x = \sin(\pi/2t)(y-c0)+c1 \qquad (1)$$

$$x = -\sin(\pi/2t)(y-c0)+c1 \qquad (2)$$

where, x and y denote coordinates on x axis and y axis respectively, t denotes a time elapsed from a predetermined reference time (for example, a time corresponding to the start of displaying icons in the line view, and c0 and c1 denote the centers of the displayed thumbnails.

θ shown in FIG. 16 corresponds to π/2t of equation (1) or (2).

Figure 17A:
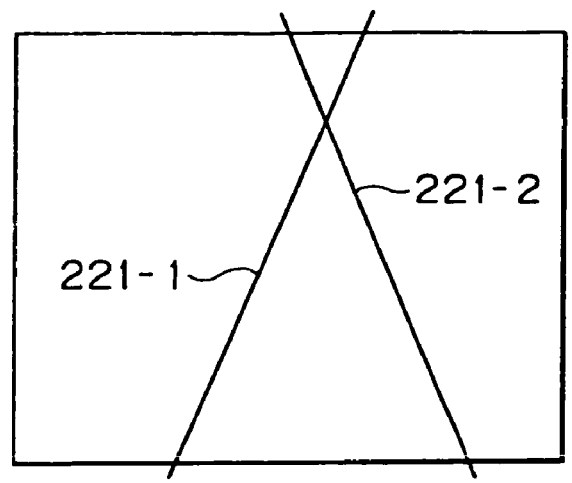
Figure 17C:
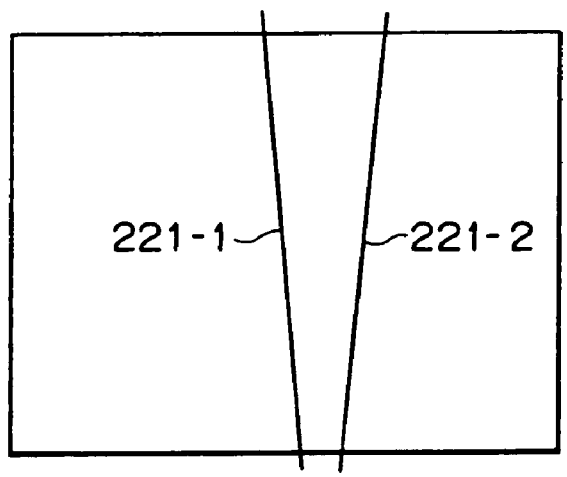
Figure 17E:
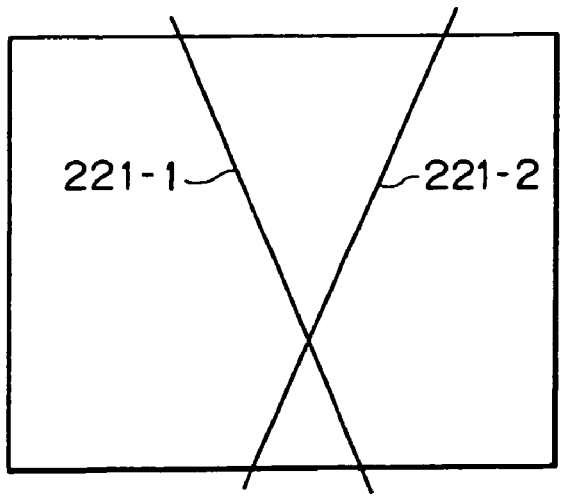

Therefore, if a display operation starts with the thumbnail 201 and the text 211 positioned as shown in FIG. 17B with reference to the positions of the axes 221-1 and 221-2 as shown in FIG. 17A, the positions of the axes 221-1 and 221-2 smoothly move toward the positions shown in FIG. 17C and then the positions shown in FIG. 17E.

Namely, the thumbnail 201 and the text 211 are smoothly rearranged from a state shown in FIG. 17B to a state shown in FIG. 17D in correspondence with the movement of the axes 221-1 and 221-2 then to a state shown in FIG. 17F.

Having reached the positions shown in FIG. 17E, the axes 221-1 and 221-2 smoothly move to the positions shown in FIG. 17C and then to the positions shown in FIG. 17A, repeating the smooth movement.

Namely, the thumbnail 201 and the text 211 are smoothly rearranged from the state shown in FIG. 17F to the state shown in FIG. 17D in correspondence with the movement of the axes 221-1 and 221-2 and then to the state shown in FIG. 17B, repeating the smooth movement.

Because the selected thumbnail 201 is located at the center of movement of the axis 221-1, the thumbnail 201 selected by the user remains unmoved and the thumbnails located over and below it move. This allows the user quickly and surely recognize the selected thumbnail 201.

Figure 18:
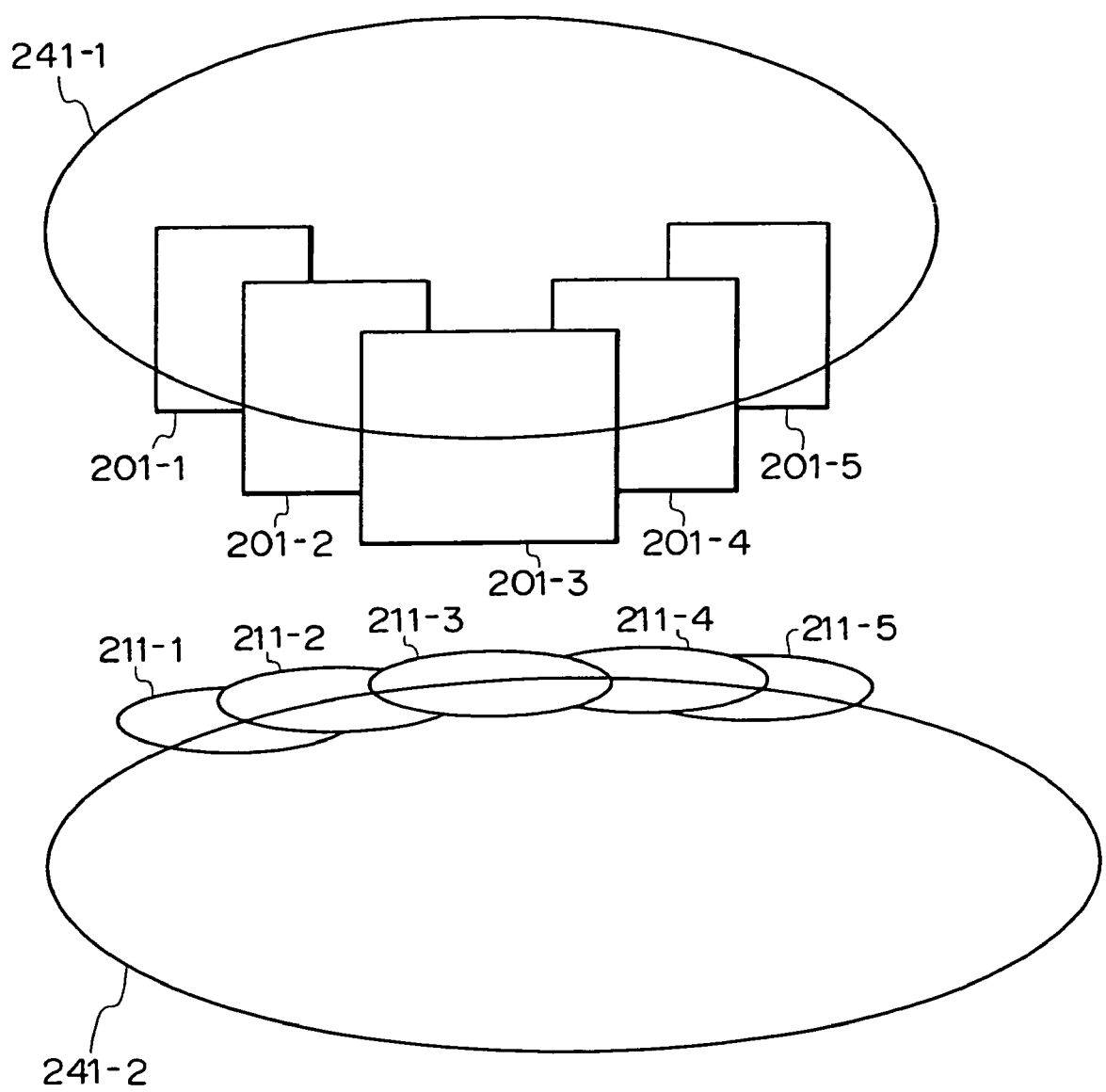
FIG. 18 is a diagram illustrating a loop view.

The following describes a loop view which is displayed when the icon 202-2 is clicked. As shown in FIG. 18, the display program 54F specifies an axis 241-1 consisting of a true circle, an ellipse, or a predetermined loop (including a polygon) and arranges the thumbnails 201-1 through 201-5 on the axis 241-1. If the thumbnail 201-3 is selected and it overlaps the thumbnail 201-2, the display program 54F displays the entire thumbnail 201-3 and only the exposed portion of the thumbnail 201-2.

If the thumbnail 201-3 is selected and the thumbnails 201-1 through 201-5 are sequentially arranged and the thumbnail 201-2 overlaps thumbnail 201-1, the display program 54F displays only the exposed portion of the thumbnail 201-2 and only the exposed portion of the thumbnail 201-1. The display program 54F displays only the exposed portion of the thumbnail 201-4 and only the exposed portion of the thumbnail 201-5.

Namely, the display program 54F displays the entire selected thumbnails 201 and displays the thumbnails 201 nearer to the selected thumbnail 201 preferentially over the thumbnails 201 farther from the selected thumbnail 201 (so that the nearer thumbnail is displayed nearer to the user).

The display program 54F specifies an axis 241-2 which corresponds to the axis 241-1. The text 211-1 corresponding to the thumbnail 201-1 is arranged on the 241-2 at which the center of the thumbnail 201-1 matches the center of the text 211-1 for example. The text 211-2 corresponding to the thumbnail 201-2 is arranged on the axis 241-2 at which the horizontal center of the thumbnail 201-2 matches the center of the text 211-2. Likewise, the texts 211-3 through 211-5 are arranged on the axis 241-2 at which the horizontal centers of the thumbnails 201-3 through 201-5 match the center of the texts 211-3 through 211-5 respectively.

It should be noted that the axes 241-1 and 241-2 are not displayed on the screen of the LCD 7. In what follows, if there is no need to make distinction between the axes 241-1 and 241-2, they will be referenced simply as the axis 241.

Figure 19:
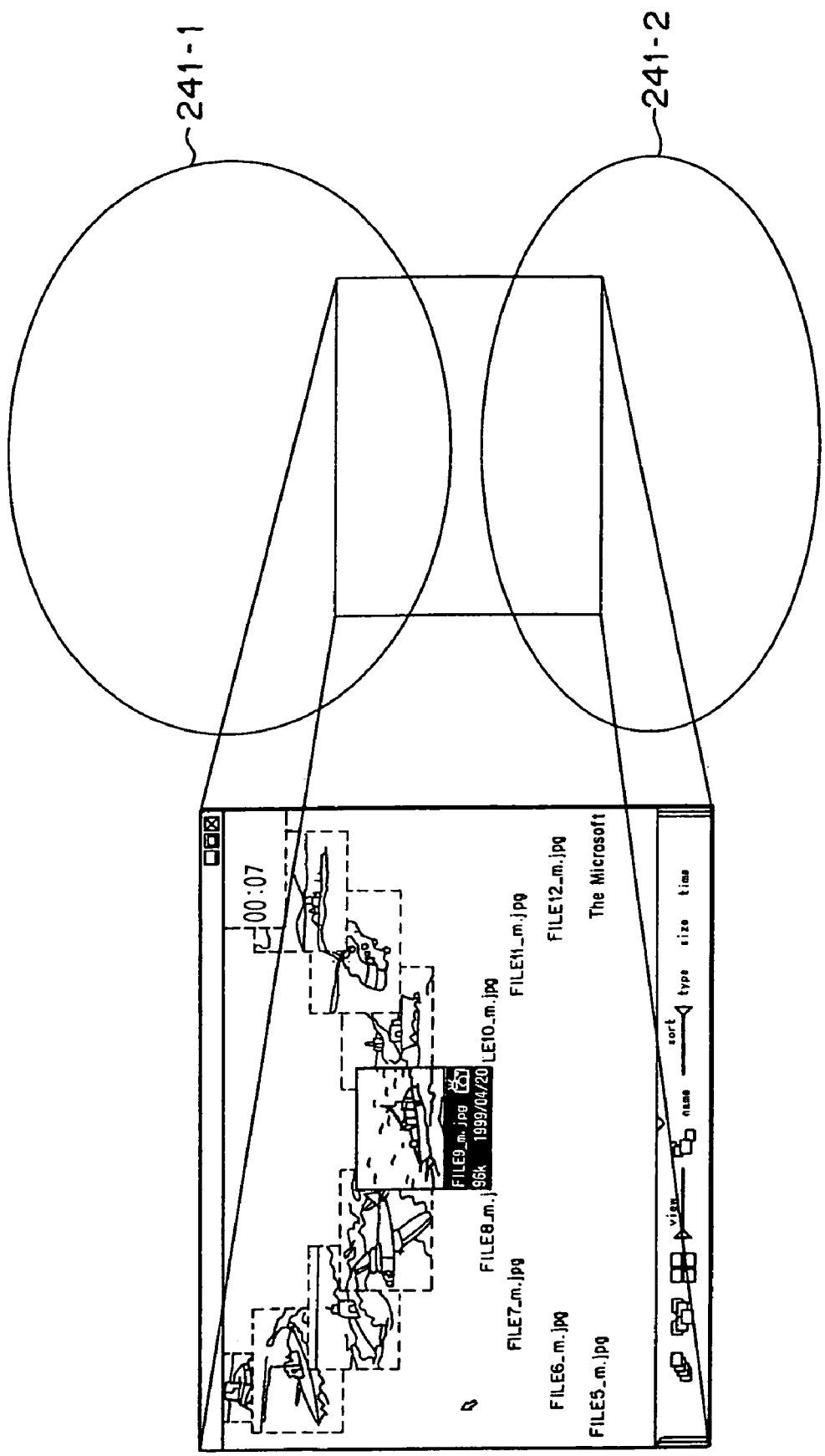
FIG. 19 is a diagram illustrating another loop view.

As shown in FIG. 19, the display program 54F displays the thumbnails 201 arranged on the axis 241-1 and the texts 211 arranged on the axis 241-2 with the selected thumbnail 201 being at the center of the screen on the LCD 7.

Figure 20:
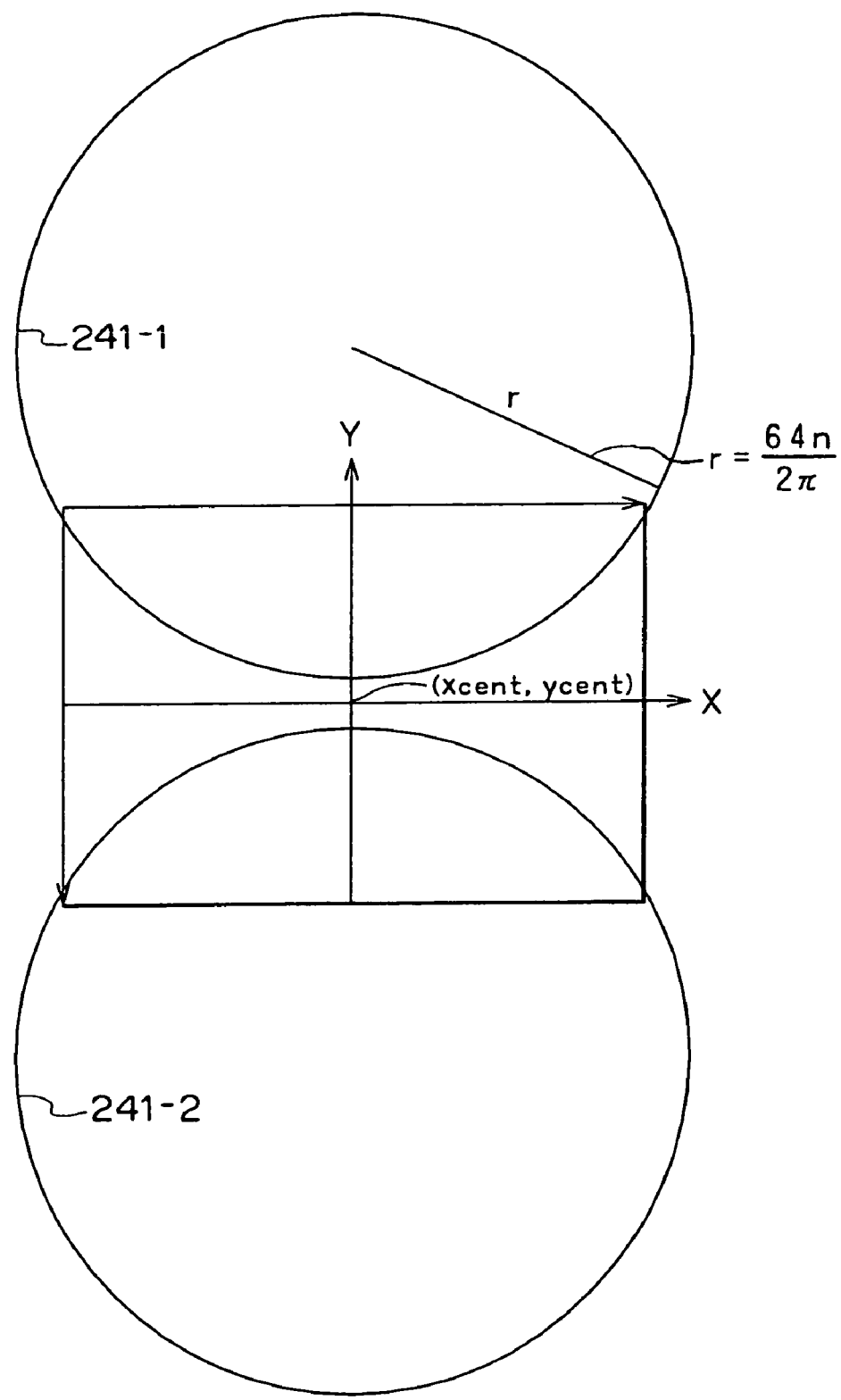
FIG. 20 is a diagram illustrating axes.

FIG. 20 illustrates how the display program 54F computes the axes 241-1 and 241-2 if the axes 241-1 and 241-2 are true circles.

Let the number of thumbnails 201 to be displayed be n, then the radius r of the circle corresponding to the axes 241-1 and 241-2 can be obtained from equation (3).

$$r = 64n/2\pi \qquad (3)$$

Let the coordinates of the center of the screen be (Xcent, Ycent), then the coordinates of the center of the axis 241-1 (Xcent1,Ycent1) can be obtained from equation (4) and the coordinates of the center of the axis 241-2 (Xcent2,Ycent2) can be obtained from equation (5).

$$(X\text{cent}1, Y\text{cent}1) = (X\text{cent}, Y\text{cent} - r - 64) \qquad (4)$$

$$(X\text{cent}2, Y\text{cent}2) = (X\text{cent}, Y\text{cent} + r + 64) \qquad (5)$$

The position of ith thumbnail 201 can be obtained from equation (6).

$$(X1i, Y1i) = (X\text{cent}1 + r\sin(i*2\pi/n), Y\text{cent}1 + r\cos(i*2\pi/n)) \qquad (6)$$

The position of the ith text 211 can be obtained from equation (7).

$$(X2i, Y2i) = (X\text{cent}2 + r\sin(i*2\pi/n), Y\text{cent}2 - r\cos(i*2\pi/n)) \qquad (7)$$

Consequently, the loop view facilitates for the user to intuitively grasp the movement of the thumbnail 201 when the display program 54F changes in the loop view the position of the thumbnail 201 in response to the operation of the jog dial 4.

Figure 21:
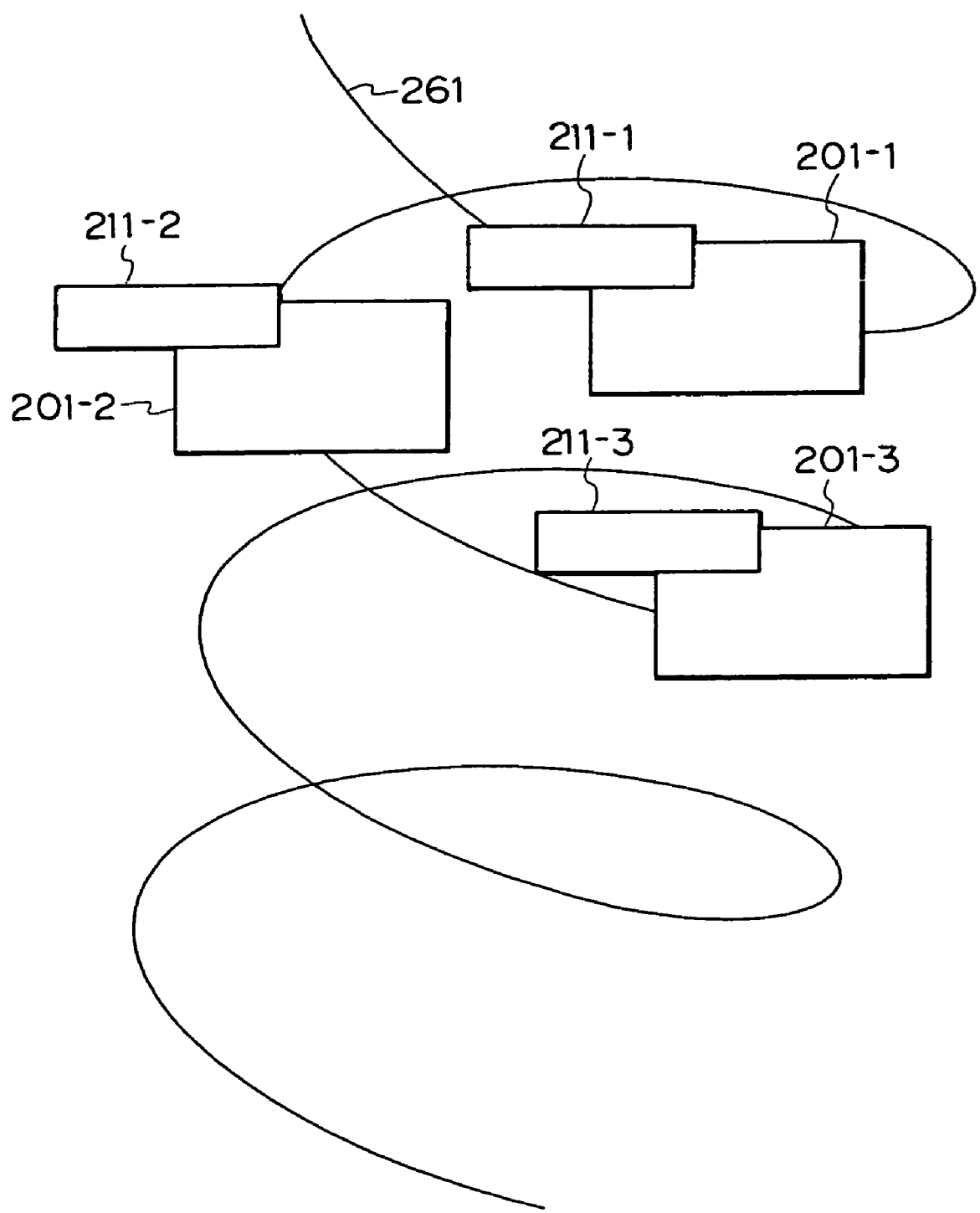
FIG. 21 is a diagram illustrating a spiral view.

The following describes the spiral view which is displayed when the icon 202-4 is clicked. As shown in FIG. 21, the display program 54F specifies an axis 261 consisting of a spiral and arranges the thumbnails 201-1 through 201-3 and the texts 211-1 through 211-3 on the axis 261. The axis 261 runs in the depth of the screen. If all the thumbnails 201 has a same size, the size as displayed on the LCD 7 differs as the position of arrangement on the axis 261 differs.

Because the selected thumbnail 201 is located foremost toward the user, the display program 54F displays it largest compared with others, unselected thumbnails 201 being shown smaller.

Thus, the display program 54F, while displaying many thumbnails 201, displays the selected thumbnail 201 largest and the unselected thumbnails smaller, thereby enhancing the usage efficiency of the screen on the LCD 7.

Figure 22A:
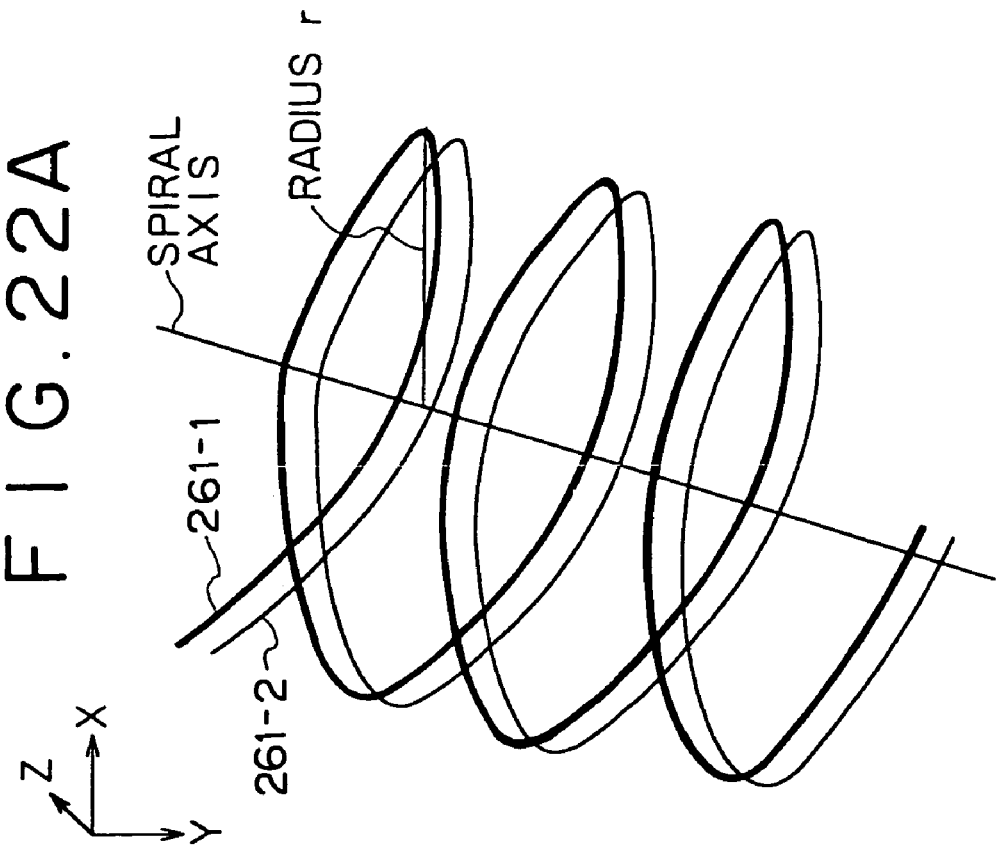
FIGS. 22A to 22B are diagrams illustrating another spiral view.
Figure 22B:
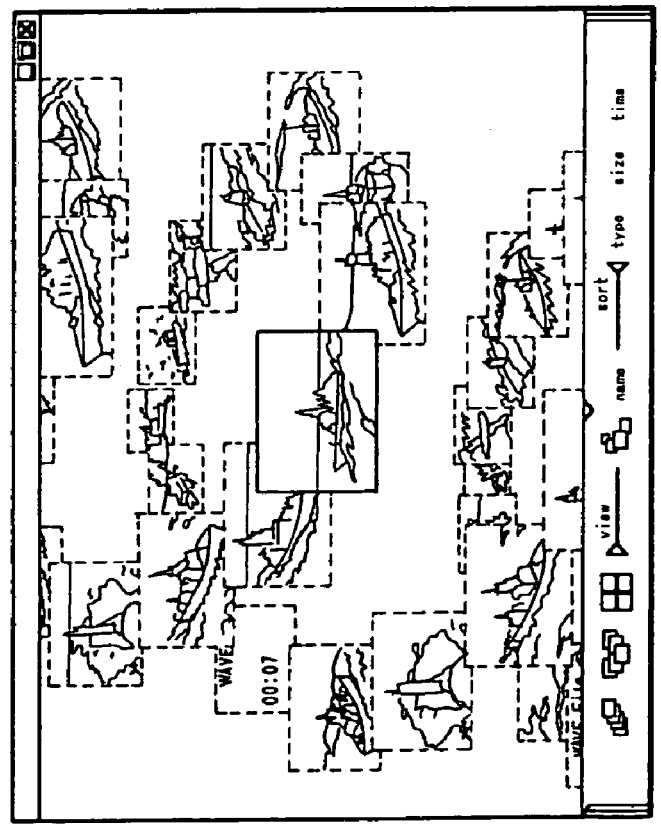

As shown in FIG. 22A, the display program 54F may also specify axes 261-1 and 261-2 having a same axis and arrange thumbnails 201 on the axis 261-1 and arrange texts 211 on the axis 261-2.

The coordinates (x,y,z) of the axis 261 consisting of a spiral having radius r can be obtained from equations (8), (9), and (10).

$$x = r\sin(t) + c0t \qquad (8)$$

$$y = c1t \qquad (9)$$

$$z = r\cos(t) \qquad (10)$$

where, r is the radius of the spiral, c0 and c1 are constants for defining the slope of the spiral, and t is a given value.

Figure 23:
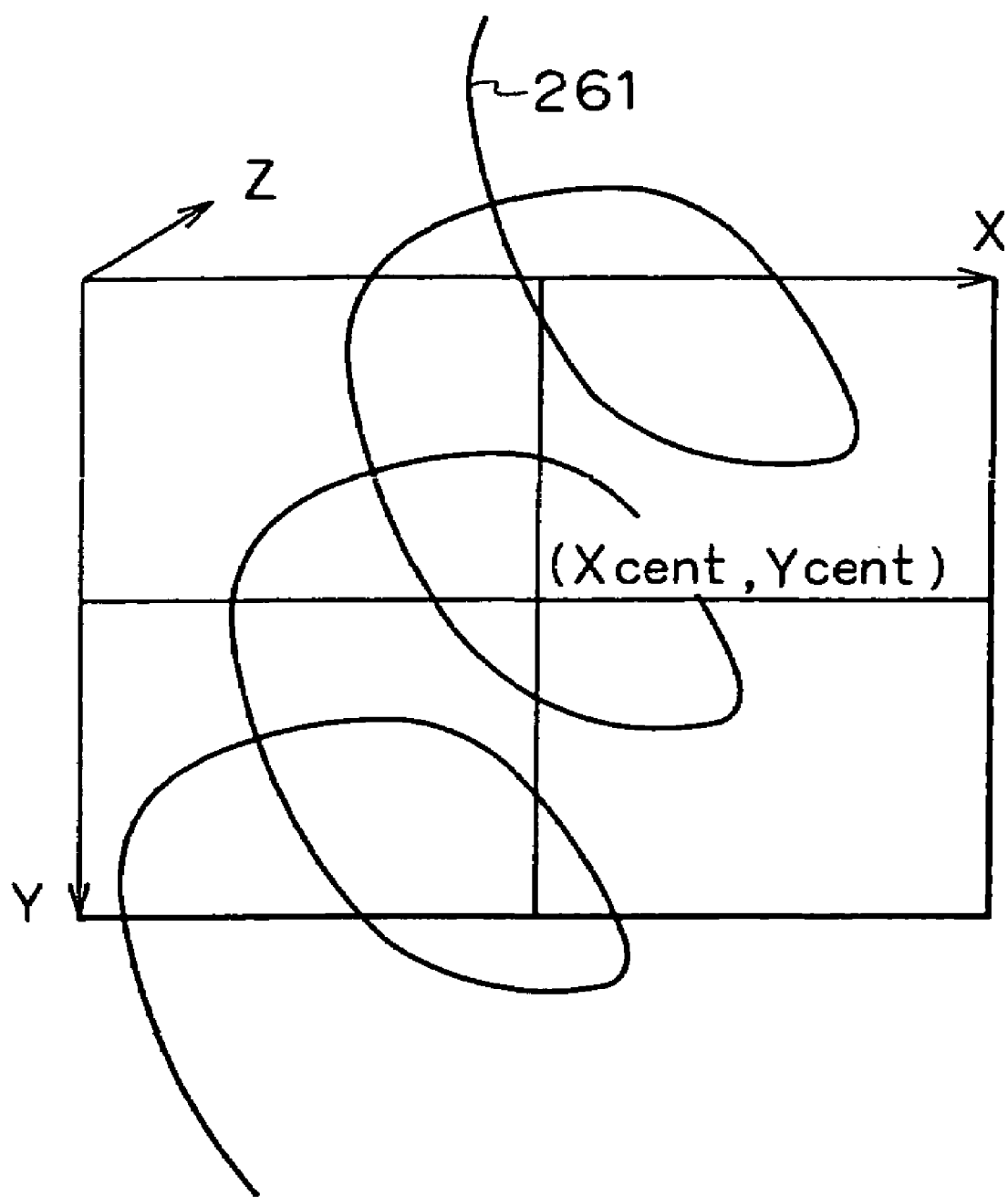
FIG. 23 is a diagram illustrating an axis.

As shown in FIG. 23, the coordinates (xi,yi,zi) of the thumbnail 201 arranged on the axis 261 consisting of a spiral having radius r can be obtained from equations (11), (12), and (13)

$$xi = X\text{cent} + r\sin(i*2\pi/9) - (i*r/20) \qquad (11)$$

$$yi = Y\text{cent} + (i*r/10) \qquad (12)$$

$$zi = r - r\cos(i*2\pi/9) \qquad (13)$$

where, Xcent and Ycent denote the coordinates of the center of the screen. The z axis is at right angles to the x axis and y axis, running in the depth of the screen. 20 in equation (11) and 10 in equation (12) are predetermined contents.

Figure 24:
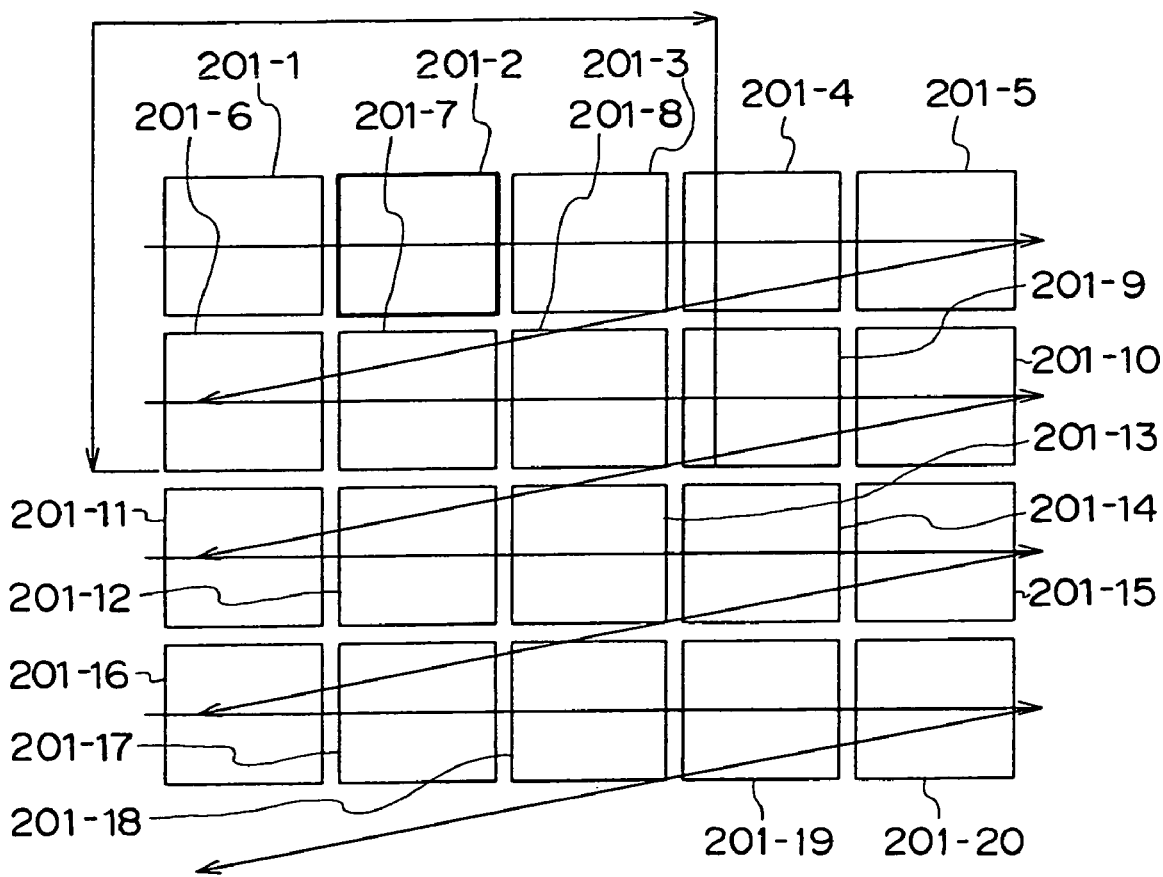
FIG. 24 is a diagram illustrating a square view.
Figure 25:
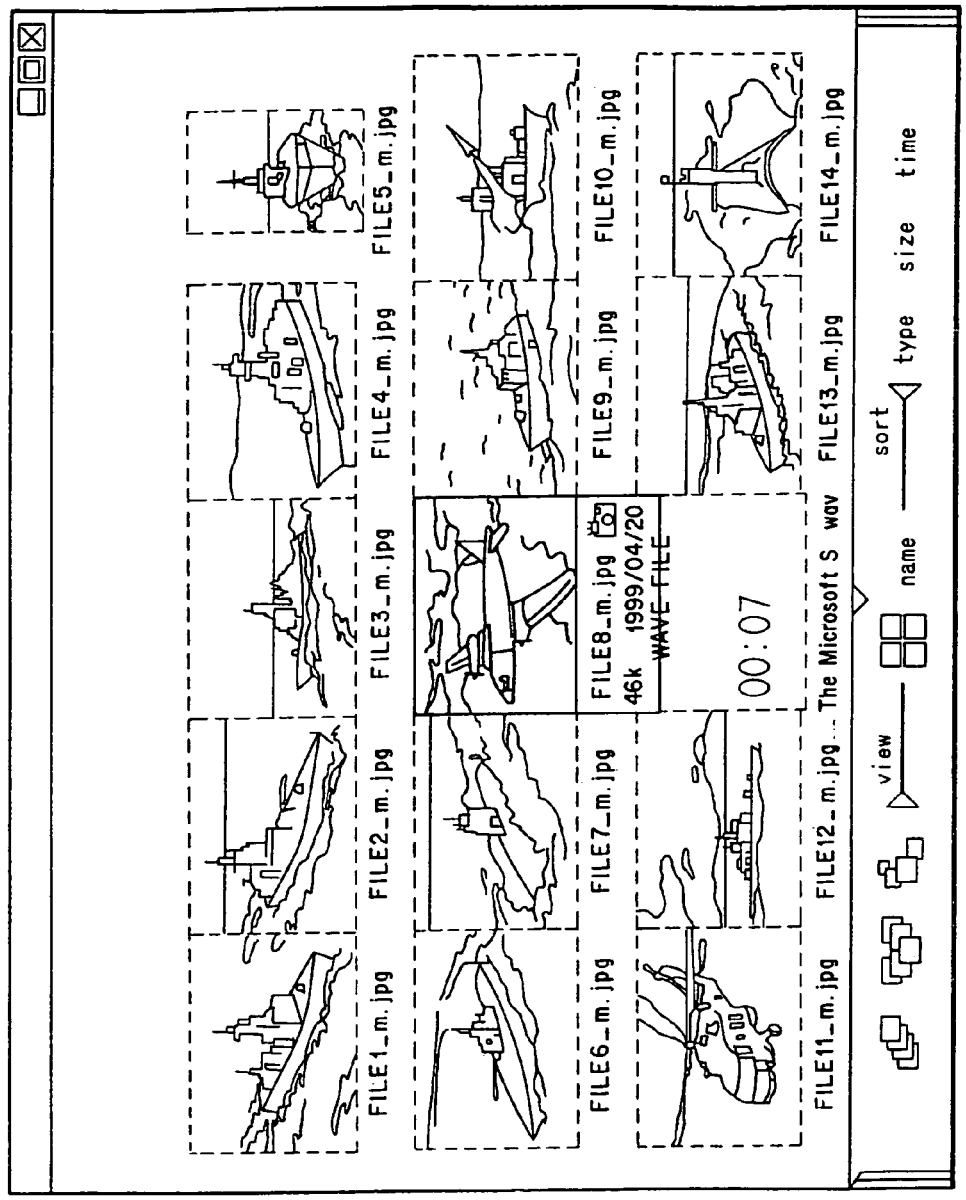
FIG. 25 is a diagram illustrating another square view.

The following describes the square view which is displayed when the icon 202-3 is clicked. As shown in FIGS. 24 and 25 for example, the display program 54F arranges, as the top row of the screen, the 5 thumbnails 201-1 through 201-5 such that they are aligned on their vertical centers and equally spaced from each other on their horizontal centers.

The display program 54F arranges, as the second row from top, another 5 thumbnails 201-6 through 201-7 such that such that they are aligned on their vertical centers and equally spaced from each other on their horizontal centers. In other words, the display program 54F arranges the 5 thumbnails 201-6 through 201-10 on the second row such that the horizontal center of the thumbnail 201-6 matches the horizontal center of the thumbnail 201-1, the horizontal center of the thumbnail 201-7 matches the horizontal center of the thumbnail 201-2, the horizontal center of the thumbnail 201-8 matches the horizontal center of the thumbnail 201-3, the horizontal center of the thumbnail 201-9 matches the horizontal center of the thumbnail 201-4, and the horizontal center of the thumbnail 201-10 matches the horizontal center of the thumbnail 201-5.

The display program 54F arranges, as the third and fourth rows of the screen, the thumbnails 201-11 through 201-20 in the above-mentioned procedure.

It should be noted that the display program 54F can rearrange the thumbnails 201 in accordance with date of creation, time of imaging, file name, and image size for example, in any of the line view, the loop view, the spiral view, and the square view.

The following describes how the icon 202 moves when it is clicked. FIG. 26 shows one example of how the icon 202 moves.

As shown to the right side of FIG. 26, if icons 202-1 through 202-3 for example are arranged in the screen and when the icon 202-1 is clicked, the display program 54F moves the icon 202-1 and 202-2 such that the shape or color of the icon 202-1 is changed to reproduce a predetermined voice and the positions of the icon 202-1 and 202-2 are exchanged.

Namely, the processing manager 151 computes the positions of the icons 202-1 and 202-2 such that, when the touch pad 6 is operated, the icons 202-1 and 202-2 move at a predetermined period.

On the basis of the position computed by the processing manager 151, the icon processing routine 153-1 displays the icon 202-1 such that it moves to the center of screen. On the basis of the position computed by the processing manager 151, the icon processing routine 153-2 displays the icon 202-2 such that it moves to the lower left of the screen.

The icons 202-1 through 202-3 are not limited to move straight; they may move on predetermined curves. The directions in which the icons 202-1 through 202-3 move are not limited to planar; they may move also in the depth of the screen.

Figure 27A:
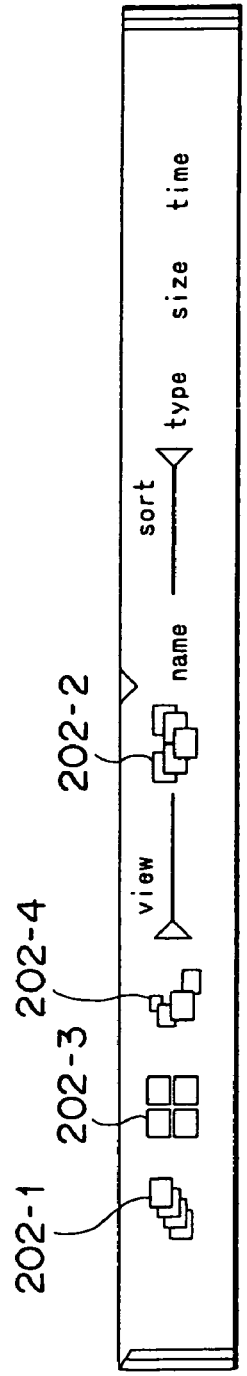
FIGS. 27A to 27C are diagrams illustrating the movement of the icon.
Figure 27B:
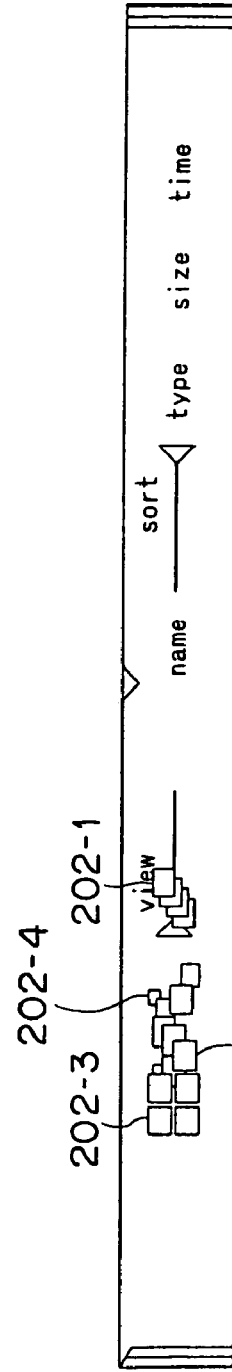
Figure 27C:
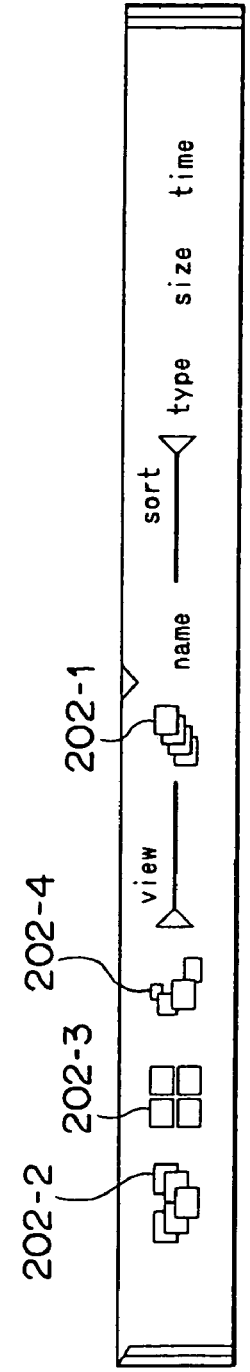

When the thumbnails 201 are displayed in the loop view, the display program 54F, as shown in FIG. 27A, the display program 54F arranges the icon 202-2 at the horizontal center of screen. When the icon 202-1 is clicked in the state shown in FIG. 27A, the display program 54F moves the icons 202-1 through 202-4 with at a speed the user can visually check the movement. After a state shown in FIG. 27B, the display program 54F arranges the icon 202-1 to the horizontal center of screen as shown in FIG. 27C.

The display program 54F arranges the icons 202-2 through 202-4 in accordance with the values related to them respectively.

For example, if 1 is related to the icon 202-1, 2 to the icon 202-2, 3 to the icon 202-3, and 4 to the icon 202-4, the display program 54F arranges the icons 202-2 through 202-4 from the left of the screen in the ascending order of the attached numbers. Namely, the display program 54F arranges the icon 202-2 to the leftmost side of the screen, followed to the right by the icon 202-3, which is followed to the right by the icon 202-4.

Thus, when the display program 54F moves the icons 202 and arranges the icon 202 which corresponds to the display mode to the center of screen for example, the user can surely know that the icon 202 has been operated and, at the same time, quickly know the display mode in which the thumbnail 201 is displayed.

Figure 28:
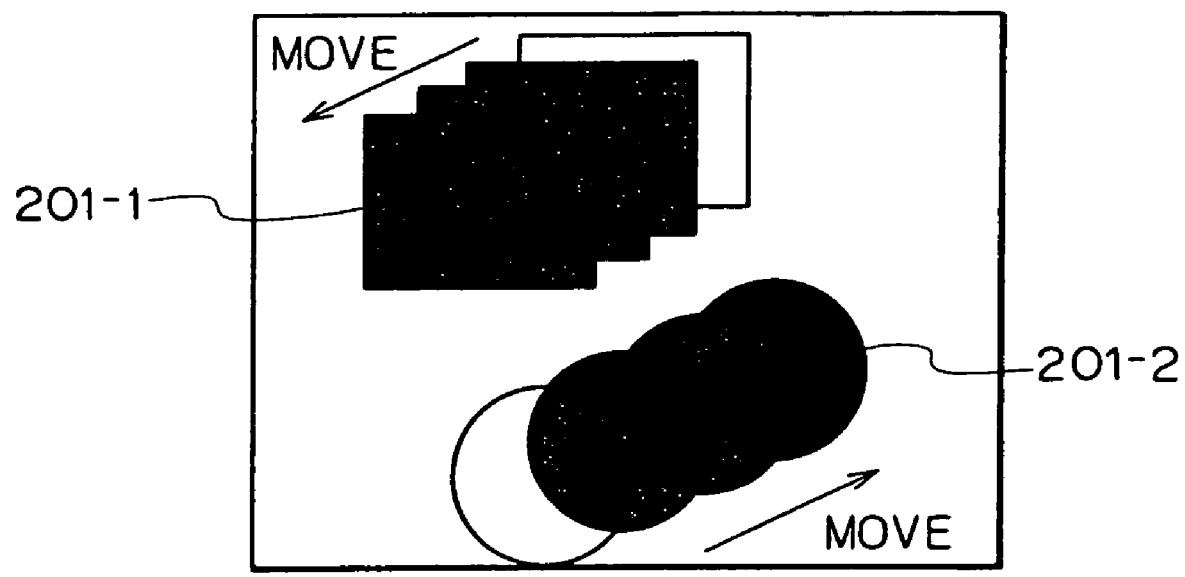
FIG. 28 is a diagram illustrating after-image processing.

The following describes how an after-image is displayed when the thumbnail 201 or the icon 202 is moved. The content processing routine 152 draws the thumbnail 201 30 times a second for example. As shown in FIG. 28, the content processing routine 152 displays an after-image of the thumbnail 201 when it has been moved.

If the after-image display mode is not set in advance, the content processing routine 152 erases the current screen and draws the thumbnail 201 anew.

As shown in FIG. 29, if the after-image display mode is set, the content processing routine 152, when drawing the thumbnail 201, draws it by setting the lightness of the last displayed screen to 80% for example. The content processing routine 152 draws the thumbnail 201 over the screen with the lightness set to 80%.

Therefore, when the thumbnail 201 is moved, the content processing routine 152 decreases the lightness of the last displayed screen every time the drawing is made, thereby leaving an after-image of the thumbnail 201. Thus, the display program 54F can display an after-image by use of less computations than otherwise.

Figure 30:
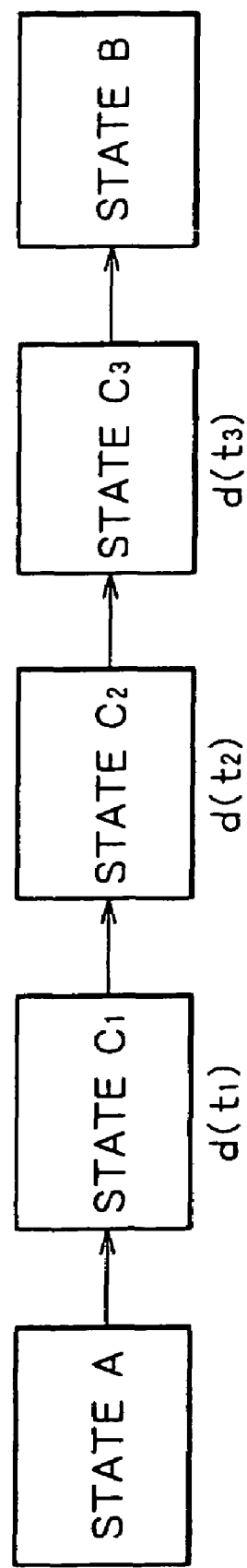
FIG. 30 is a diagram illustrating a status transition.

FIG. 30 illustrates a change in the states corresponding to the display positions of the thumbnail 201 or the icon 202 which has been moved. Referring to FIG. 30, state A relates to the loop view and state B to the square view for example.

In state A corresponding to the loop view, when the icon 202-3 is clicked, the processing manager 151 computes the positions of the thumbnails 201-1 through 201-N to be drawn by the content processing routines 152-1 through 152-N respectively and supplies the computed values to these content processing routines.

Figure 31:
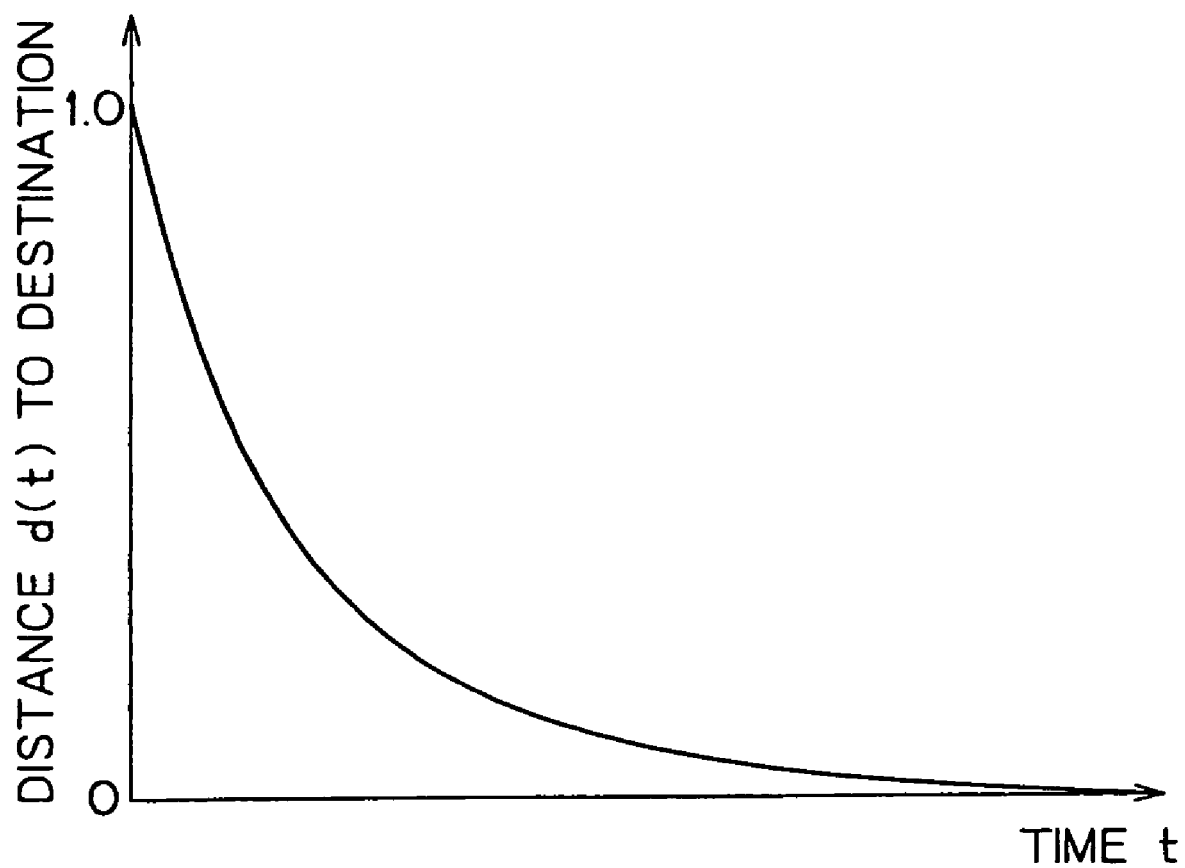
FIG. 31 is a diagram illustrating a transition function.

The processing manager 151 computes the positions of the thumbnails 201 on the basis of a transition function indicative of a graph shown in FIG. 31. If a distance between the thumbnail 201 in state A and the thumbnail 201 in state B is 1, a distance of the thumbnail 201 at elapsed time t from the position of the thumbnail 201 in state B is outputted as the transition function on the basis of elapsed time t from the start of the transition.

Namely, let elapsed time be ti, the position of the thumbnail 201 in state A be Ai, and the position of the thumbnail 201 in state B be Bi, then the position of the thumbnail 201 Ci can be obtained from equation (14).

$$Ci = (Ai - Bi)d(ti) + Bi \quad (14)$$

The transition function is defined so that distance d(t) rapidly decreases from 1 as elapsed time t increases in a portion in which elapsed time t is near 0 and then distance d(t) gradually decreases to 0. Defining the transition function this way allows the display program 54F to quickly move the thumbnail 201 just after it is started and then decreases the speed as the destination is reached.

Consequently, the display program 54F can quickly move the thumbnail 201 without bothering the user with the movement.

The transition function is not limited to one shown in FIG. 31. For example, a transition function may be defined such that distance d(t) gradually decreases as elapsed time t increases in a portion in which elapsed time t is near 0, and then distance d(t) quickly decreases to 0.

In response to elapsed time t and on the basis of the transition function, the processing manager 151 computes the positions of the thumbnails 201-1 through 201-N corresponding to distance d(t) and supplies the computed positions to the content processing routines 152-1 through 152-N. The content processing routines 152-1 through 152-N draw the thumbnails 201-1 through 201-N respectively.

In state C1 corresponding to elapsed time t1, the thumbnails 201-1 through 201-N are displayed at their respective positions midway toward the respective positions in state B. In state C2 corresponding to elapsed time t2 after a predetermined time from elapsed time t1, the thumbnails 201-1 through 201-N are displayed at their respective positions midway toward their respectively positions in state B.

In state C3 corresponding to elapsed time t3 after a predetermine time from elapsed time t2, the thumbnails 201-1 through 201-N are displayed at their respective positions which are nearer to their respective positions in state B than state C2.

Figure 32:
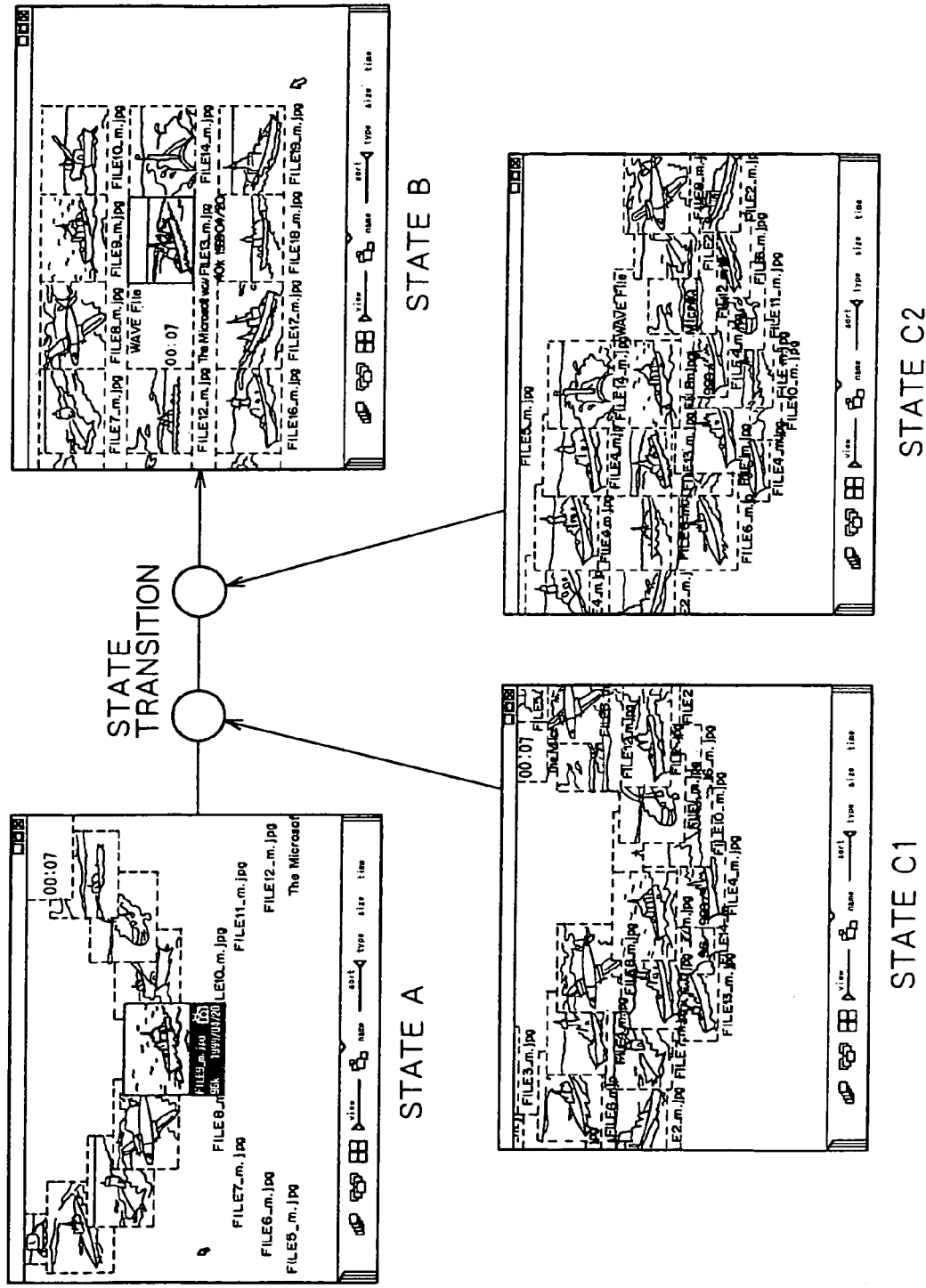
FIG. 32 is a diagram illustrating a status transition.

FIG. 32 illustrates one example of the positions of the thumbnails 201 in state C1 and state C2.

If a command for moving to state D is inputted for example while moving from state A to state B, the transient flow is directed toward state D.

Figure 33:
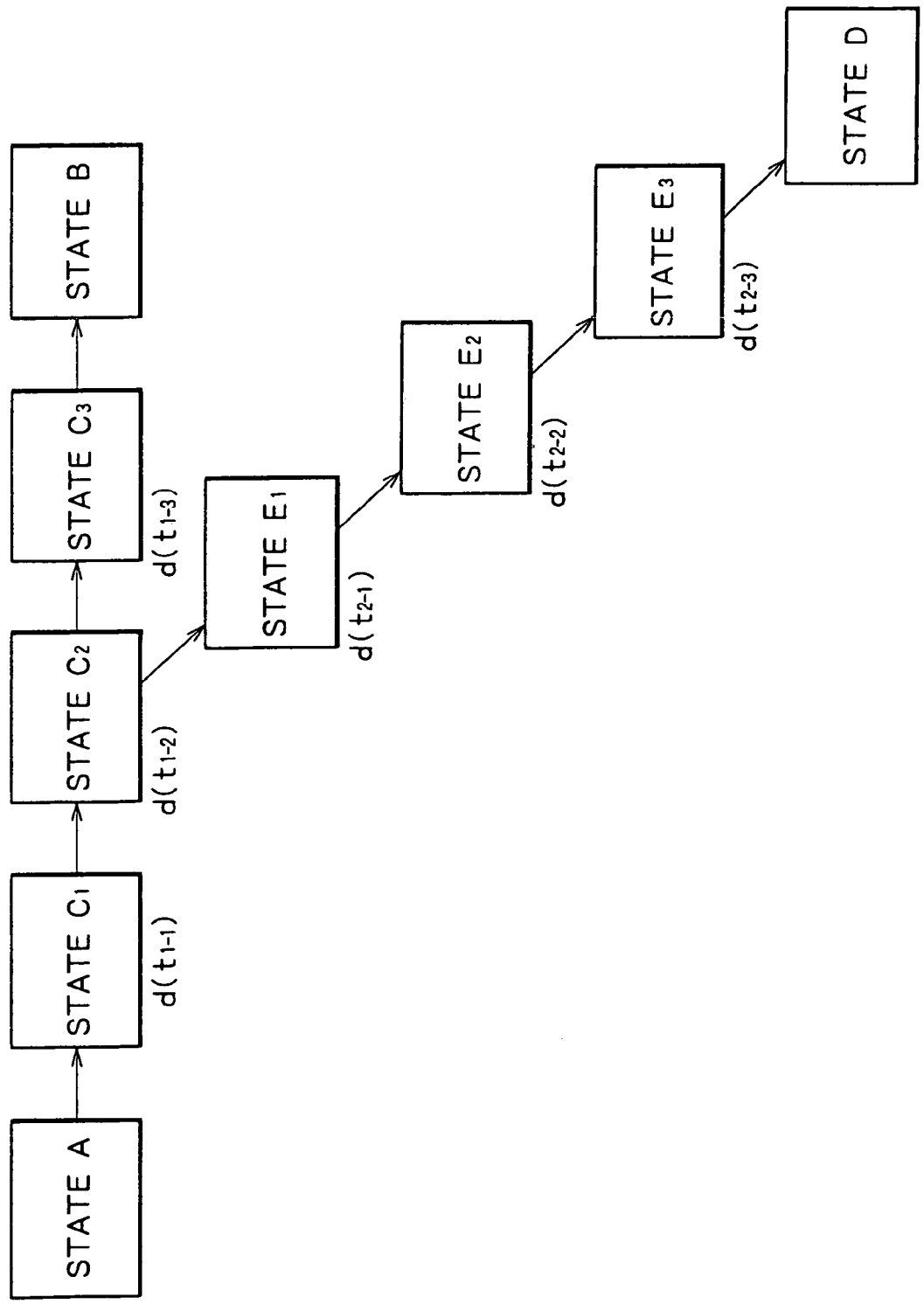
FIG. 33 is a diagram illustrating a status transition.

As shown in FIG. 33 for example, if the icon 202-4 is clicked in state C2, then the state of the icon 202-4 goes to state D which corresponds to the spiral view, with the state C2 as a new starting state. The transition from state C2 to state D is made via states E1 and E2 as with the transition from state A to state B.

Figure 34:
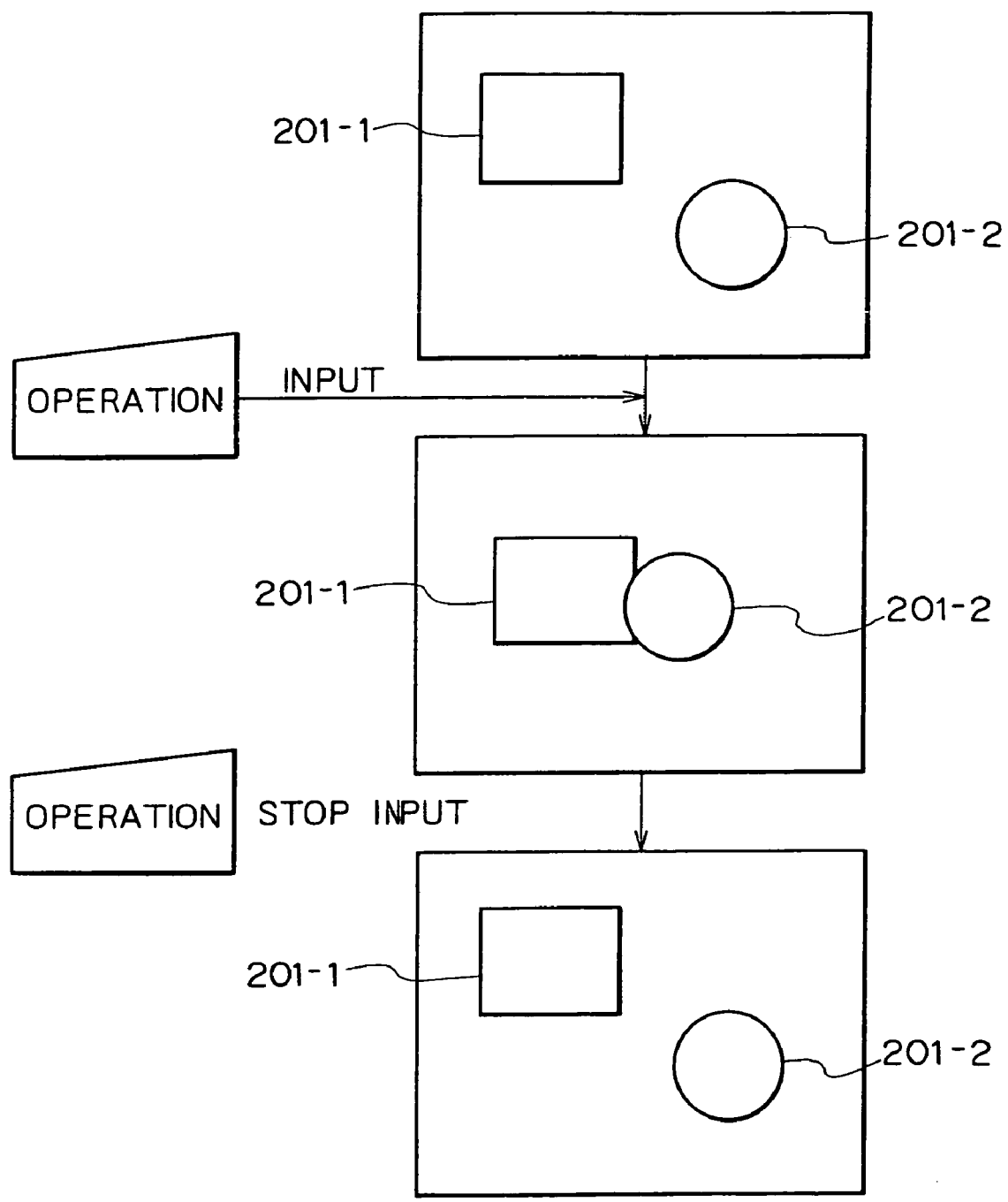
FIG. 34 is a diagram illustrating processing for changing display positions of thumbnails.

In the spiral view, the processing manager 151 changes the display positions of the thumbnails 201 as shown in FIG. 34 depending on whether the jog dial 4, the keyboard 5, or the touch pad 6 is being operated or not.

Further, in the spiral view, the processing manager 151 changes the display positions of the thumbnails 201 as shown depending on whether the keyboard 5 is kept pressed (for example, a direction key is kept pressed) or the keyboard 5 is pressed once and released immediately.

Figure 35:
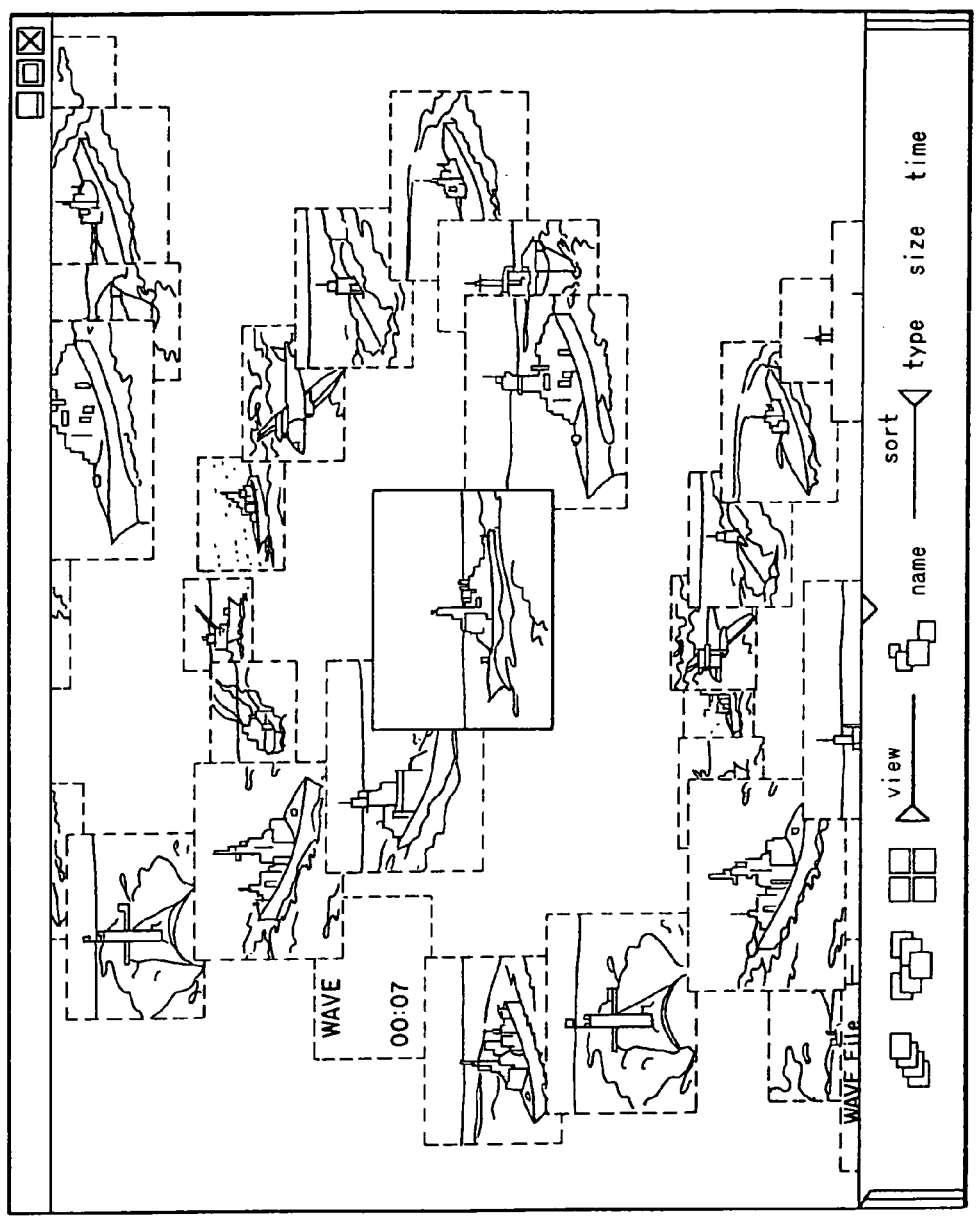
FIG. 35 is a diagram illustrating one example of changing display positions of thumbnails.

To be more specific, when the jog dial 4 and the keyboard 5 are not being operated, the processing manager 151 causes the content processing routine 152 to display thumbnails 201 on a spiral having larger radius r as shown in FIG. 35 for example.

Figure 36:
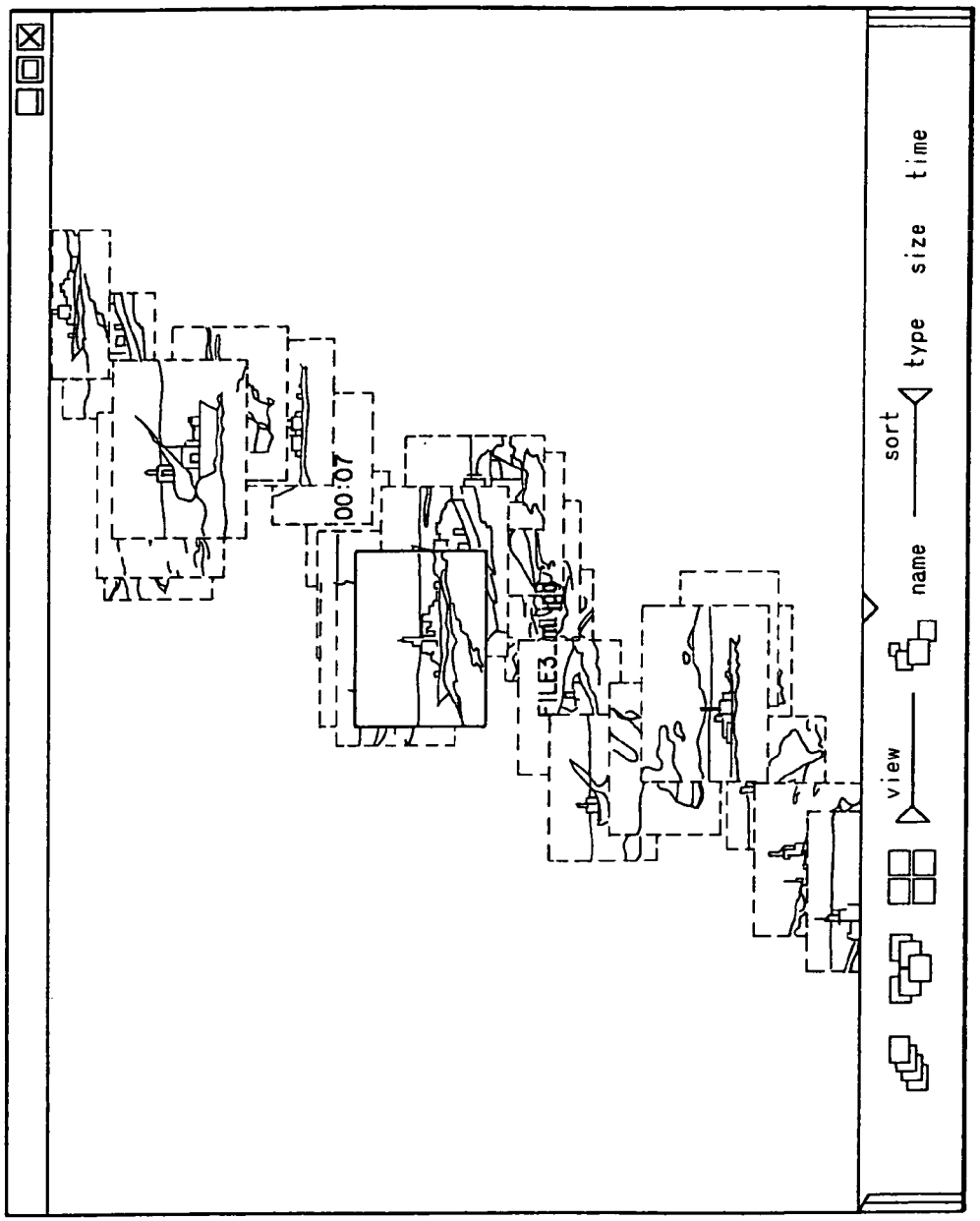
FIG. 36 is a diagram illustrating another example of changing display positions of thumbnails.

When the jog dial 4 is kept rotated or the keyboard 5 is kept pressed, the processing manager 151 causes the content processing routine 152 to display thumbnails 201 on a spiral having smaller radius r as shown in FIG. 36, for example.

When the jog dial 4 is clicked once or the keyboard 5 is pressed once and released immediately, the processing manager 151 causes the content processing routine 152 to display thumbnails 201 on a spiral having intermediate radius r as shown in FIGS. 35 and 36.

Consequently, the user of the personal computer 1 can immediately determine, on the basis of the display positions of thumbnails 201, whether the jog dial 4 or the keyboard 5 is being operated or not.

It should be noted that the display program 54F may reproduce a predetermined voice or display a predetermined image when the spiral radii r are changed.

When the jog dial 4 or the keyboard 5 is not being operated, the processing manager 151 may cause the content processing routine 152 to display thumbnails 201 on the spiral having smaller radius r and, when the jog dial 4 or the keyboard 5 is being operated, cause the content processing routine 152 to display thumbnails 201 on the spiral having larger radius r.

The following describes how the thumbnail 201 is selected and displayed in an enlarged manner.

Figure 37:
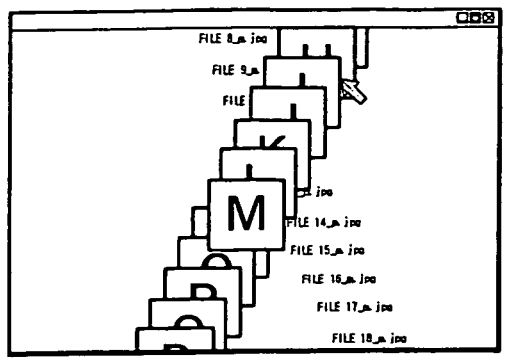
FIG. 37 is a diagram illustrating the selection of a thumbnail.
Figure 38:
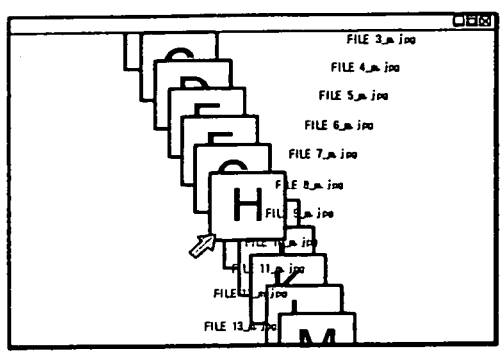
FIG. 38 is a diagram illustrating the selection of the thumbnail.
Figure 39:
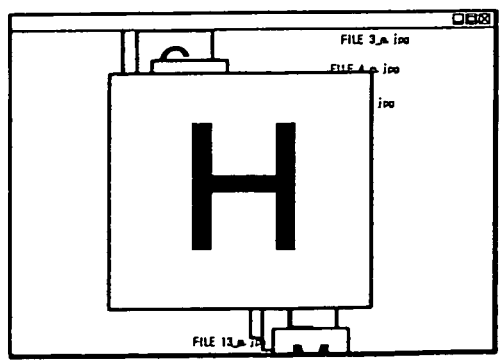
FIG. 39 is a diagram illustrating an enlarged display.

FIGS. 37 through 39 illustrate the selection and enlarged display of thumbnails 201 in the line view. When a thumbnail 201 having "H" is clicked with a thumbnail 201 having "M" selected as shown in FIG. 37, the display program 54F moves all thumbnails 201 displayed on the screen such that the thumbnail 201 having "H" comes to the center of the screen as shown in FIG. 38. The display program 54F then enters a state in which the thumbnail 201 having "H" is selected.

When the thumbnail 201 having "H" is clicked in the selected state shown in FIG. 38, the display program 54F displays an image corresponding to the thumbnail 201 having "H" as shown in FIG. 39.

Namely, when the data corresponding to the thumbnail 201 having "H" are a still image, the display program 54F displays it in its original size. If the data corresponding to the thumbnail 201 having "H" are a moving image, the display program 54F displays it in its original size and reproduces the moving image. If the data corresponding to the thumbnail 201 having "H" are a voice, the display program 54F displays it as enlarged to a predetermined size and reproduces the voice.

When an image corresponding to the thumbnail 201 having "H" shown in FIG. 39 is clicked, the display program 54F returns to the state in which the thumbnail 201 having "H" is selected shown in FIG. 38.

Figure 40:
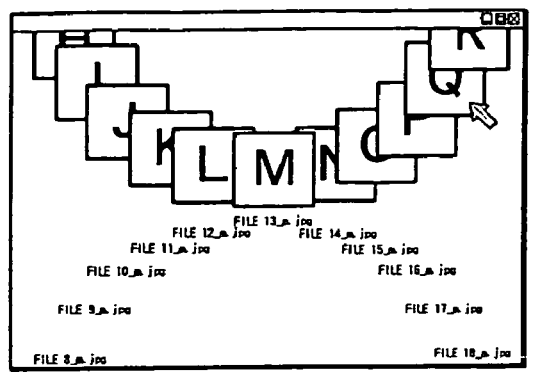
FIG. 40 is a diagram illustrating the selection of a thumbnail.
Figure 41:
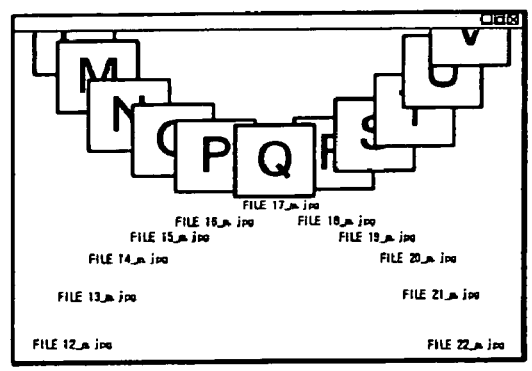
FIG. 41 is a diagram illustrating the selection of the thumbnail.
Figure 42:
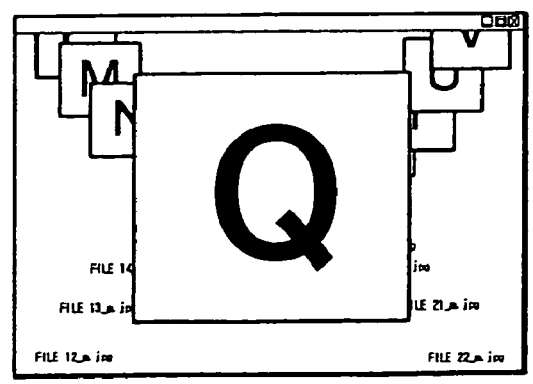
FIG. 42 is a diagram illustrating an enlarged display.

FIGS. 40 through 42 illustrate the selection and enlarged display of thumbnails 201 in the loop view. When a thumbnail 201 having "Q" is clicked with a thumbnail 201 having "M" selected as shown in FIG. 40, the display program 54F moves all thumbnails 201 displayed on the screen such that the thumbnail 201 having "Q" moves to the horizontal center of the screen as shown in FIG. 41. Then, the display program 54F enters the state in which the thumbnail 201 having "Q" is selected.

When the thumbnail 201 having "Q" is clicked in the selected state shown in FIG. 41, the display program 54F displays an image corresponding to the thumbnail 201 having "Q" as shown in FIG. 42.

Namely, when the data corresponding to the thumbnail 201 having "Q" are a still image, the display program 54F displays it in its original size. When the data corresponding to the thumbnail 201 having "Q" are a moving image, the display program 54F displays it in its original size and reproduces it. When the data corresponding to the thumbnail 201 having "Q" are a voice, the display program 54F displays the thumbnail 201 as enlarged to a predetermined size and reproduces the voice.

When an image corresponding to the thumbnail 201 having "Q" shown in FIG. 42 is clicked, the display program 54F returns to the state in which the thumbnail 201 having "Q" shown in FIG. 41 is selected.

Figure 43:
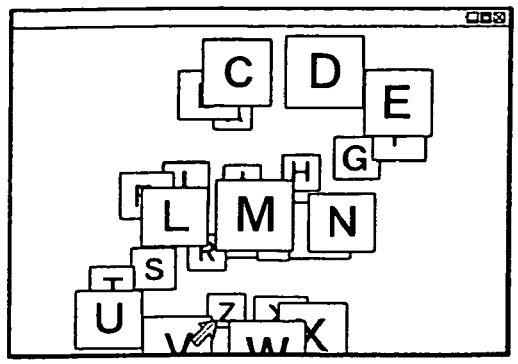
FIG. 43 is a diagram illustrating the selection of a thumbnail.
Figure 44:
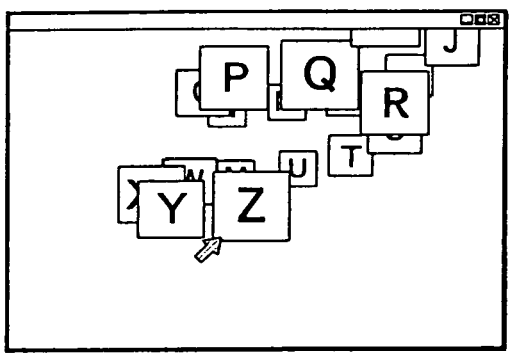
FIG. 44 is a diagram illustrating the selection of the thumbnail.
Figure 45:
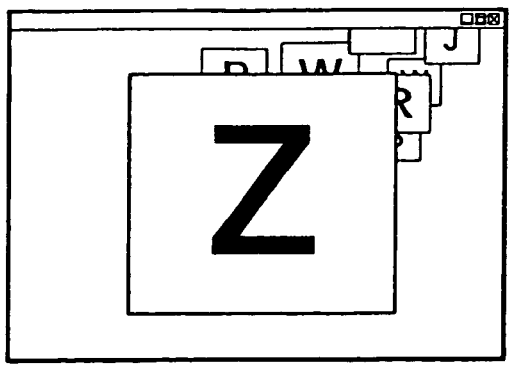
FIG. 45 is a diagram illustrating an enlarged display.

FIGS. 43 through 45 illustrate the selection and enlarged display of thumbnails 201 in the spiral view. When a thumbnail 201 having "Z" is clicked with a thumbnail 201 having "M" selected as shown in FIG. 43, the display program 54F moves all thumbnails 201 displayed on the screen such that the thumbnail 201 having "Z" moves to the center of the screen as shown in FIG. 44. Then, the display program 54F enters the state in which the thumbnail 201 having "Z" is selected.

When the thumbnail 201 having "Z" is clicked in the selected state shown in FIG. 44, the display program 54F displays an image corresponding to the thumbnail 201 having "Z" shown in FIG. 45.

Namely, when the data corresponding to the thumbnail 201 having "Z" are a still image, the display program 54F displays it in its original size. When the data corresponding to the thumbnail 201 having "Z" are a moving image, the display program 54F displays it in its original size and reproduces it. When the data corresponding to the thumbnail 201 having "Z" are a voice, the display program 54F displays the thumbnail 201 as enlarged to a predetermined size and reproduces the voice.

When an image corresponding to the thumbnail 201 having "Z" shown in FIG. 45 is clicked, the display program 54F returns to the state in which the thumbnail 201 having "Z" shown in FIG. 45 is selected.

FIGS. 46 through 48 illustrate the selection and enlarged display of thumbnails 201 in the square view. When a thumbnail 201 having "B" is clicked with a thumbnail 201 having "M" selected as shown in FIG. 46, the display program 54F moves all thumbnails 201 displayed on the screen such that the thumbnail 201 having "B" moves to the center of the screen as shown in FIG. 47. Then, the display program 54F enters the state in which the thumbnail 201 having "B" is selected.

When the thumbnail 201 having "B" is clicked in the selected state shown in FIG. 47, the display program 54F displays an image corresponding to the thumbnail 201 having "B" shown in FIG. 48.

Namely, when the data corresponding to the thumbnail 201 having "B" are a still image, the display program 54F displays it in its original size. When the data corresponding to the thumbnail 201 having "B" are a moving image, the display program 54F displays it in its original size and reproduces it. When the data corresponding to the thumbnail 201 having "B" are a voice, the display program 54F displays the thumbnail 201 as enlarged to a predetermined size and reproduces the voice.

When an image corresponding to the thumbnail 201 having "B" shown in FIG. 48 is clicked, the display program 54F returns to the state in which the thumbnail 201 having "B" shown in FIG. 48 is selected.

Consequently, when the thumbnail 201 is clicked, the display program 54F selects the clicked thumbnail 201, displays it enlarged, or reproduces the corresponding moving image, so that the user can easily and quickly select desired data to display or reproduce the data.

The following describes the status transitions from the state shown in FIG. 38 to the state shown in FIG. 39, from the state shown in FIG. 41 to the state shown in FIG. 42, from the state shown in FIG. 44 to the state shown in FIG. 45 or from the state shown in FIG. 47 to the state shown in FIG. 48, and from the state shown in FIG. 39 to the state shown in FIG. 38, from the state shown in FIG. 42 to the state shown in FIG. 41, from the state shown in FIG. 45 to the state shown in FIG. 44 or from the state shown in FIG. 48 to the state shown in FIG. 47.

Figure 49:
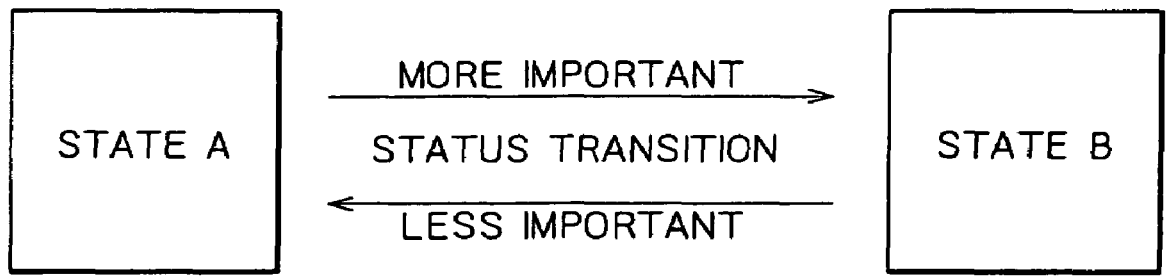
FIG. 49 is a diagram illustrating the degree of importance.

The status transitions from the state shown in FIG. 38 to the state shown in FIG. 39, from the state shown in FIG. 41 to the state shown in FIG. 42, from the state shown in FIG. 44 to the state shown in FIG. 45 or from the state shown in FIG. 47 to the state shown in FIG. 48 corresponds to a request by the user for displaying or reproducing a desired still image, a moving image, or a voice. Because an operation on the thumbnail 201 is meant finally to display or reproduce a still image, a moving image, or a voice, these status transitions are important for the user as shown in FIG. 49.

On the contrary, the status transitions from the state shown in FIG. 39 to the state shown in FIG. 38, from the state shown in FIG. 42 to the state shown in FIG. 41, from the state shown in FIG. 45 to the state shown in FIG. 44 or from the state shown in FIG. 48 to the state shown in FIG. 47 is a transition to a transient state meant to select for example another thumbnail 201 in order to end the display or reproduction of a still image, a moving image, or a voice. Therefore, these status transitions are less important for the user as shown in FIG. 49.

Figure 50:
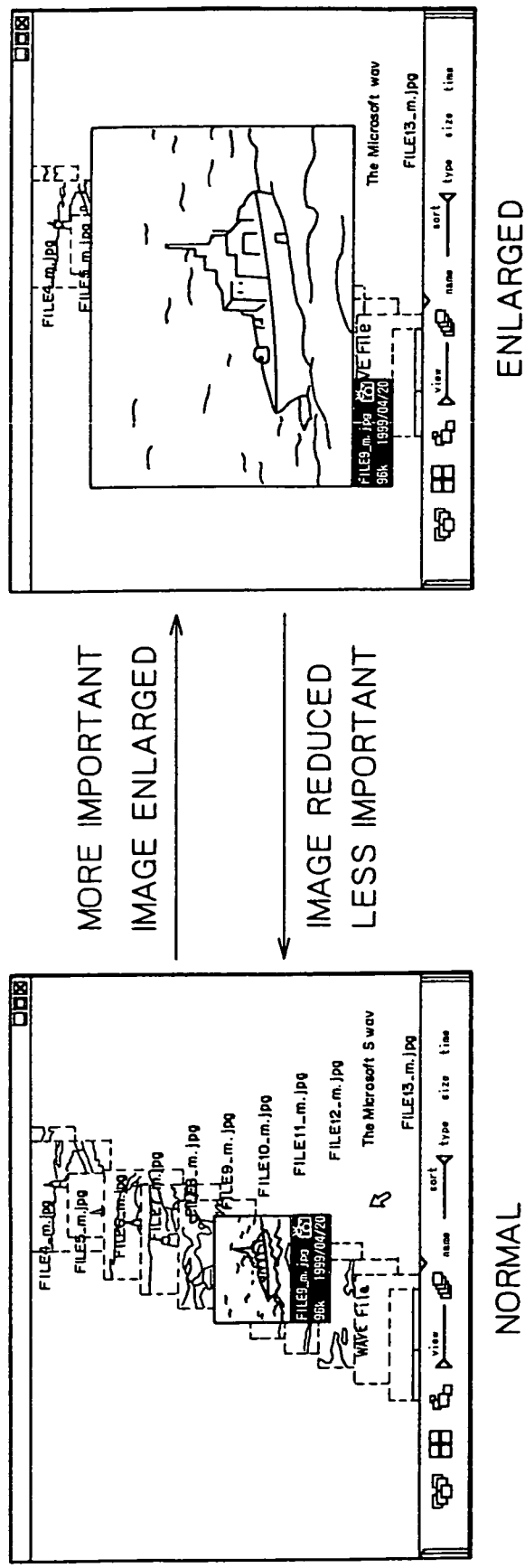
FIG. 50 is a diagram illustrating one example of processing corresponding to the degree of importance.

When a status transition which is important for the user is executed as shown in FIG. 50, for example, a desired still image, moving image, or voice is displayed or reproduced for example, the display program 54F changes the display comparatively slowly in which the user can visually recognize the change in display, thereby making the user surely recognize the display or reproduction of the specified image or voice.

On the other hand, when a status transition which is less important to the user is executed, for example, the display or reproduction of a desired still image, moving image, or voice is stopped to change the display to the selection of a thumbnail 201, the display program 54F quickly changes the display.

Thus, the display program 54F makes the user surely recognize the important status transitions and comparatively quickly executes the status transitions which are less important for the user, thereby satisfying the contrary demands for the slow but easily recognizable status transitions and the quick, time-saving responses.

The following describes how a selected thumbnail 201 is displayed. As shown in FIG. 51, when a thumbnail 201 is selected, the display program 54F displays a frame 281 around the selected thumbnail. When another thumbnail 201 is selected, the display program 54F deletes the frame from the deselected thumbnail 201.

Figure 52:
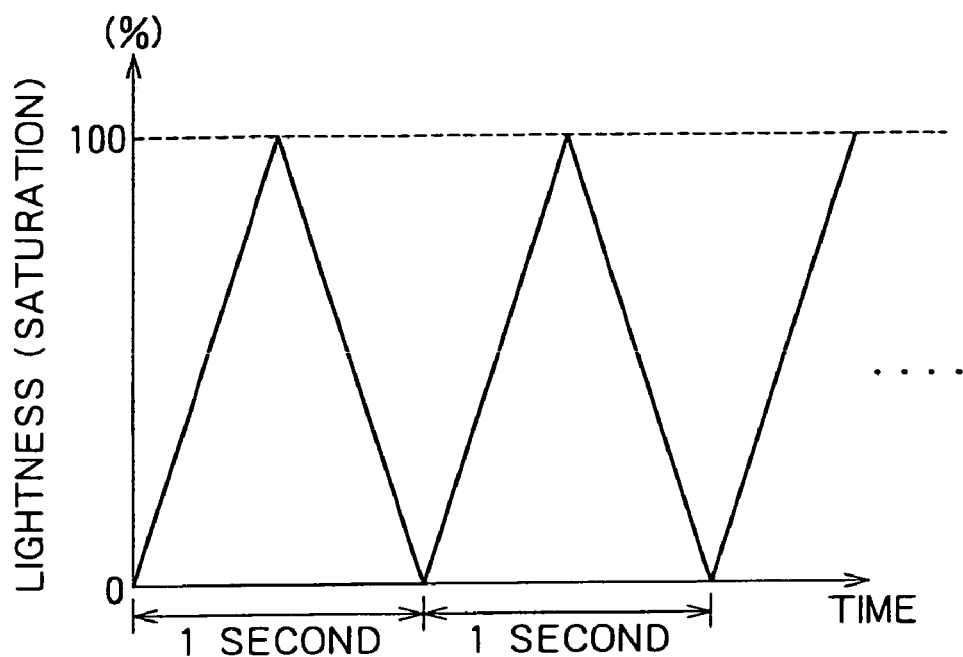
FIG. 52 is a diagram illustrating one example of variation in lightness or saturation of the frame in correspondence with elapsed time.

The display program 54F varies the lightness, saturation or hue of a frame 281 in correspondence with the lapse of time. FIG. 52 shows one example of a change in the lightness or saturation of the frame 281.

For example, the display program 54F varies the lightness or saturation of 0% of the frame 281 linearly up to 100% in 0.5 second and the lightness or saturation of 100% of the frame 281 linearly to 0% in 0.5 second, repeating this change.

The process of varying the lightness of the frame 281 requires less computation than that of the process of varying saturation or hue.

Figure 53:
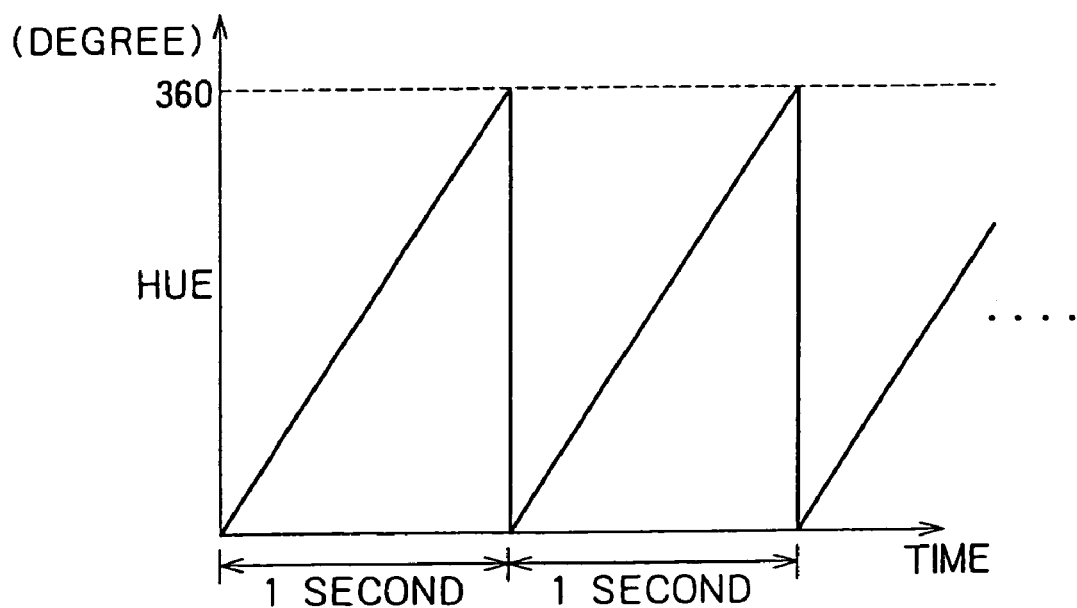
FIG. 53 is a diagram illustrating one example of variation in hue of the frame in correspondence with elapsed time.

FIG. 53 shows one example of varying the hue of the frame 281 in correspondence with the lapse of time.

For example, the display program 54F varies the hue of the frame 281 corresponding to 0 degree of hue circle linearly up to 360 degrees in 1 second and returns the hue of the frame 281 which has reached 360 degrees of hue circle to 0 degree, repeating this change.

Consequently, the display program 54F allows the user surely recognize a selected thumbnail 201 displayed on the screen containing thumbnails having various lightnesses, colors, and hues. The period of the variation of the lightness, saturation, and hue of the frame 281 is not limited to 1 second; for example, the period may be set to any time between 0.1 second and 10 second for example as long as it is recognizable by the user.

Figure 54:
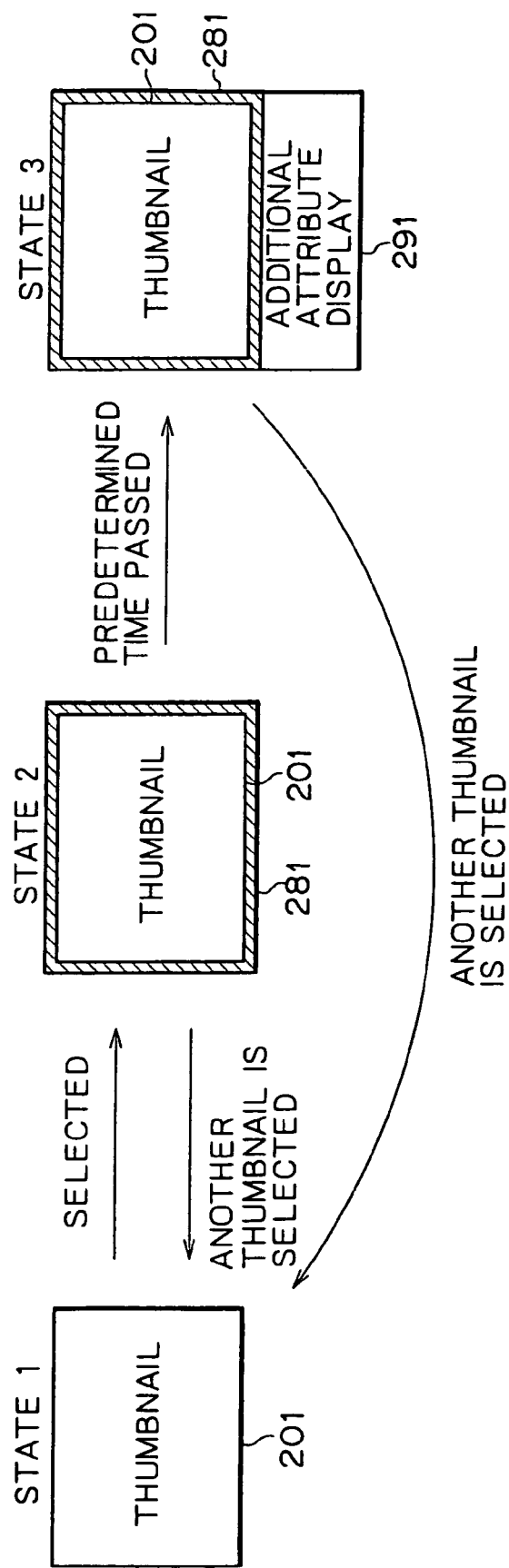
FIG. 54 is a diagram illustrating the processing of displaying an additional attribute display.

FIG. 54 illustrates the attributes for example of the data corresponding to the selected thumbnail 201. When a thumbnail 201 is selected, the display program 54F displays a frame 281 and, if a predetermined time has passed with the touch pad 6 for example not operated, displays, on an additional attribute display 291, such attributes as file name, data title, data size, and reproduction time of the file of the data corresponding to the thumbnail 201.

When the thumbnail 201 is not selected, the display program 54F deletes the frame 281 and the additional attribute display 291 of that thumbnail 201.

Figure 55:
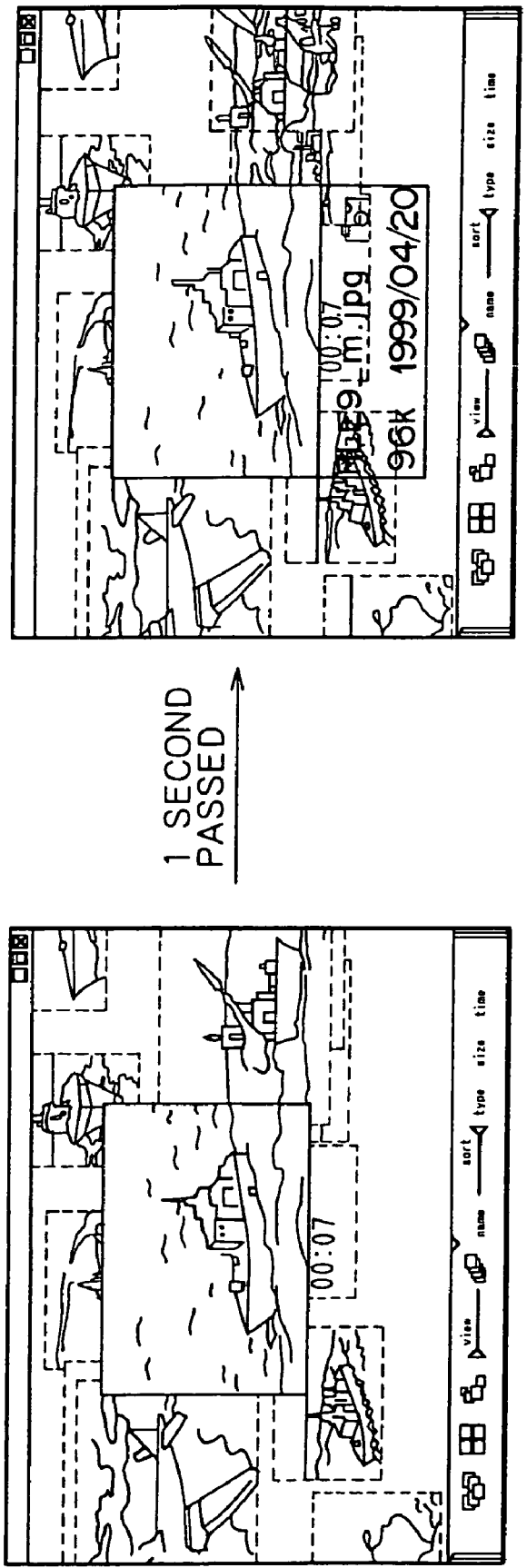
FIG. 55 is a diagram illustrating one example of displaying the additional attribute display.
Figure 56:
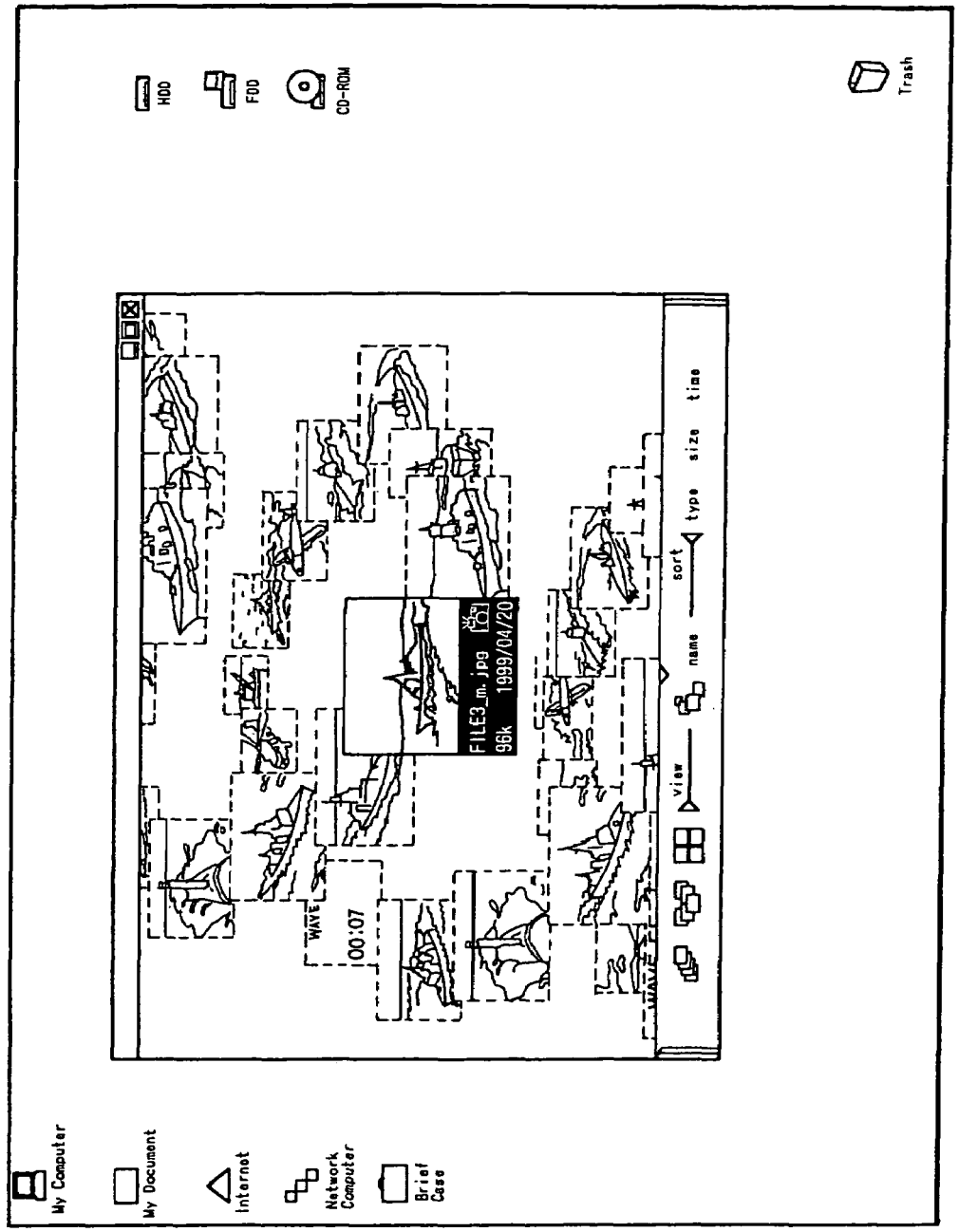
FIG. 56 is a diagram illustrating one example of displaying thumbnails and others in all or part of the screen of the LCD.

For example, as shown in FIG. 55, if 1 second has passed after the selection of the thumbnail 201, the display program 54F displays on the additional attribute display 291 the file name, icon indicative of still or moving image, data size, and date. In the example shown in FIG. 55, the additional attribute display 291 has a transparent frame and a transparent background in order to allow the user to visually recognize other not selected thumbnails 201.

The following describes a full screen display mode for displaying a full screen on the LCD 7. After startup, the display program 54F displays thumbnails 201 and others in a predetermined range in the display area of the LCD 7.

Figure 57:
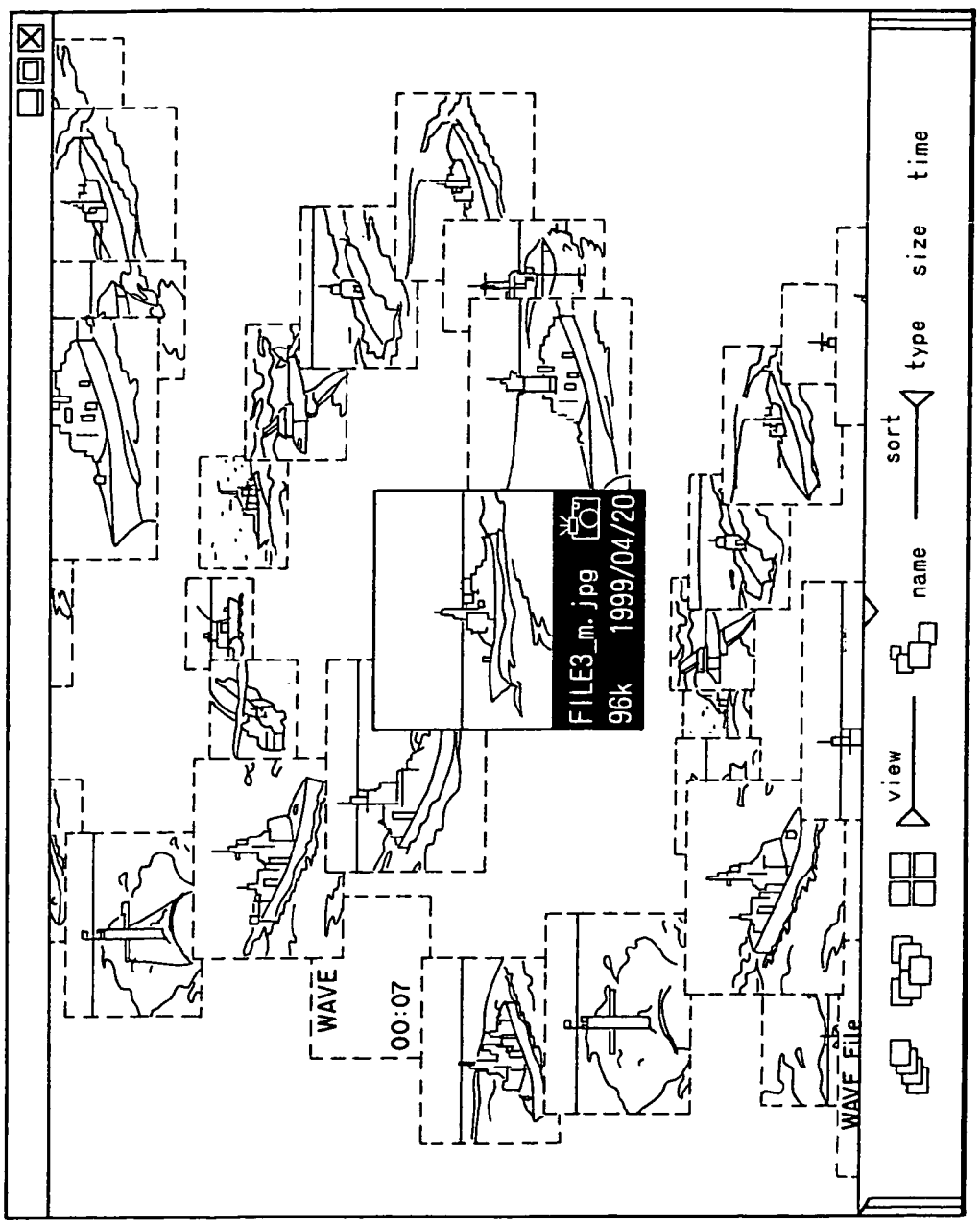
FIG. 57 is a diagram illustrating one example of displaying thumbnails and others all over the screen of the LCD.

When a predetermined icon or a predetermined key of the keyboard 5 is operated, the display program 54F displays thumbnails 201 and others in all display area of the screen of the LCD 7 as shown in FIG. 57. With the entire display area of the screen of the LCD 7 displayed with images by the display program 54F, the personal computer 1 accepts an operation of the jog dial 4, the touch pad 6, or the keyboard 5 as an input made to the display program, except for the combined operations of specific keys.

Figure 58:
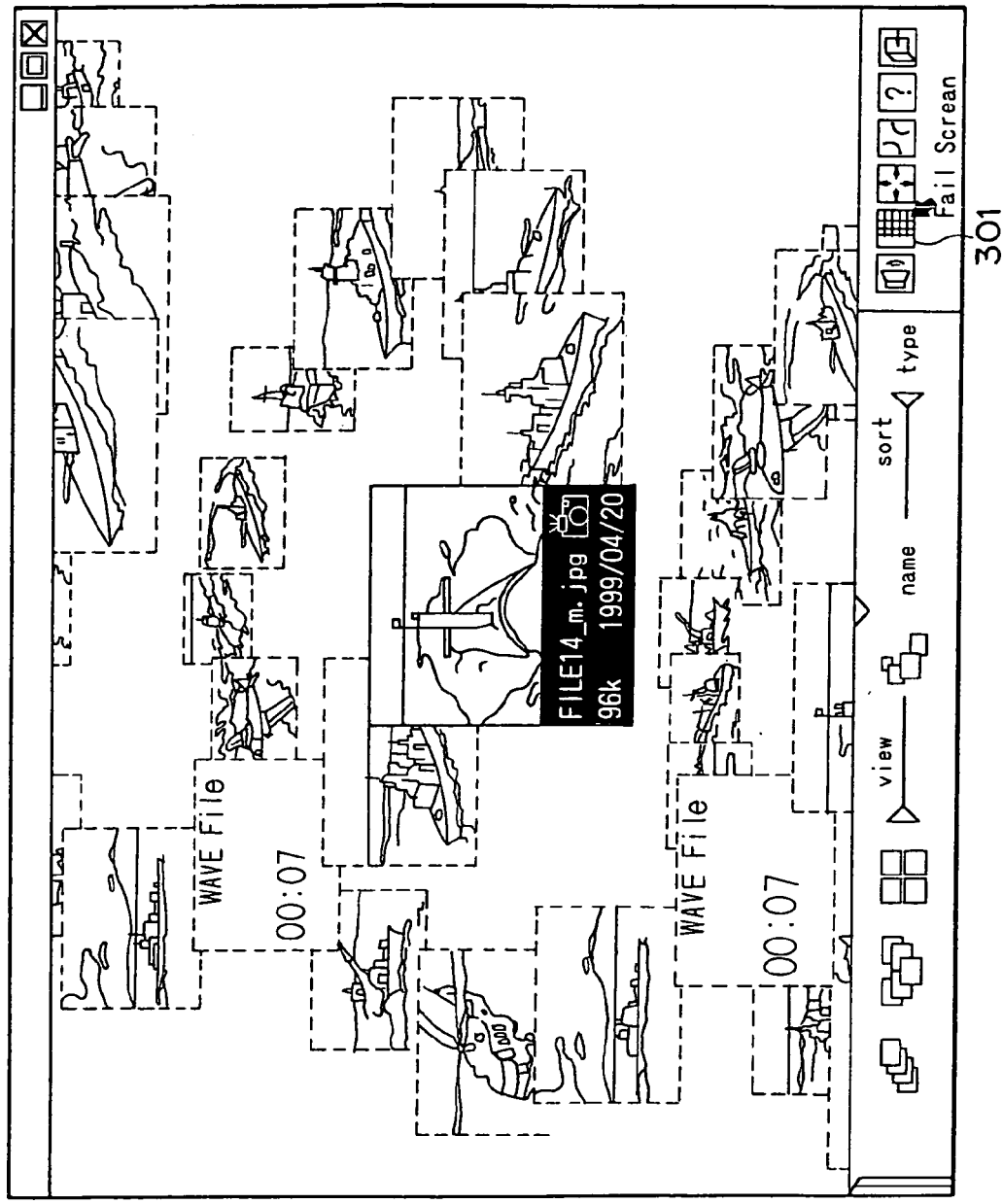
FIG. 58 is a diagram illustrating an icon.

When the thumbnails 201 and others are displayed in the predetermined range of the display area of the screen on the LCD 7, operating an icon 301 shown in FIG. 58 causes the display program 54F to display the thumbnails 201 and others in all of the display area of the screen on the LCD 7. When the thumbnails 201 and others are displayed in all of the display area of the screen on the LCD 7, operating the icon 301 shown in FIG. 58 causes the display program 54F to display the thumbnails 201 and others in a predetermined range of the display area of the screen on the LCD 7.

Figure 59:
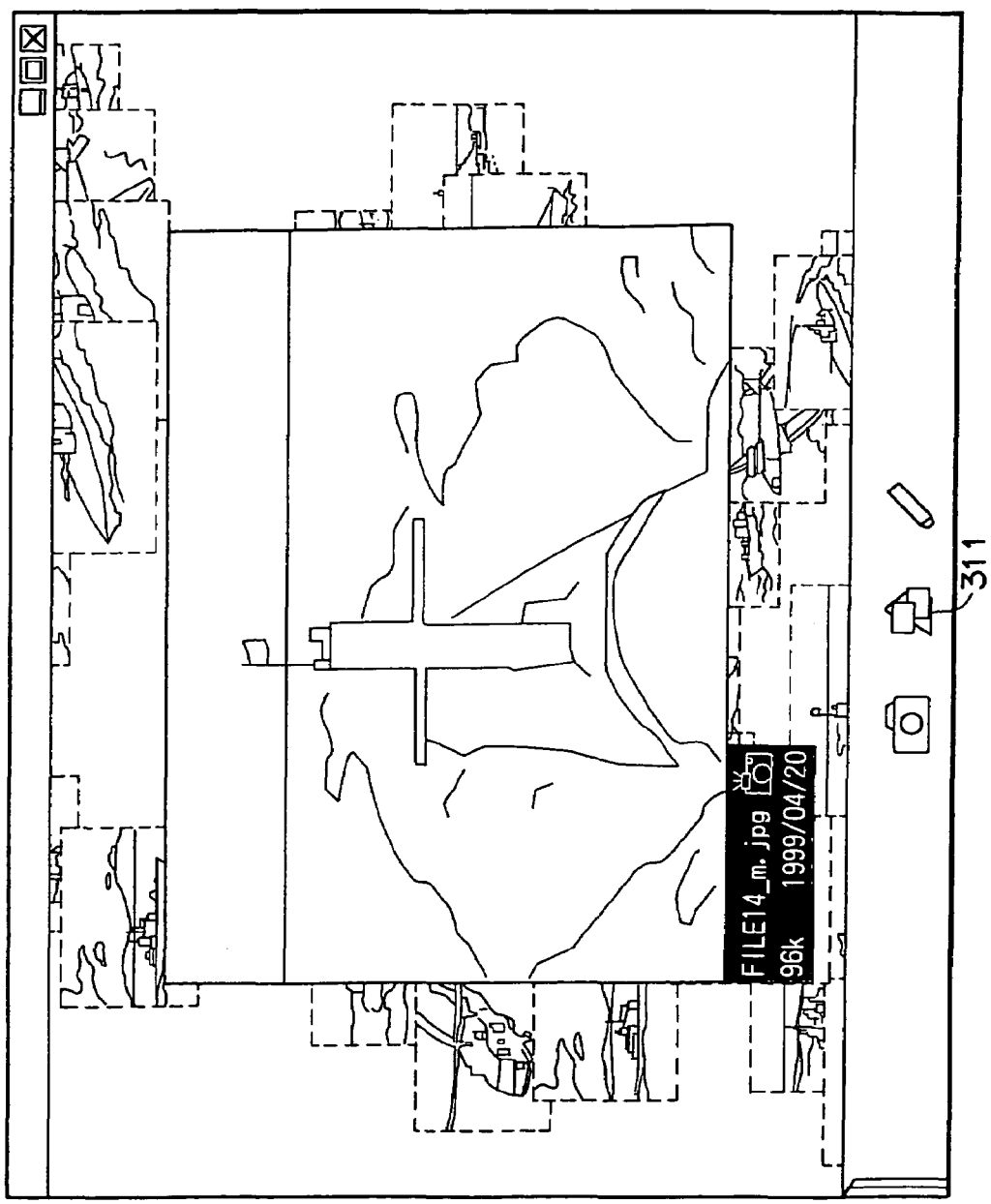
FIG. 59 is a diagram illustrating an icon.

When the thumbnails 201 and others are displayed in all of the display area of the screen on the LCD 7, clicking an icon 311 shown in FIG. 59 causes the display program 54F to display the thumbnails 201 and others in a predetermined range of the display area of the screen on the LCD 7 and start another application program corresponding to the icon 311.

Thus, when the user operates the icon 301 or a predetermined key of the keyboard 5, the display program 54F can display thumbnails 201 and others in all of the display area of the screen on the LCD 7. When thumbnails 201 and others are displayed in all of the display area of the screen on the LCD 7, the display program 54F can directly startup another application program in response to the operation of the icon 311. Displaying thumbnails 201 and others on all of the screen of the LCD 7 can prevent such erroneous operations by the user as operating other application programs for example.

If the application program corresponding to the icon 311 has been started up, the user is wanting to link the display program 54F with the application program in many cases, so that the display program 54F automatically displays thumbnails 201 and others in a predetermined range of the display area of the screen on the LCD 7. Consequently, the user can efficiently manipulate the display program 54F and the application program.

The following describes the processing of the display program 54F and the reading program 54G to be executed by the CPU 51.

Figure 60:
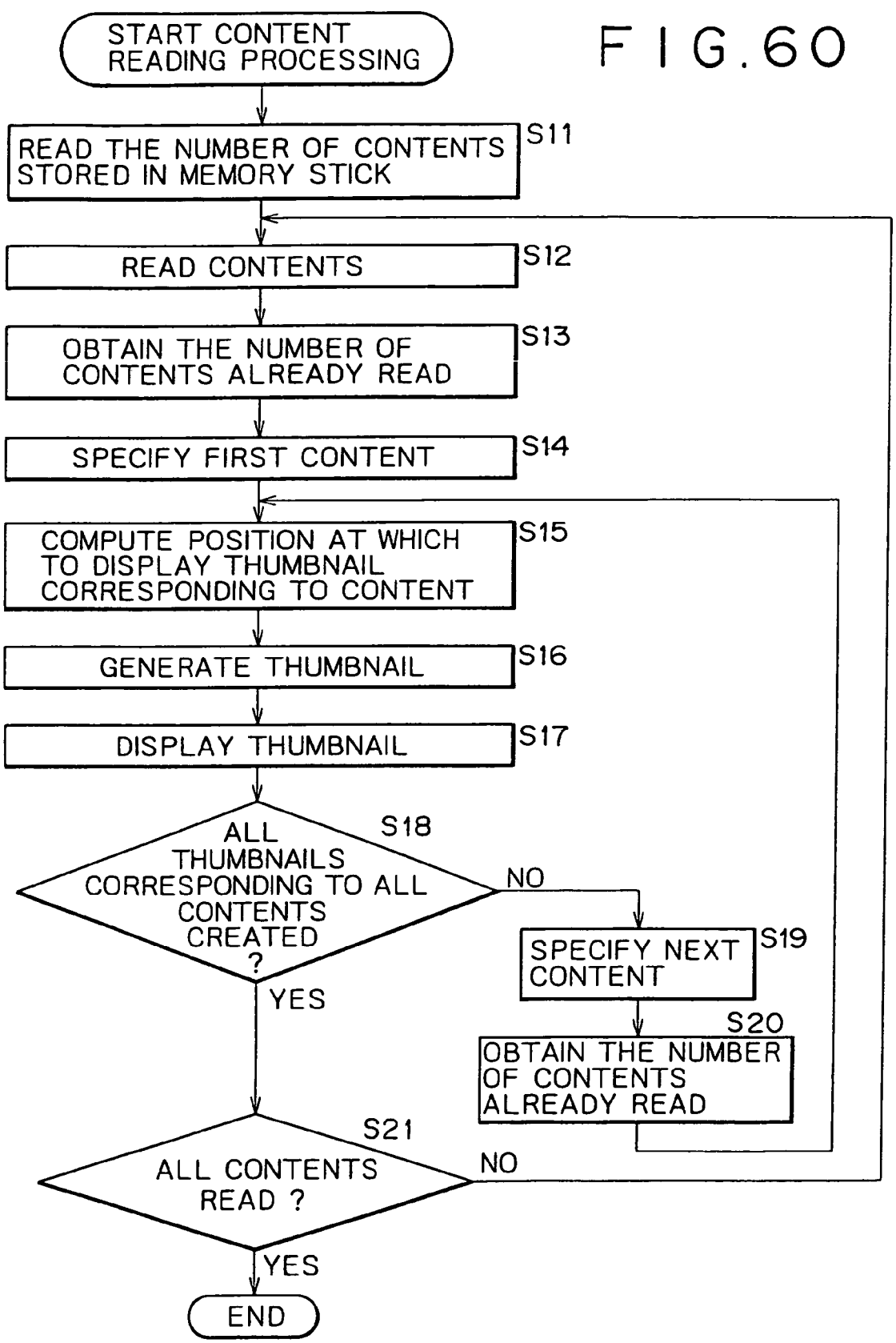
FIG. 60 is a flowchart describing the processing of reading content.

FIG. 60 is a flowchart describing the content reading processing to be executed by the display program 54F and the reading program 54G. In step S11, the reading program 54G reads the number of content items stored in the memory stick 116, via the memory stick interface 114. The reading program 54G supplies the number of content items stored in the memory stick 116 to the display program 54F.

In step S12, the reading program 54G sequentially reads the items of content from the memory stick 116 via the memory stick interface 114 and supplies the read items of content to the display program 54F. The content reading process by the reading program 54G from the memory stick 116 is executed concurrently with the following processing.

In step S13, the processing manager 151 of the display program 54F obtains the number of content items read by the reading program 54G on the basis of the data supplied from the reading program 54G. In step S14, the processing manager 151 of the display program 54F specifies the first item of content read by the reading program 54G.

In step S15, the processing manager 151 of the display program 54F computes a position at which the thumbnail 201 corresponding to the content is displayed. In step S16, the content processing routine 152 of the display program 54F generates a thumbnail 201 for the read content. In step S17, the content processing routine 152 of the display program 54F displays the thumbnail 201 at the position computed by the processing manager 151. If the position at which the thumbnail 201 is to be displayed is outside the display area of the LCD 7, the content processing routine 152 does not display the thumbnail 201.

In step S18, the display program 54F checks whether all thumbnails for all items of content which have been read are generated or not. If all the thumbnails 201 corresponding to all items of content are not generated, then the procedure goes to step S19, in which the processing manager 151 of the display program 54F specifies the next item of content read by the reading program 54F.

In step S20, the processing manager 151 of the display program 54F obtains the number of content items read by the reading program 54G on the basis of the data supplied from the reading program 54G and then the procedure returns to step S15 to repeat the abovementioned processing of generating thumbnails 201.

If, in step S18, all thumbnails 201 corresponding to all items of content read have been generated, then the procedure goes to step S21, in which the display program 54F determines whether all content items stored in the memory stick 116 have been read. If all content items stored in the memory stick 116 have not been read, then the procedure returns to step S12 to repeat the content reading process.

If, in step S21, all content items stored in the memory stick 116 have been read, then the thumbnails 201 corresponding to these content items are generated, upon which the generation process comes to an end.

Thus, the display program 54F and the reading program 54G can sequentially read the content items from the memory stick 116 and generates the thumbnails 201 corresponding to these content items, displaying the generated thumbnails 201 on the LCD 7.

Figure 61:
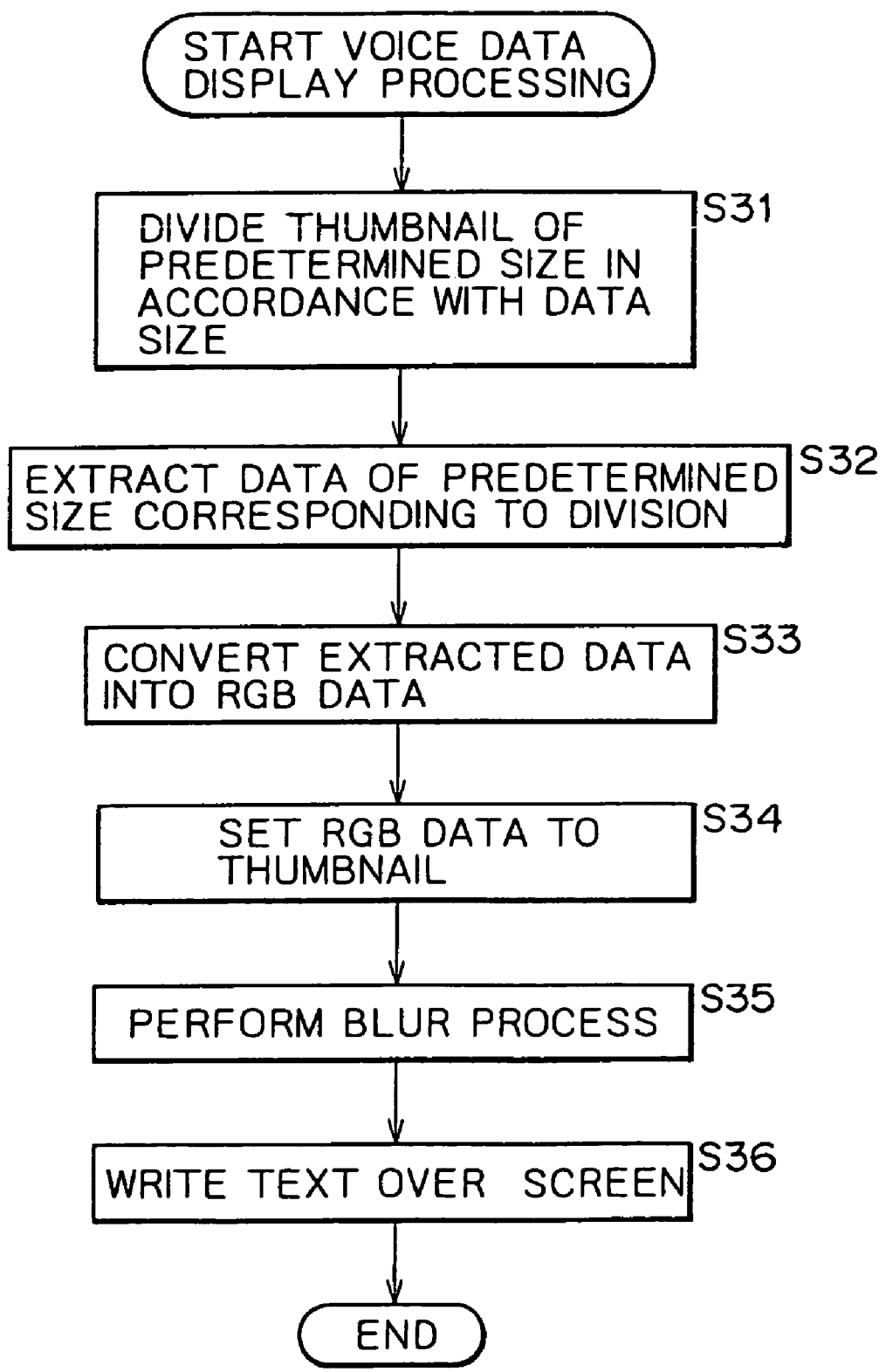
FIG. 61 is a flowchart describing the processing of displaying voice data.

The following describes the voice data display processing to be executed by the display program 54F, with reference to the flowchart shown in FIG. 61. In step S31, the display program 54F divides the thumbnail 201 having a predetermined size into a predetermined number of areas in accordance with the size of voice data. If the voice data is large, the display program 54F increases the number of divisions of the thumbnail 201; if the voice data is small, the display program 54F decreases the number of divisions of the voice data.

In step S32, the display program 54F extracts the data of a predetermined length corresponding to the division number (the number of areas) of the thumbnail 201 from the voice data. In step S33, the display program 54F converts the extracted data into RGB data (the number of pieces of the RGB data which is equal to the number of areas) by the processing described with reference to FIG. 11. In step S34, the display program 54F sets, one to one, the resultant RGB data pieces to the thumbnail 201 areas generated by the division.

In step S35, the display program 54F performs a blur operation (a blur process) on the thumbnail 201. In step S36, the display program 54F writes text indicative of voice data attributes for example at a predetermined position in the thumbnail 201, upon which the processing comes to an end.

Thus, the display program 54F can create the thumbnail 201 of the voice data in correspondence with its size. In the same manner, the display program 54F creates a thumbnail 201 corresponding to text data for example.

Figure 62:
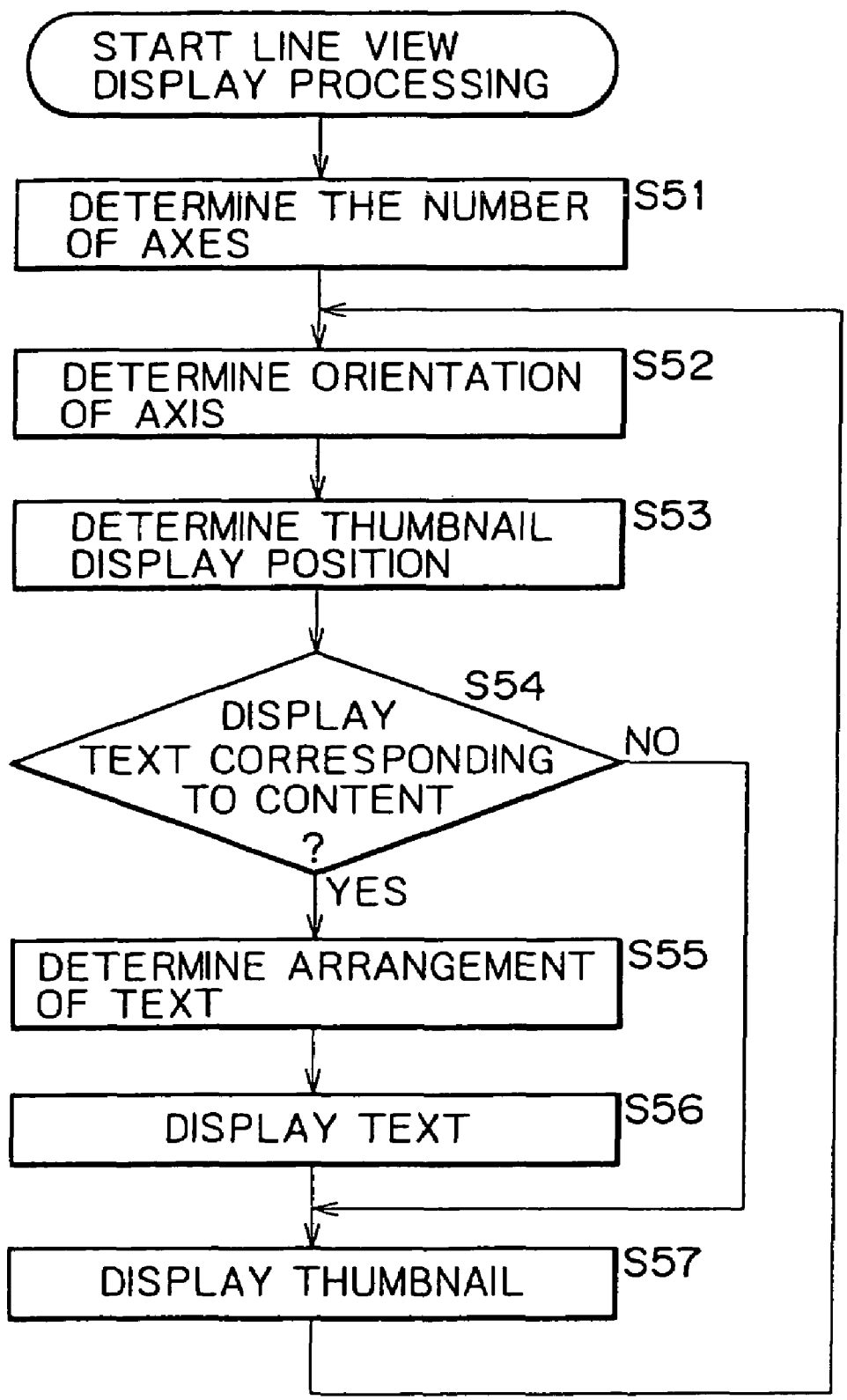
FIG. 62 is a flowchart describing the processing of displaying a line view.

The following describes the line view display processing to be executed by the display program 54F, with reference to the flowchart shown in FIG. 62. In step S51, the display program 54F determines the number of axes 221. For example, when displaying only the thumbnail 201, the display program 54F uses only 1 axis 221; when displaying a thumbnail 201 and the text 211, the display program 54F uses 2 axes 221.

In step S52, the display program 54F determines the orientation of the axis 221 from the equation (1) or (2). In step S53, the display program 54F determines a display position of the thumbnail 201 on the basis of the axis 221.

In step S54, the display program 54F determines whether to display the text 211 corresponding to the content. If the text 211 corresponding to the content is to be displayed, then, in step S55, the display program 54F determines the arrangement of the text 211 on the basis of the axis 221. In step S56, the display program 54F displays the text 211 at the position defined by the process of step S55 and then the procedure goes to step S57.

If, in step S54, the text 211 corresponding to the content is not be displayed, the process for displaying the text 211 is not required, so that the processes in steps S55 and S56 are skipped, the procedure going to step S57.

In step S57, the display program 54F displays the thumbnail 201 at the position defined by the process of step S53 and the procedure returns to step S52 to repeat the display processing.

Thus, the display program 54F displays the thumbnail 201 and the text 211 on the basis of the open axes 221 such as line or curve.

Figure 63:
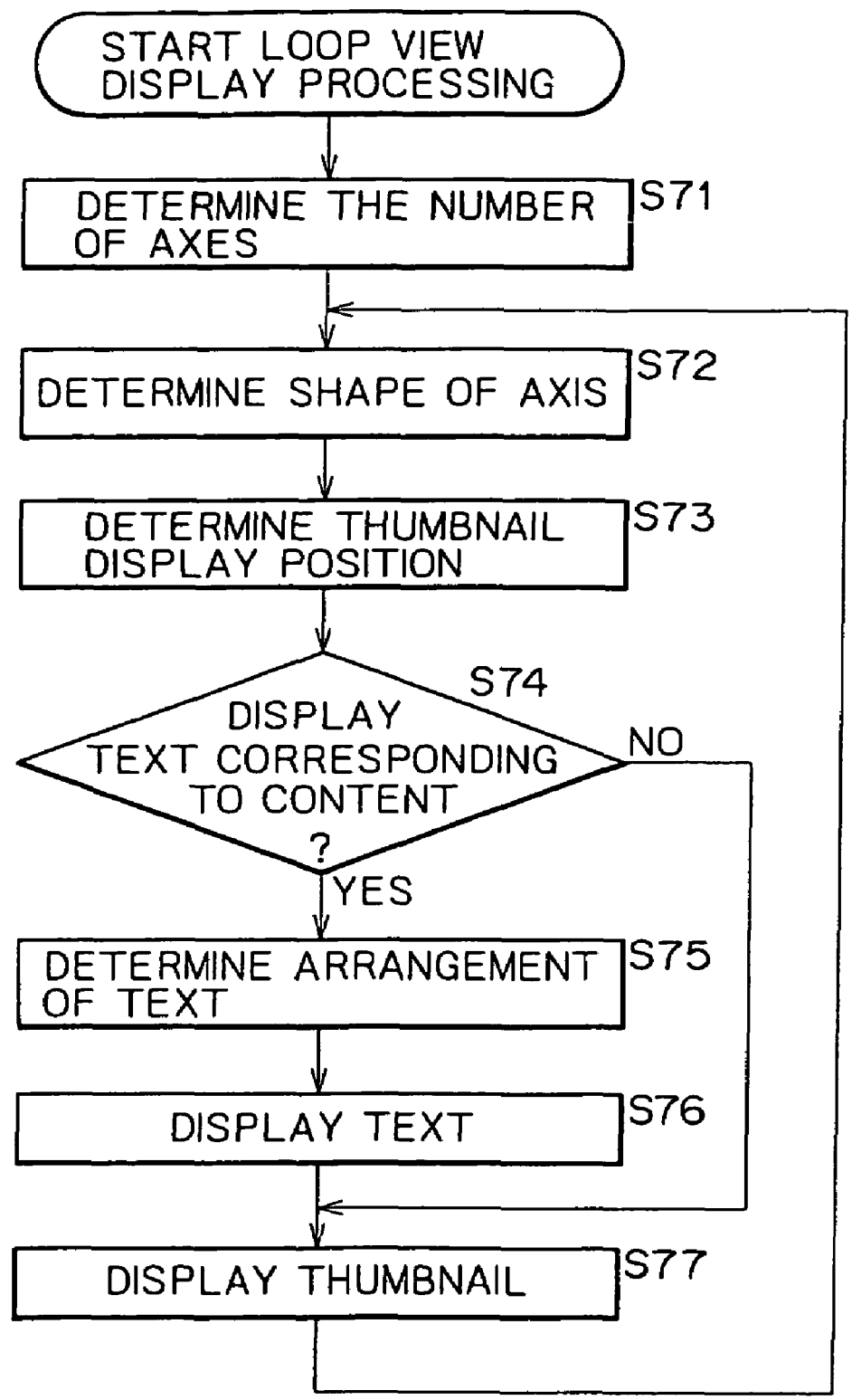
FIG. 63 is a flowchart describing the processing of displaying a loop view.

The following describes the loop view display processing to be executed by the display program 54F, with reference to the flowchart shown in FIG. 63. In step S71, the display program 54F determines the number of axes 241. For example, when displaying only a thumbnail 201, the number of axes 241 is set to 1; when displaying a thumbnail 201 and a text 211, the number of axes 241 is set to 2.

In step S72, the display program 54F determines the shape of the axis 241. In step S73, the display program 54F determines the display position of the thumbnail 201 from equation (6) on the basis of the axis 241, for example.

In step S74, the display program 54F determines whether to display a text 211 corresponding to the content. If the text 211 corresponding to the content is to be displayed, the procedure goes to step S75, in which the arrangement of the text 211 is defined on the basis of the axis 241. In step S76, the display program 54F displays the text 211 at the position defined by the process of step S75 and the procedure goes to step S77.

If, in step S74, the text 211 corresponding to the content is not to be displayed, the process of displaying the text 211 is not required, so that the processes of steps S75 and S76 are skipped and the procedure goes to step S77.

In step S77, the display program 54F displays the thumbnail 201 at the position defined by the process of step S73 and the procedure returns to step S73 to repeat the display processing.

Thus, the display program 54F displays the thumbnail 201 and the text 211 on the basis of the axes 221 in an enclosed shape such as a circle or an ellipse.

Figure 64:
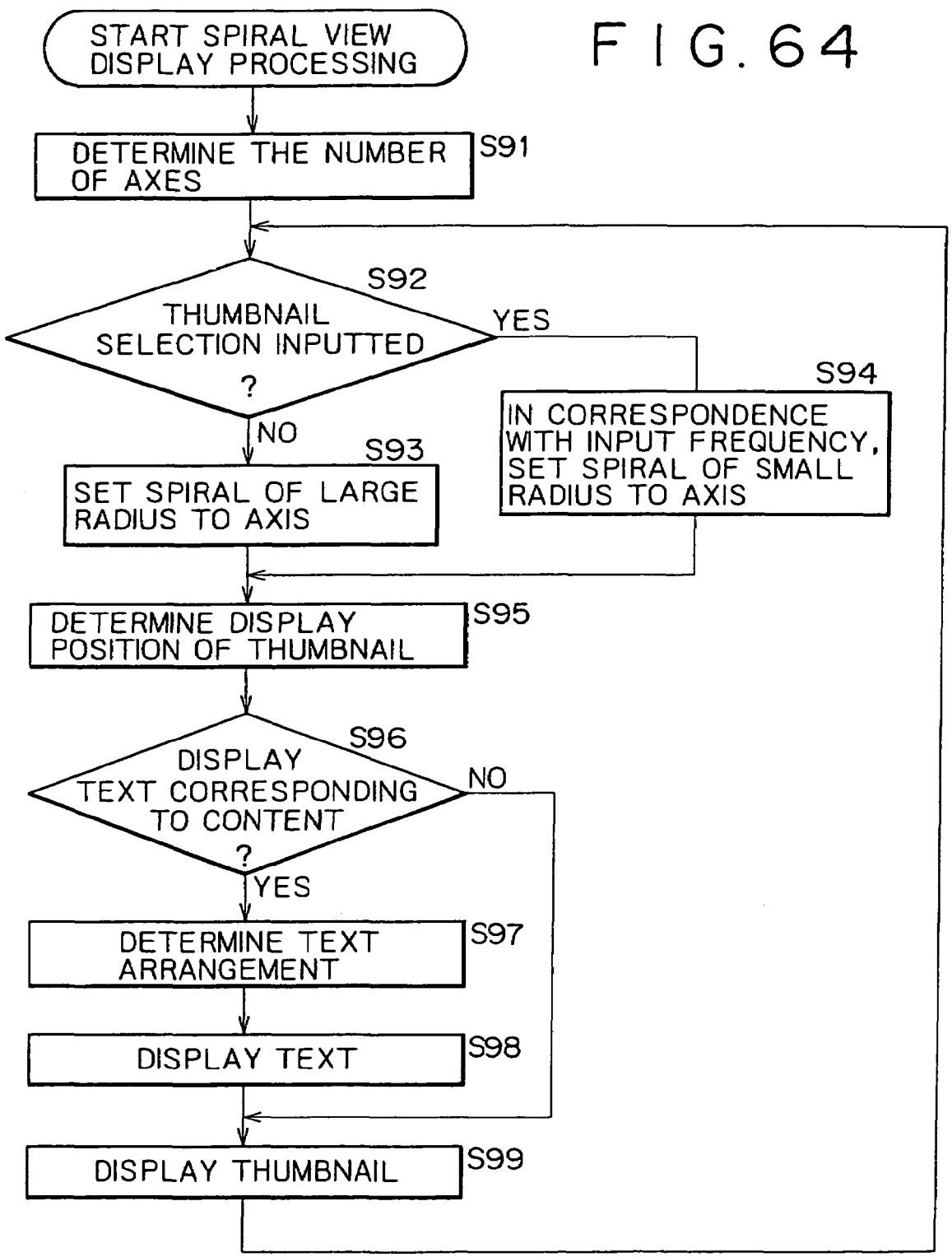
FIG. 64 is a flowchart describing the processing of displaying a spiral view.

The following describes the spiral view display processing to be executed by the display program 54F, with reference to the flowchart shown in FIG. 64. In step S91, the display program 54F determines the number of axes 261. For example, when displaying only a thumbnail 201, the number of axes 261 is set to 1; when displaying a thumbnail 201 and a text 211, the number of axes 261 is set to 2.

In step S92, the display program 54F determines whether the jog dial 4, the keyboard 5, or the touch pad 6 has been operated to select a thumbnail 201. If the selection of a thumbnail 201 has not been made, the procedure goes to step S93, in which the display program 54F sets a spiral having large radius r, upon which the procedure goes to step S95.

If, in step S92, the selection of a thumbnail 201 has been made, then the procedure goes to step S94, in which the display program 54F sets a spiral having smaller radius r to the axis 261 in accordance with the selection frequency per unit time, upon which the procedure goes to step S95.

In step S95, the display program 54F determines the display position of the thumbnail 201 from equations (11), (12), and (13) for example on the basis of the axis 261.

In step S96, the display program 54F determines whether to display the text 211 corresponding to a specific piece of content. If the text 211 corresponding to the content is to be displayed, then the procedure goes to step S97 to determine the arrangement of the text 211 on the basis of the axis 261. In step S98, the display program 54F displays the text 211 at the positioned defined by the process of step S97 and the procedure goes to step S99.

If, in step S96, the text 211 corresponding to the content is not to be displayed, the process of displaying the text 211 is not required and therefore the processes of steps S97 and S98 are skipped, the procedure going to step S99.

In step S99, the display program 54F displays the thumbnail 201 at the position defined by the process of step S95, upon which the procedure returns to step S92 to repeat the display processing.

Thus, the display program 54F displays the thumbnail 201 and the text 211 on the basis of the axis 261 of the spiral. If the selection of the thumbnail 201 is found, the display program 54F displays the thumbnail 201 and the text 211 on the basis of the axis 261 of the spiral having small radius r.

Figure 65:
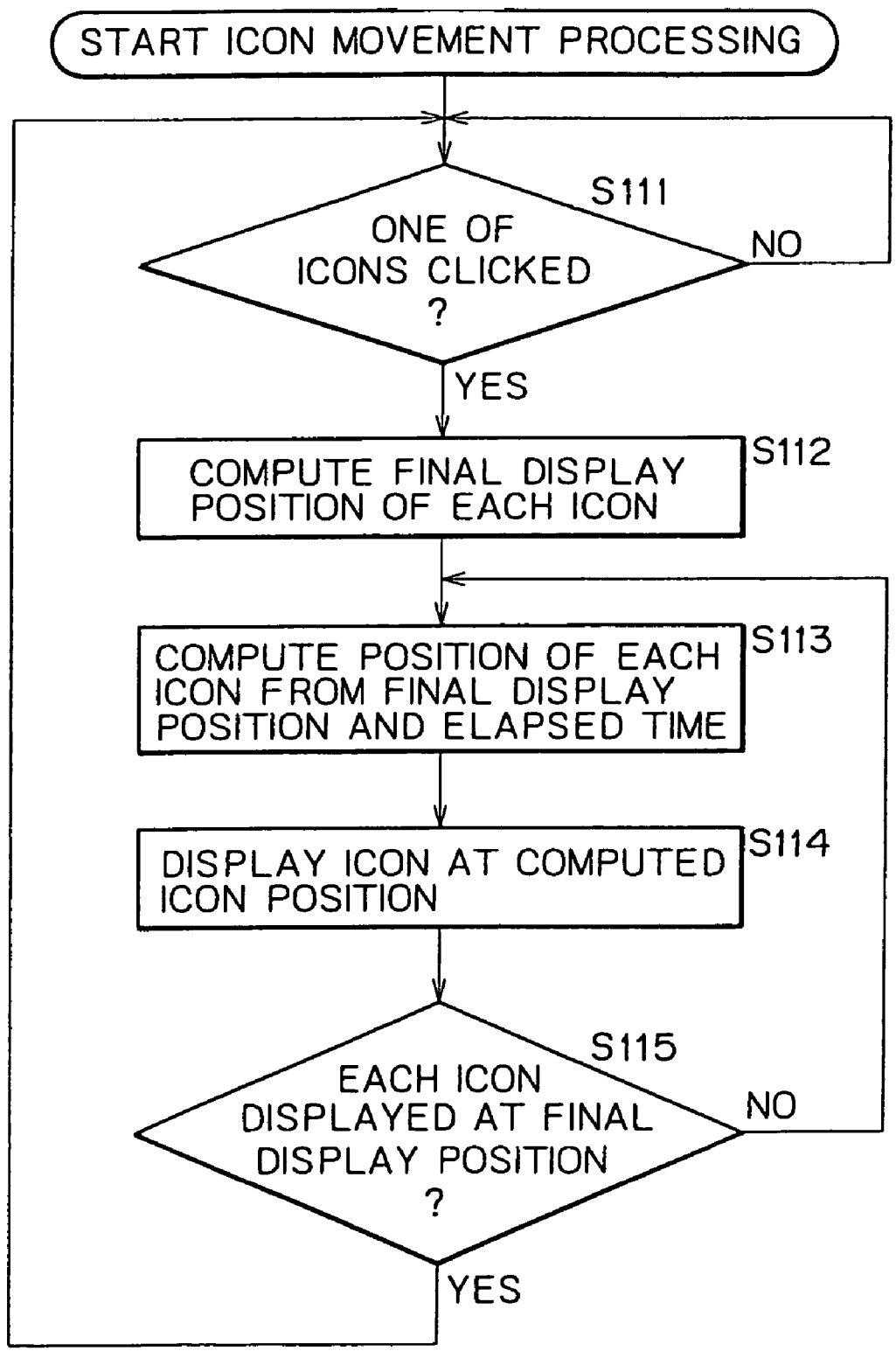
FIG. 65 is a flowchart describing the processing of moving an icon.

The following describes the movement of an icon 202 to be executed by the display program 54F, with reference to the flowchart shown in FIG. 65. In step S111, the processing manager 151 of the display program 54F determines which of the icons 202 has been clicked on the basis of the input supplied from the touch pad 6. If none of the icons 202 has been clicked, the procedure returns to step S111, in which the processing manager 151 repeats the determination until one of the icons 202 is clicked.

If, in step S111, if one of the icons 202 is found clicked, then the procedure goes to step S112, in which the processing manager 151 of the display program 54F computes the final display position of the clicked icon 202.

In step S113, the processing manager 151 of the display program 54F computes the display position of each icon 202 on the basis of the final display position obtained by the process of step S112 and an elapsed time after the clicking. In step S114, the content processing routine 152 of the display program 54F displays the icon 202 at the position obtained by the process of step S113.

The display processing of the icon 202 in step S114 is performed at a period set by the processing manager 151. The period of the display processing of the icon 202 is appropriately selected so that the icon 202 is displayed as if it is moving.

In step S115, the processing manager 151 of the display program 54F determines whether each icon 202 has been displayed at the final display position. If each icon 202 has not been displayed at the final display position, the procedure returns to step S113 to repeat the icon display processing.

If, in step S115, each icon 202 has been displayed at the final display position, the procedure returns to step S111 to repeat the processing from the determination of whether the icon 202 has been clicked or not.

Thus, the display program 54F can display the movement of the icon 202 at a predetermined speed when it is clicked.

Figure 66:
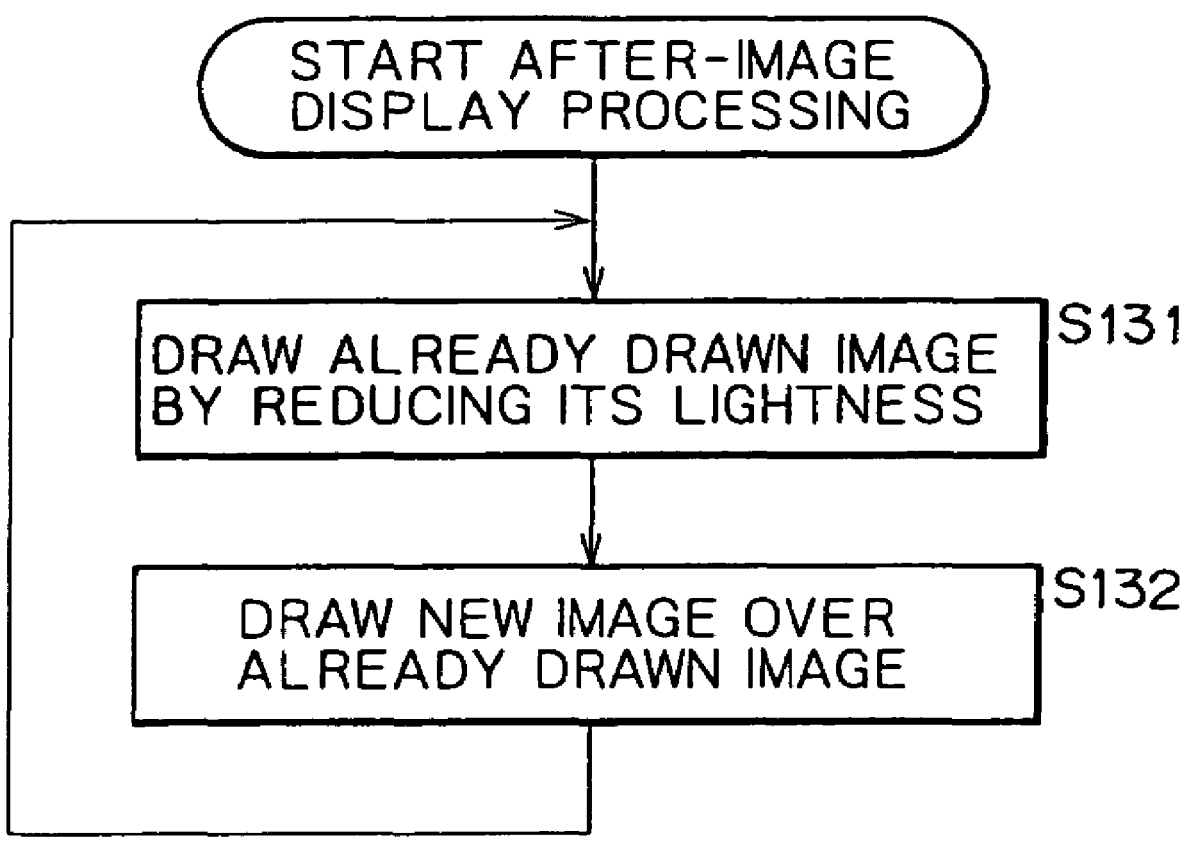
FIG. 66 is a flowchart describing the processing of displaying an after-image.

The following describes the after-image display processing to be executed by the display program 54F, with reference to the flowchart shown in FIG. 66. In step S131, the display program 54F draws an already drawn image by reducing its lightness (for example, to 80%).

In step S132, the display program 54F draws a new image over the image processed in step S131 and then the procedure returns to steps S131 to repeat the draw processing.

Thus, the display program 54F draws a new image over the preceding image, with gradually reducing lightness of the preceding image, so that the after-image can be displayed with ease.

Figure 67:
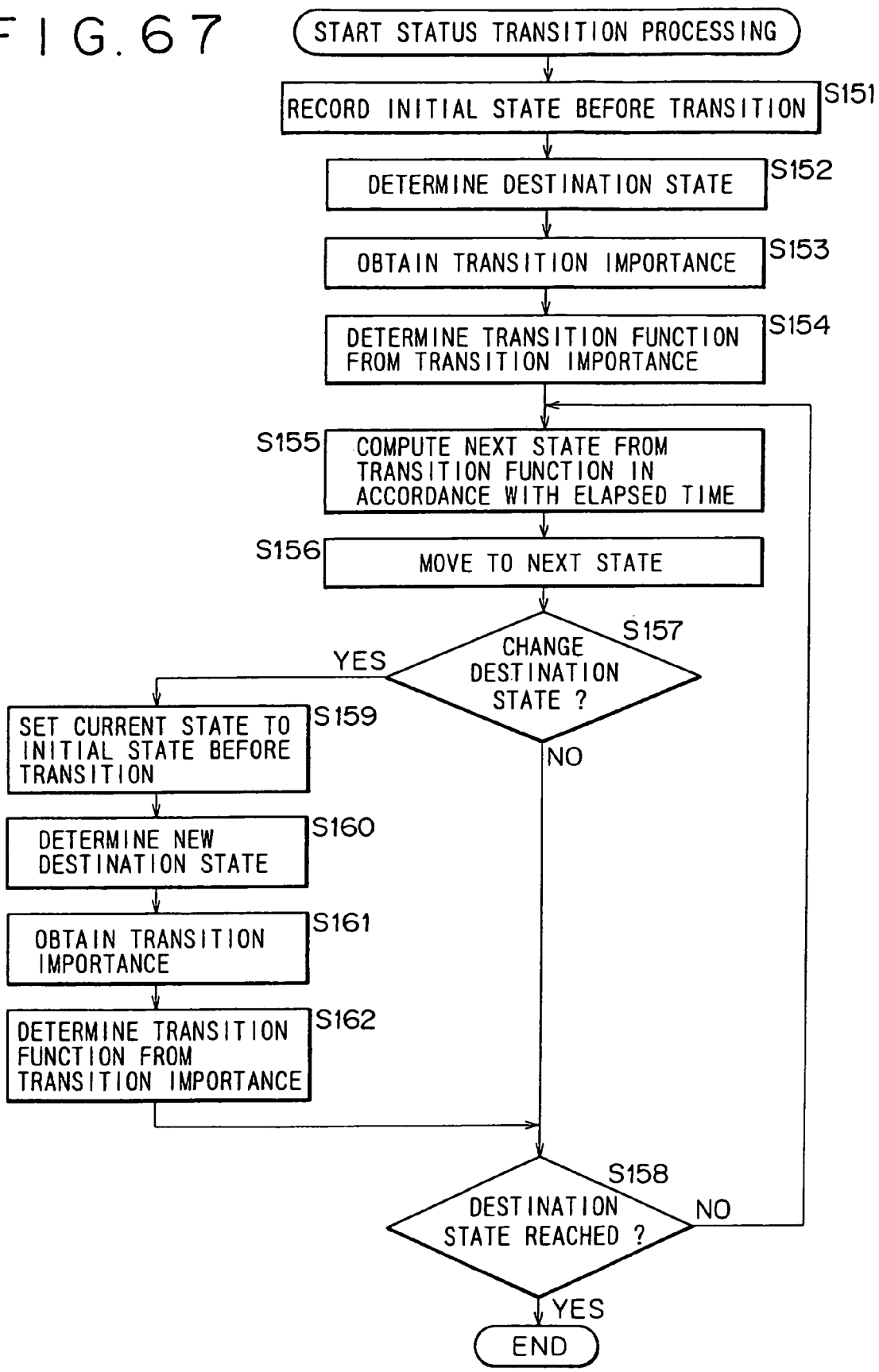
FIG. 67 is a flowchart describing the processing of status transition.

The following describes the status transition processing to be executed by the display program 54F, with reference to the flowchart shown in FIG. 67. In step S151, the display program 54F records the original state such as the current display position of a thumbnail 201 or an icon 202 from which transition takes place. In step S152, the display program 54F determines such a state of the destination of the transition as the display position of the thumbnail 201 or the icon 202.

In step S153, the display program 54F obtains the importance of transition. For example, the importance of transition is determined for each specific transition and the determined importance is stored in the display program 54F. In step S154, the display program 54F determines a transition function on the basis of the importance of transition. For example, when the transition is much important, the display program 54F selects a transition function which slows the status transition; when the transition is less important, the display program 54F selects a transition function which speeds up the status transition.

In step S155, the display program 54F computes a next state in correspondence with an elapsed time on the basis of the selected transition function. In step S156, the display program 54F moves to the state obtained in step S155. For example, the display program 54F computes the position of the thumbnail 201 or the icon 202 corresponding to the elapsed time in step S155 and displays the thumbnail 201 or the icon 202 at the obtained position in step S156.

In step S157, the display program 54F determines whether to change the state to which the transition is made, on the basis of a signal from the jog dial 4, the touch pad 6, or the keyboard 5. If the destination state is not to be changed, the procedure goes to step S158.

If, in step S157, the destination state is to be changed, then the procedure goes to step S159, in which the current state is set to the initial state before the transition. In step S160, the display program 54F determines such a destination state as the display position of the thumbnail 201 or the icon 202.

In step S161, the display program 54F obtains a new transition importance. In step S162, the display program 54F determines a transition function on the basis of the new transition importance.

In step S158, the display program 54F compares the current state with the destination state to determine whether the destination state has been reached or not. If the destination state has not been reached, the procedure returns to step S155 to repeat the processing from the computation of a next state.

If, in step S158, the destination state has been reached, the status transition processing comes to an end.

Thus, the display program 54F changes display states for example on the basis of transition functions and, if a request comes midway during a transition, moves from that state to the requested state. As described, the display program 54F selects a transition function on the basis of the importance of transition, so that, for a much important transition, it takes place comparatively slowly to enable the user to surely recognize the transition and, for a less important transition, it takes quickly.

The following describes the enlarged display processing to be executed by the display program 54F, with reference to the flowchart shown in FIG. 68. In step S181, the display program 54F determines, on the basis of a signal supplied from the touch pad 6, whether a thumbnail 201 has been clicked or not. If a thumbnail 201 is found not clicked, the procedure returns to step S181 to repeat the determination.

If, in step S181, a thumbnail 201 is found clicked, then the procedure goes to step S182, in which the display program 54F determines whether the clicked thumbnail 201 is at the center of the window.

If, in step S182, the clicked thumbnail 201 is not at the center of the window, then the procedure goes to step S183, in which the display program 54F changes the display so that the clicked thumbnail 201 comes to the center of the window, upon which the procedure returns to step S181 to repeat the above-mentioned processing.

If, in step S182, the clicked thumbnail 201 is found at the center of the window, then the procedure goes to step S184, in which the display program 54F displays the clicked thumbnail 201 in the enlarged mode (if the thumbnail 201 corresponds to still image data, the thumbnail is displayed with its original size, if the thumbnail 201 corresponds to moving image data, a moving image is generated, and if the thumbnail 201 corresponds to voice data, a voice is reproduced), then the procedure returns to step S181 to repeat the above-mentioned processing.

Thus, when a thumbnail 201 is clicked, the display program 54F displays the clicked thumbnail 201 at the center or in the enlarged mode, so that the user can quickly know the thumbnail 201 and the contents of the data corresponding to the thumbnail 201 with a simple operation.

Figure 69:
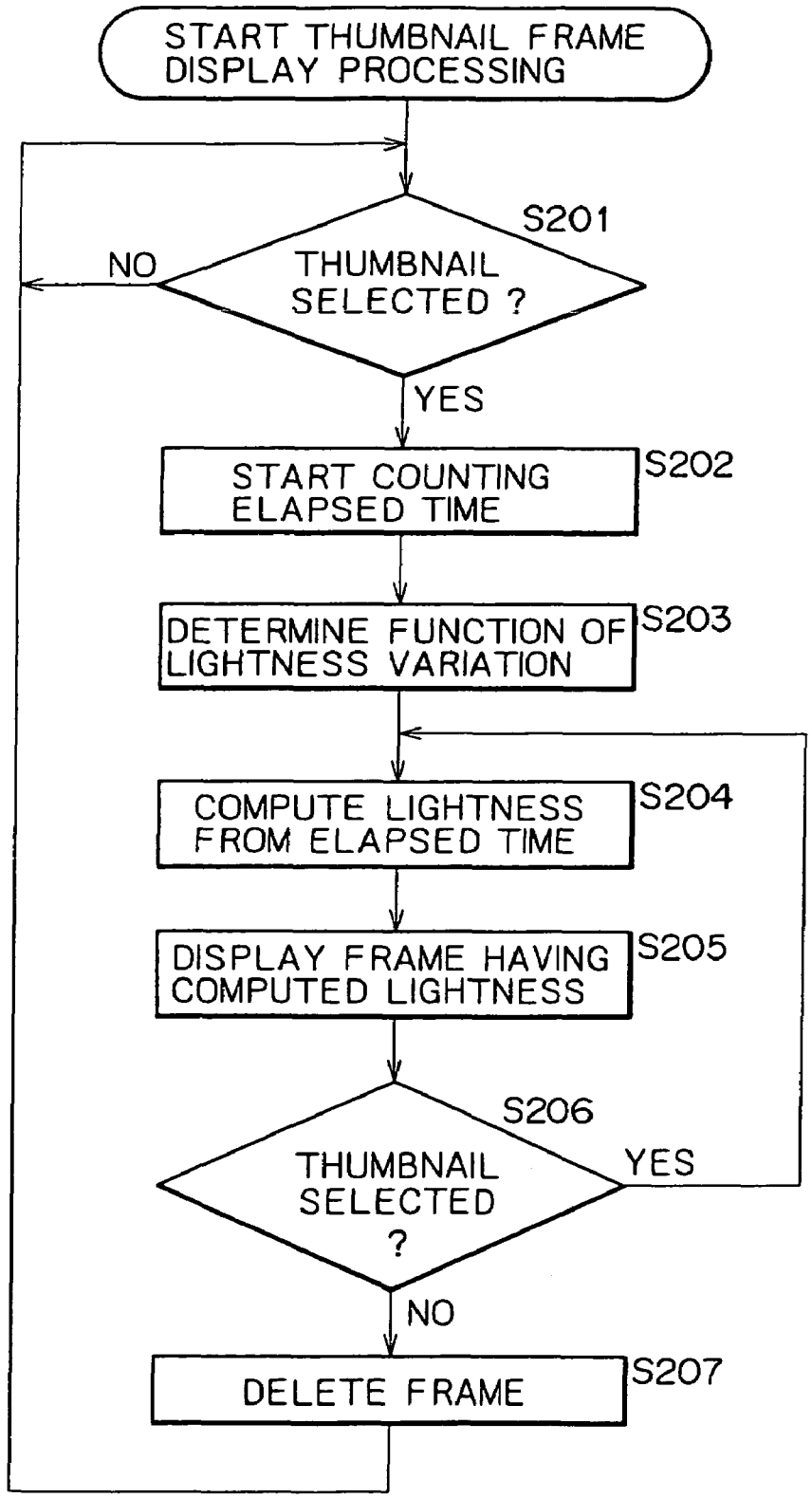
FIG. 69 is a flowchart describing the processing of displaying a frame.

The following describes the processing of displaying a frame 281 to be executed by the content processing routine 152 of the display program 54F, with reference to the flowchart shown in FIG. 69. In step S201, the content processing routine 152 determines whether the thumbnail 201 displayed by the content processing routine 152 is selected or not. If the thumbnail 201 displayed by the content processing routine 152 is found not selected, the procedure returns to step S201 to repeat the determination until that thumbnail 201 displayed is selected.

If, in step S201, that thumbnail 201 is found selected, then the procedure goes to step S202, in which the content processing routine 152 starts counting an elapsed time. The elapsed time counting is continued in the following processing.

In step S203, the content processing routine 152 determines a lightness variation function as shown in the example of FIG. 52 for example. In step S204, the content processing routine 152 computes the lightness of the frame 281 on the basis of the elapsed time. In step S205, the content processing routine 152 displays the frame 281 having the lightness computed in step S204.

In step S206, the content processing routine 152 determines whether the thumbnail 201 displayed by the content processing routine 152 is selected or not. If the thumbnail 201 shown by the content processing routine 152 is found selected, the procedure goes to step S204 to repeat the processing of displaying the frame 281.

If, in step S206, the thumbnail 201 displayed by the content processing routine 152 is found not selected, then the procedure goes to step S207, in which the content processing routine 152 deletes the frame 281. Then the procedure returns to step S201 to repeat the processing of displaying the frame 281.

Thus, the display program 54F can display the frame 281 with its lightness periodically varied onto the selected thumbnail 201. In the like processing, the display program 54F can display the frame 281 with its saturation or hue periodically varied onto the selected thumbnail 201.

Figure 70:
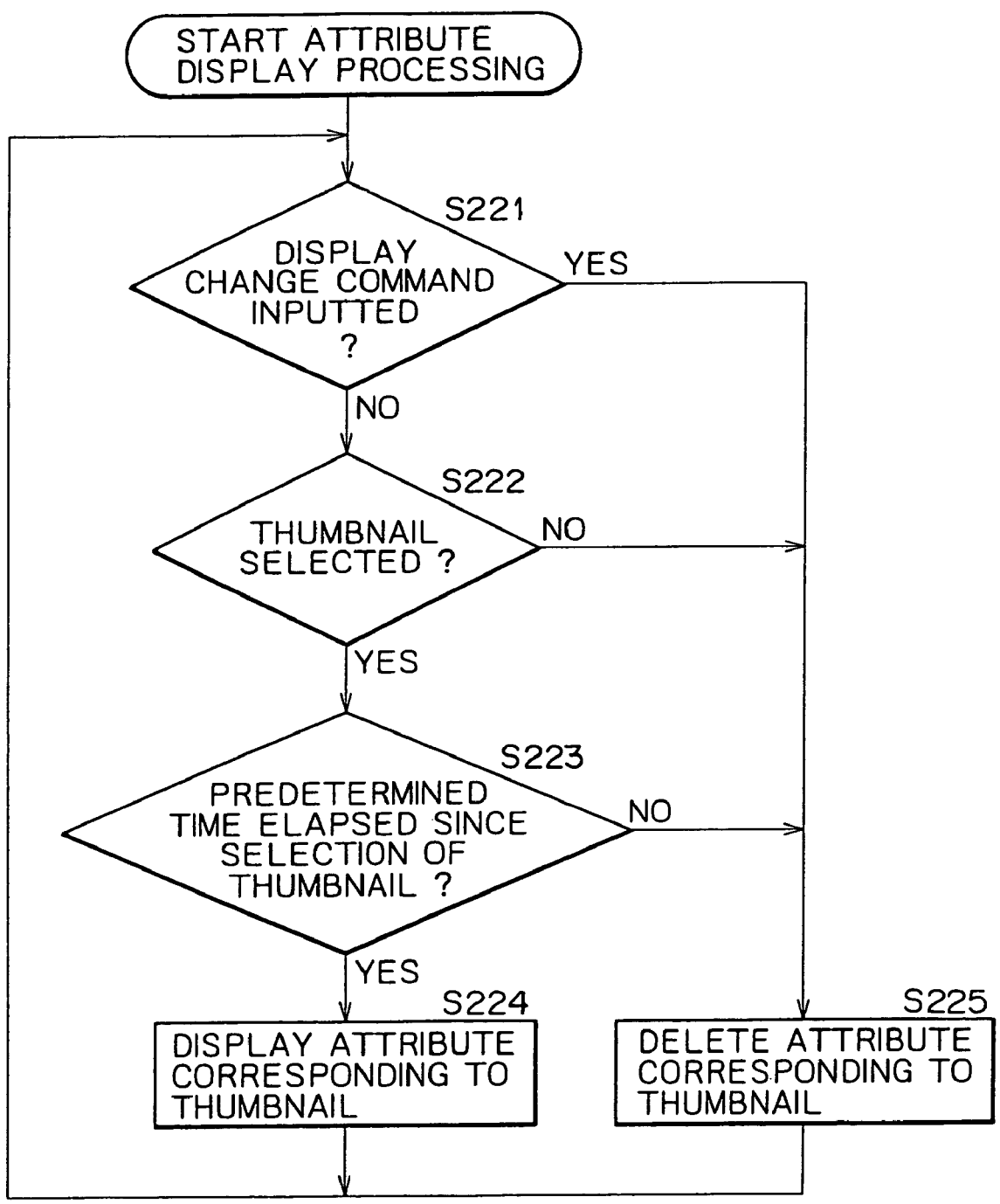
FIG. 70 is a flowchart describing the processing of displaying attributes.

The following describes the processing of displaying an additional attribute display 291 to be executed by the content processing routine 152 of the display program 54F, with reference to the flowchart shown in FIG. 70. In step S221, the display program 54F determines, on the basis of a signal coming from the jog dial 4, the touch pad 6, or the keyboard 5 whether a display change command has been inputted or not. If the display change command is not found inputted, the procedure goes to step S222, in which the content processing routine 152 determines whether the thumbnail displayed by the content processing routine 152 is selected or not.

If, in step S222, the thumbnail 201 shown by the content processing routine 152 is found selected, then the procedure goes to step S223, in which the content processing routine 152 determines whether a predetermined time (for example, 1 second) has passed since the selection of the thumbnail 201.

If, in step S223, the predetermined time is found passed, then the procedure goes to step S224, the content processing routine 152 displays the additional attribute display 291 having a semitransparent frame and background including corresponding text onto the thumbnail 201, upon which the procedure returns to step S221 to repeat the above-mentioned processing.

If, in step S221, a display change command is found inputted, it indicates that a process such as movement of the thumbnail 201 has been executed, so that the procedure goes to step S225, in which the content processing routine 152 deletes the additional attribute display 291 corresponding to the thumbnail 201, upon which the procedure returns to step S221 to repeat the above-mentioned processing.

If, in step S222, the thumbnail 201 displayed by the content processing routine 152 is not found selected, it indicates that the additional attribute display 291 need not be displayed. The procedure goes to step S225, in which the content processing routine 152 deletes the additional attribute display 291 corresponding to the thumbnail 201, upon which the procedure returns to step S221 to repeat the above-mentioned processing.

If, in step S223, the predetermined time is found not passed, then the procedure goes to step S225, in which the content processing routine 152 deletes the additional attribute display 291 corresponding to the thumbnail 201, upon which the procedure returns to step S221 to repeat the same processing.

Thus, after the selection of the thumbnail 201 and the passing of a predetermined time, the display program 54F displays the additional attribute display 291 corresponding to the selected thumbnail 201, thereby enabling high-speed display variation without intervening an operation by the user.

Because the frame and background of the additional attribute display 291 to be displayed by the display program 54F are semitransparent, the user can check the thumbnails 201 and others arranged under (in the depth of screen) the additional attribute display 291.

Figure 71:
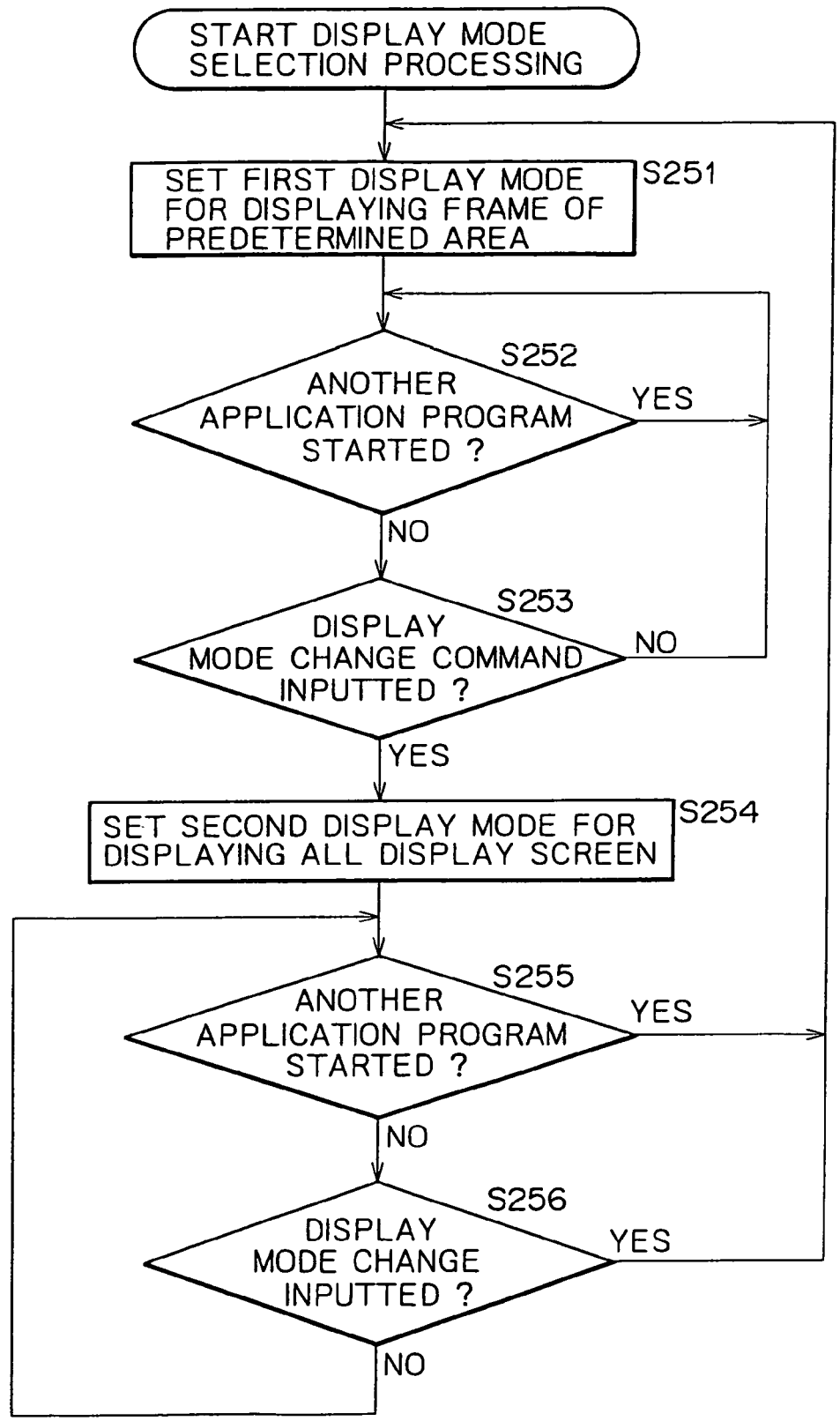
FIG. 71 is a flowchart describing the processing of selecting between display modes.

The following describes the processing of selecting a first display mode for displaying thumbnails 201 and others in a predetermined area of the display screen on the LCD 7 and a second display mode for displaying thumbnails 201 and others all over the display screen of the LCD 7, which are executed by the display program 54F, with reference to the flowchart shown in FIG. 71. In step S251, the display program 54F sets the first display mode (displaying a thumbnail 201 and others in a predetermined area on the display screen on the LCD 7) for displaying the frame of a predetermined area.

In step S252, the display program 54F determines whether another application program has been started. If another application is found started, the first display mode is selected and therefore the procedure returns to step S252 without changing the display mode, repeating the above-mentioned processing.

If, in step S252, another application program is found not started, then the procedure goes to step S253, in which the display program 54F determines, on the basis of a signal supplied from the jog dial 4, the touch pad 6, or the keyboard 5, whether a display mode change command has been inputted or not.

If, in step S253, a display mode change command is not found inputted, it indicates that the display mode need not be changed, so that the procedure returns to step S252 to repeat the above-mentioned processing.

If, in step S253, a display mode change command is found inputted, then the procedure goes to step S254, in which the display program 54F sets the second display mode which displays thumbnails 201 and others all over the display screen of the LCD 7.

In step S255, the display program 54F determines whether another application program has been started or not. If another application program is found not started, then the procedure goes to step S256 to determine, on the basis of a signal supplied from the jog dial 4, the touch pad 6, or the keyboard 5, whether a display mode change command has been inputted or not.

If, in step S256, a display mode change command is not found inputted, it indicates that the display mode need not be changed, so that the procedure returns to step S255 to repeat the determination process.

If, in step S256, a display mode change command is found inputted, then the procedure returns to step S251, in which the display program 54F sets the first display mode to repeat the above-mentioned processing.

If, in step S255, another application program is found started, it indicates that the first display mode is to be set, so that the procedure returns to step S251, in which the display program 54F sets the first display mode to repeat the processing.

Thus, the display program 54F switches between the first and second display modes in accordance with the inputted display mode change command and, when another application program is started, changes the display mode to the first display mode.

The above-mentioned sequence of processes can be executed by hardware or software. If the sequence of processes is executed by software, the programs constituting the software are installed from a program storage medium, to a computer which is embedded in a dedicated hardware device beforehand or a computer, such as a general-purpose personal computer, capable of executing various capabilities in which various programs are installed.

The program storage medium, which is installed in a computer, for storing computer-readable and executable programs may be a package medium constituted by the magnetic disk 121 (including floppy disk), the optical disc 122 (including CD-ROM (Compact Disc-Read Only Memory) and DVD (Digital Versatile Disc)), the magneto-optical disk 123 (including MD (Mini Disk)), or the semiconductor memory 124, or the ROM or the HDD 67 on which the programs are stored temporarily or permanently as shown in FIG. 5. Programs are stored in the program storage medium from wired or wireless communications media such as a local area network, the Internet, and digital satellite broadcasting through the interface such as a router and the modem 75 as required.

It should be noted that the steps describing the programs to be stored in the program storage medium are not only executed in a time-series manner in the order described, but also in parallel or in a discrete manner.

It should also be noted that the system as used herein denotes an entire apparatus constituted by a plurality of component units.

In the above described method, apparatus, medium, and program of the present invention, a thumb-nail area is divided in accordance with particular data, the number of pixel value equal to the number of divided areas is created, the created pixels values are set to the divided thumbnails, and the thumb-nail with the pixel values set is displayed. Consequently, by displaying thumbnails corresponding to data not including images, both the data including and not including images can be handled collectively.

While the embodiments of the present invention have been described using specific terms, such description is for illustrative purposes only, and it is to be understood that changes and variations may be made without departing from the spirit or scope of the following claims.

What is claimed is:

1. A display method, comprising the steps of:
    dividing a specific display area of a display apparatus into a plurality of areas as a function of a size of desired non-image data;
    generating image data that is related to the desired non-image data and comprises the plurality of areas divided, by setting a pixel data for each of the plurality of areas based on the non-image data; and
    displaying the image generated;
    wherein a number of the plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

2. A displaying method according to claim 1, wherein a lightness or saturation of one or a plurality of pixels in each of said areas is modified by obtaining unit data quantities of said non-image data as data values of red, green and blue dots of said one or a plurality of pixels in each of said areas.

3. A displaying method according to claim 1, wherein boundaries between the plurality of areas are blurred after a lightness or saturation of one or a plurality of pixels in each of said areas is changed.

4. The display method according to claim 1, wherein a size of an area of said plurality of areas is smaller than an area corresponding to a thumbnail image.

5. A display method, comprising the steps of:
    dividing a specific display of a display apparatus area into a plurality of areas as a function of a size of desired non-image data;
    generating image data that is related to the desired non-image data and comprises the plurality of areas divided, by setting a pixel data for each of the plurality of areas based on the non-image data; and
    displaying the image generated,
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

6. A display method, comprising the steps of:
    dividing a specific display of a display apparatus area into a plurality of areas as a function of a size of desired non-image data;
    generating image data that is related to the desired non-image data and comprises the plurality of areas divided, by setting a pixel data for each of the plurality of areas based on the non-image data; and
    displaying the image generated,
    wherein said non-image data is a text file, and
    wherein at least a part of the contents of said text file is displayed in a form of text in such a manner as to be overlapped to image information,
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

7. A displaying apparatus, comprising:
    means for dividing a specific display area of a display apparatus into a plurality of areas as a function of a size of desired non-image data;
    means for generating image data that is related to the desired non-image data and comprises the plurality of areas divided, by setting pixel data for each of the plurality of areas based on the non-image data;
    means for displaying the image generated, wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and wherein each pixel of the generated image is related to a specific character of the non-image data.

8. A displaying apparatus according to claim 7, wherein a lightness or saturation of one or a plurality of pixels in each of said areas is modified by obtaining unit data quantities of said non-image data as data values of red, green and blue dots of said one or a plurality of pixels in each of said areas.

9. A displaying apparatus according to claim 7, wherein boundaries among said areas are blurred after a lightness or saturation of one or a plurality of pixels in each of said areas is changed.

10. A displaying apparatus, comprising:
    means for dividing a specific display area of a display apparatus into a plurality of areas as a function of a size of desired non-image data;
    means for generating image data that is related to the desired non-image data and comprises the plurality of areas divided, by setting a pixel data for each of the plurality of areas based on the non-image data;
    means for displaying the image generated,
    wherein a number of plurality of area is a function of a size said non-image data, and
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

11. A displaying apparatus, comprising:
    means for dividing a specific display area of a display apparatus into a plurality of areas as a function of a size of desired non-image data;
    means for generating image data that is related to the desired non-image data and comprises the plurality of areas divided, by setting a pixel data for each of the plurality of areas based on the non-image data; and
    means for displaying the image generated,
    wherein said non-image data is a text file,
    wherein at least a part of the contents of said text file is displayed in a form of text in such a manner as to be overlapped to image information, and
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

12. A computer-readable medium for storing a program, said program comprising the steps of:
    dividing a specific display area of a display apparatus into a plurality of areas as a function of a size of desired non-image data;
    generating image data that is related to the desired non-image data and comprises the plurality of areas divided, by setting a pixel data for each of the plurality of areas based on the non-image data; and
    displaying the image generated;
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

13. The program according to claim 12, wherein a lightness or saturation of one or a plurality of pixels in each of said areas is modified by obtaining unit data quantities of said non-image data as data values of red, green and blue dots of said one or a plurality of pixels in each of said areas.

14. The program according to claim 12, wherein boundaries between the plurality of areas are blurred after a lightness or saturation of one or a plurality of pixels in each of said areas is changed.

15. A computer-readable medium for storing a program, said program comprising the steps of:
    dividing a specific display area of a display apparatus into a plurality of areas as a function of a size of desired non-image data;
    generating image data that is related to the desired non-image data and comprises the plurality of areas divided, by setting a pixel data for each of the plurality of areas based on the non-image data; and
    displaying the image generated,
    wherein the pixel data is proportional to a size of the non-image data,
    wherein a number of plurality of areas is a function of a size of said non-image data, and
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

16. A computer-readable medium for storing a program, said program comprising the steps of:
    dividing a specific display area of a display apparatus into a plurality of areas as a function of a size of desired non-image data;
    generating image data that is related to the desired non-image data and comprises the plurality of areas divided, by setting a pixel data for each of the plurality of areas based on the non-image data; and
    displaying the image generated,
    wherein said non-image data is a text file,
    wherein at least part of the contents of said text file is displayed in a form of text in such a manner as to be overlapped to image information, and
    wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
    wherein each pixel of the generated image is related to a specific character of the non-image data.

17. A computer readable medium adapted to store a program, the program, comprising the steps of:
- dividing said specific display area into a plurality of areas as a function of a size of desired non-image data;
- generating image data that is related to the desired non-image data and comprises the plurality of areas divided, by setting a pixel data for each of the plurality of areas based on the non-image data; and
- displaying the image generated,
- wherein the pixel data is proportional to a size of the non-image data, and
- wherein a number of plurality of areas within the generated image data are proportional to the size of said non-image data so as to increase the number of the plurality of the display area is divided into when the size of the said non-image data is larger and to decrease the number of the plurality of areas the display area is divided into when the size of the said non-image data is smaller, and
- wherein each pixel of the generated image is related to a specific character of the non-image data.

18. The program according to claim 17, wherein a lightness or saturation of one or a plurality of pixels in each of plurality of areas is modified by obtaining unit data quantities of said non-image data as data values of red, green and blue dots of said one or a plurality of pixels in each of said areas.

19. The program according to claim 17, wherein boundaries between the plurality of areas are blurred after a lightness or saturation of one or a plurality of pixels in each of said areas is changed.

20. A computer readable medium adapted to store a program, the program, comprising the steps of:
- dividing a specific display area of a display apparatus into a plurality of areas as a function of a size of desired non-image data;
- generating image data that is related to the desired non-image data and comprises the plurality of areas divided, by setting a pixel data for each of the plurality of areas based on the non-image data; and
- displaying the image generated,
- wherein the pixel data is proportional to a size of the non-image data,
- wherein a number of plurality of areas is a function of a size of said non-image data, and
- wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
- wherein each pixel of the generated image is related to a specific character of the non-image data.

21. A computer readable medium adapted to store a program, the program, comprising the steps of:
- dividing a specific display area of a display apparatus into a plurality of areas as a function of a size of desired non-image data;
- generating image data that is related to the desired non-image data and comprises the plurality of areas divided, by setting a pixel data for each of the plurality of areas based on the non-image data; and
- displaying the image generated,
- wherein the pixel data is proportional to a size of the non-image data,
- wherein said non-image data is a text file,
- wherein at least part of the contents of said text file is displayed in the form of text in such a manner as to be overlapped to said image information, and
- wherein a number of plurality of areas within the generated image data are proportional to the size of said non-image data so as to increase the number of the plurality of areas the display area is divided into when the size of the said non-image data is larger and to decrease the number of the plurality of areas the display area is divided into when the size of the said non-image data is smaller, and
- wherein each pixel of the generated image is related to a specific character of the non-image data.

\* \* \* \* \*